United States Patent
Tsuruoka

(10) Patent No.: US 8,184,181 B2
(45) Date of Patent: May 22, 2012

(54) IMAGE CAPTURING SYSTEM AND COMPUTER READABLE RECORDING MEDIUM FOR RECORDING IMAGE PROCESSING PROGRAM

(75) Inventor: Takao Tsuruoka, Machida (JP)

(73) Assignee: Olympus Corporation (JP)

( * ) Notice: Subject to any disclaimer, the term of this patent is extended or adjusted under 35 U.S.C. 154(b) by 419 days.

(21) Appl. No.: 12/463,472

(22) Filed: May 11, 2009

(65) Prior Publication Data

US 2009/0219417 A1 Sep. 3, 2009

Related U.S. Application Data

(63) Continuation of application No. PCT/JP2007/071088, filed on Oct. 30, 2007.

(30) Foreign Application Priority Data

Nov. 10, 2006 (JP) ................................. 2006-305916

(51) Int. Cl.
    *H04N 5/217* (2011.01)
(52) U.S. Cl. ........................................ 348/241; 382/195
(58) Field of Classification Search .......... 348/241–251; 382/195
    See application file for complete search history.

(56) References Cited

U.S. PATENT DOCUMENTS

| | | | |
|---|---|---|---|
| 5,923,775 A | 7/1999 | Snyder et al. ................. | 382/172 |
| 7,313,518 B2 * | 12/2007 | Scalart et al. ................. | 704/226 |
| 2002/0028025 A1 * | 3/2002 | Hong ............................. | 382/260 |
| 2004/0064307 A1 * | 4/2004 | Scalart et al. ................. | 704/205 |
| 2006/0158562 A1 * | 7/2006 | Rhee ............................. | 348/607 |
| 2009/0324089 A1 * | 12/2009 | Morita .......................... | 382/195 |
| 2010/0220223 A1 * | 9/2010 | Tsuruoka ....................... | 348/242 |

FOREIGN PATENT DOCUMENTS

| | | |
|---|---|---|
| JP | 2000-354179 | 12/2000 |
| JP | 2006-348018 | 12/2000 |
| JP | 2001-157057 | 6/2001 |
| JP | 2006-023959 | 1/2006 |
| JP | 2006-246080 | 9/2006 |
| WO | WO 2006/064913 | 6/2006 |

OTHER PUBLICATIONS

International Search Report mailed Jan. 22, 2008 in corresponding PCT International Application No. PCT/JP2007/071088.
David Tschumperle et al., "Diffusion PDEs on Vector-Valued Images," IEEE Signal Processing Magazine, Sep. 2002, pp. 16-25.

* cited by examiner

*Primary Examiner* — David Ometz
*Assistant Examiner* — Antoinette Spinks
(74) *Attorney, Agent, or Firm* — Ostrolenk Faber LLP

(57) ABSTRACT

An image capturing system includes: a first noise reduction unit which roughly removes the effects of an edge component by performing edge-preserving adaptive noise reduction processing on a target pixel within a local region including the target pixel and the neighboring pixels extracted from an image signal acquired from a CCD; a noise estimation unit which dynamically estimates the noise amount with respect to the target pixel based upon the target pixel value thus subjected to the noise reduction processing by the first noise reduction unit; and a second noise reduction unit which performs noise reduction processing on the target pixel based upon the target pixel value thus subjected to the noise reduction processing by the first noise reduction unit and the noise amount thus estimated by the noise estimation unit.

14 Claims, 33 Drawing Sheets

FIG.2

| R00 | Gr00 | R10 | Gr10 | R20 | Gr20 | R30 | Gr30 | R40 | Gr40 |
|---|---|---|---|---|---|---|---|---|---|
| Gb00 | B00 | Gb10 | B10 | Gb20 | B20 | Gb30 | B30 | Gb40 | B40 |
| R01 | Gr01 | R11 | Gr11 | R21 | Gr21 | R31 | Gr31 | R41 | Gr41 |
| Gb01 | B01 | Gb11 | B11 | Gb21 | B21 | Gb31 | B31 | Gb41 | B41 |
| R02 | Gr02 | R12 | Gr12 | R22 | Gr22 | R32 | Gr32 | R42 | Gr42 |
| Gb02 | B02 | Gb12 | B12 | Gb22 | B22 | Gb32 | B32 | Gb42 | B42 |
| R03 | Gr03 | R13 | Gr13 | R23 | Gr23 | R33 | Gr33 | R43 | Gr43 |
| Gb03 | B03 | Gb13 | B13 | Gb23 | B23 | Gb33 | B33 | Gb43 | B43 |
| R04 | Gr04 | R14 | Gr14 | R24 | Gr24 | R34 | Gr34 | R44 | Gr44 |
| Gb04 | B04 | Gb14 | B14 | Gb24 | B24 | Gb34 | B34 | Gb44 | B44 |

TARGET PIXELS

FIG.3

| R00 | R10 | R20 | R30 | R40 |
|---|---|---|---|---|
| R01 | R11 | R21 | R31 | R41 |
| R02 | R12 | R22 | R32 | R42 |
| R03 | R13 | R23 | R33 | R43 |
| R04 | R14 | R24 | R34 | R44 |

FIG.4

| Gr00 | Gr10 | Gr20 | Gr30 | Gr40 |
|---|---|---|---|---|
| Gr01 | Gr11 | Gr21 | Gr31 | Gr41 |
| Gr02 | Gr12 | Gr22 | Gr32 | Gr42 |
| Gr03 | Gr13 | Gr23 | Gr33 | Gr43 |
| Gr04 | Gr14 | Gr24 | Gr34 | Gr44 |

FIG.5

| Gb00 | Gb10 | Gb20 | Gb30 | Gb40 |
|---|---|---|---|---|
| Gb01 | Gb11 | Gb21 | Gb31 | Gb41 |
| Gb02 | Gb12 | Gb22 | Gb32 | Gb42 |
| Gb03 | Gb13 | Gb23 | Gb33 | Gb43 |
| Gb04 | Gb14 | Gb24 | Gb34 | Gb44 |

FIG.6

| B00 | B10 | B20 | B30 | B40 |
|---|---|---|---|---|
| B01 | B11 | B21 | B31 | B41 |
| B02 | B12 | B22 | B32 | B42 |
| B03 | B13 | B23 | B33 | B43 |
| B04 | B14 | B24 | B34 | B44 |

FIG.7

| Cy00 | Ye00 | Cy10 | Ye10 | Cy20 | Ye20 | Cy30 | Ye30 | Cy40 | Ye40 |
|---|---|---|---|---|---|---|---|---|---|
| G00 | Mg00 | G10 | Mg10 | G20 | Mg20 | G30 | Mg30 | G40 | Mg40 |
| Cy01 | Ye01 | Cy11 | Ye11 | Cy21 | Ye21 | Cy31 | Ye31 | Cy41 | Ye41 |
| Mg01 | G01 | Mg11 | G11 | Mg21 | G21 | Mg31 | G31 | Mg41 | G41 |
| Cy02 | Ye02 | Cy12 | Ye12 | Cy22 | Ye22 | Cy32 | Ye32 | Cy42 | Ye42 |
| G02 | Mg02 | G12 | Mg12 | G22 | Mg22 | G32 | Mg32 | G42 | Mg42 |
| Cy03 | Ye03 | Cy13 | Ye13 | Cy23 | Ye23 | Cy33 | Ye33 | Cy43 | Ye43 |
| Mg03 | G03 | Mg13 | G13 | Mg23 | G23 | Mg33 | G33 | Mg43 | G43 |
| Cy04 | Ye04 | Cy14 | Ye14 | Cy24 | Ye24 | Cy34 | Ye34 | Cy44 | Ye44 |
| G04 | Mg04 | G14 | Mg14 | G24 | Mg24 | G34 | Mg34 | G44 | Mg44 |

TARGET PIXELS

FIG.8

| Cy00 | Cy10 | Cy20 | Cy30 | Cy40 |
|---|---|---|---|---|
| Cy01 | Cy11 | Cy21 | Cy31 | Cy41 |
| Cy02 | Cy12 | Cy22 | Cy32 | Cy42 |
| Cy03 | Cy13 | Cy23 | Cy33 | Cy43 |
| Cy04 | Cy14 | Cy24 | Cy34 | Cy44 |

FIG.9

| Ye00 | Ye10 | Ye20 | Ye30 | Ye40 |
|---|---|---|---|---|
| Ye01 | Ye11 | Ye21 | Ye31 | Ye41 |
| Ye02 | Ye12 | Ye22 | Ye32 | Ye42 |
| Ye03 | Ye13 | Ye23 | Ye33 | Ye43 |
| Ye04 | Ye14 | Ye24 | Ye34 | Ye44 |

FIG.10

| G00 | G10 | G20 | G30 | G40 |
|-----|-----|-----|-----|-----|
| G01 | G11 | G21 | G31 | G41 |
| G02 | G12 | G22 | G32 | G42 |
| G03 | G13 | G23 | G33 | G43 |
| G04 | G14 | G24 | G34 | G44 |

FIG.11

| Mg00 | Mg10 | Mg20 | Mg30 | Mg40 |
|------|------|------|------|------|
| Mg01 | Mg11 | Mg21 | Mg31 | Mg41 |
| Mg02 | Mg12 | Mg22 | Mg32 | Mg42 |
| Mg03 | Mg13 | Mg23 | Mg33 | Mg43 |
| Mg04 | Mg14 | Mg24 | Mg34 | Mg44 |

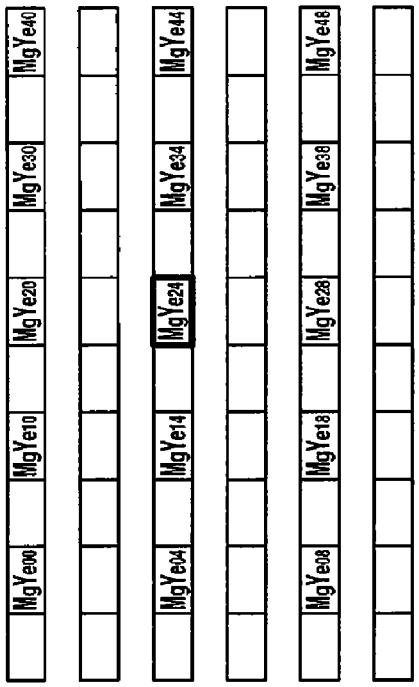
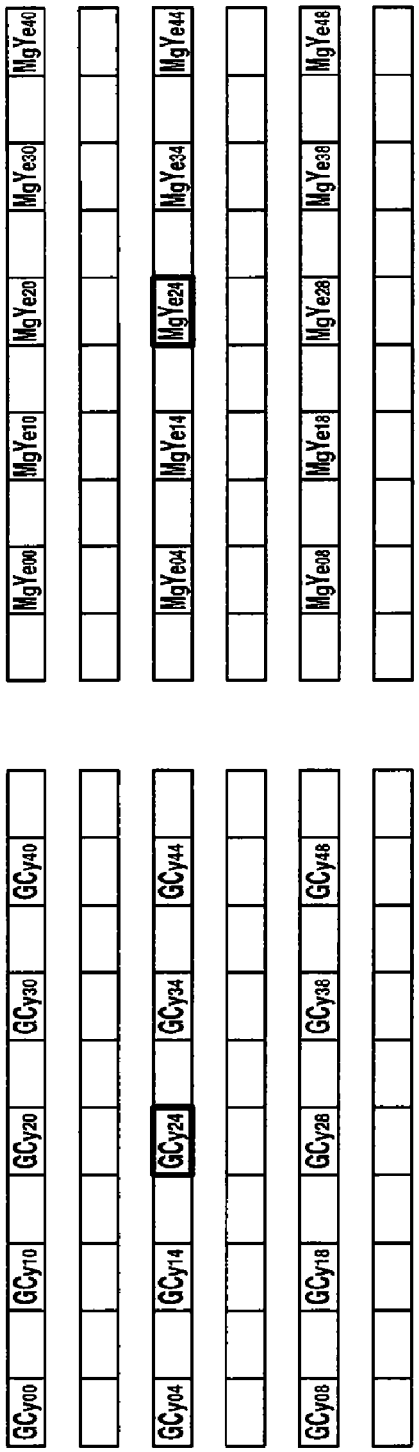
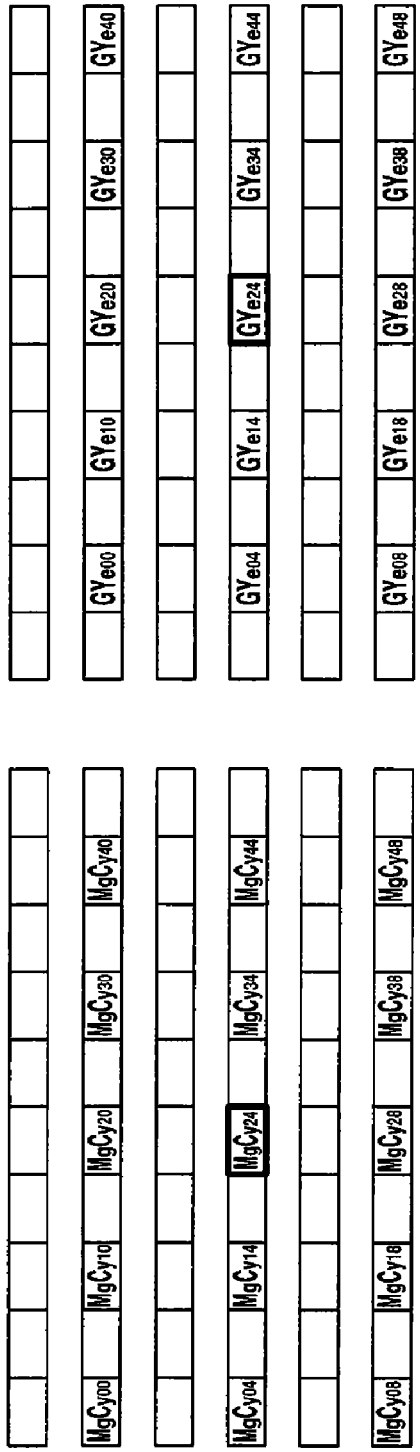

FIG.38

| G00 | G10 | G20 | G30 | G40 |
|-----|-----|-----|-----|-----|
| G01 | G11 | G21 | G31 | G41 |
| G02 | G12 | G22 | G32 | G42 |
| G03 | G13 | G23 | G33 | G43 |
| G04 | G14 | G24 | G34 | G44 |

FIG.39

| R00 | B10 | R20 | B30 | R40 |
|-----|-----|-----|-----|-----|
| B01 | R11 | B21 | R31 | B41 |
| R02 | B12 | R22 | B32 | R42 |
| B03 | R13 | B23 | R33 | B43 |
| R04 | B14 | R24 | B34 | R44 |

FIG.40

| R00 | R10 | R20 | R30 | R40 |
|-----|-----|-----|-----|-----|
| R01 | R11 | R21 | R31 | R41 |
| R02 | R12 | R22 | R32 | R42 |
| R03 | R13 | R23 | R33 | R43 |
| R04 | R14 | R24 | R34 | R44 |

FIG.41

| B00 | B10 | B20 | B30 | B40 |
|-----|-----|-----|-----|-----|
| B01 | B11 | B21 | B31 | B41 |
| B02 | B12 | B22 | B32 | B42 |
| B03 | B13 | B23 | B33 | B43 |
| B04 | B14 | B24 | B34 | B44 |

FIG.42

| Y00 | Y10 | Y20 | Y30 | Y40 |
|-----|-----|-----|-----|-----|
| Y01 | Y11 | Y21 | Y31 | Y41 |
| Y02 | Y12 | Y22 | Y32 | Y42 |
| Y03 | Y13 | Y23 | Y33 | Y43 |
| Y04 | Y14 | Y24 | Y34 | Y44 |

FIG.43

| Cb00 | Cb10 | Cb20 | Cb30 | Cb40 |
|------|------|------|------|------|
| Cb01 | Cb11 | Cb21 | Cb31 | Cb41 |
| Cb02 | Cb12 | Cb22 | Cb32 | Cb42 |
| Cb03 | Cb13 | Cb23 | Cb33 | Cb43 |
| Cb04 | Cb14 | Cb24 | Cb34 | Cb44 |

FIG.44

| Cr00 | Cr10 | Cr20 | Cr30 | Cr40 |
|------|------|------|------|------|
| Cr01 | Cr11 | Cr21 | Cr31 | Cr41 |
| Cr02 | Cr12 | Cr22 | Cr32 | Cr42 |
| Cr03 | Cr13 | Cr23 | Cr33 | Cr43 |
| Cr04 | Cr14 | Cr24 | Cr34 | Cr44 |

——— IMAGE SIGNAL
——— CONTROL SIGNAL
----- OTHER SIGNALS

| 0 | 0 | 2 | 0 | 0 |
|---|---|---|---|---|
| 0 | 7 | 15 | 7 | 0 |
| 2 | 15 | 32 | 15 | 2 |
| 0 | 7 | 15 | 7 | 0 |
| 0 | 0 | 2 | 0 | 0 |

5×5 TYPE1

| 0 | 1 | 2 | 1 | 0 |
|---|---|---|---|---|
| 1 | 7 | 14 | 7 | 1 |
| 2 | 14 | 28 | 14 | 2 |
| 1 | 7 | 14 | 7 | 1 |
| 0 | 1 | 2 | 1 | 0 |

5×5 TYPE2

| 1 | 1 | 2 | 1 | 1 |
|---|---|---|---|---|
| 1 | 8 | 13 | 8 | 1 |
| 2 | 13 | 23 | 13 | 2 |
| 1 | 8 | 13 | 8 | 1 |
| 1 | 1 | 2 | 1 | 1 |

5×5 TYPE3

| 1 | 2 | 3 | 2 | 1 |
|---|---|---|---|---|
| 2 | 8 | 11 | 8 | 2 |
| 3 | 11 | 20 | 11 | 3 |
| 2 | 8 | 11 | 8 | 2 |
| 1 | 2 | 3 | 2 | 1 |

5×5 TYPE4

| 2 | 10 | 2 |
|---|---|---|
| 10 | 80 | 10 |
| 2 | 10 | 2 |

3×3 TYPE1

| 4 | 14 | 4 |
|---|---|---|
| 14 | 56 | 14 |
| 4 | 14 | 4 |

3×3 TYPE2

| 6 | 15 | 6 |
|---|---|---|
| 15 | 44 | 15 |
| 6 | 15 | 6 |

3×3 TYPE3

| 8 | 15 | 8 |
|---|---|---|
| 15 | 36 | 15 |
| 8 | 15 | 8 |

3×3 TYPE4

IMAGE CAPTURING SYSTEM AND COMPUTER READABLE RECORDING MEDIUM FOR RECORDING IMAGE PROCESSING PROGRAM

CROSS REFERENCE TO RELATED APPLICATION

This application is a continuation application of PCT/JP2007/071088 filed on Oct. 30, 2007 and claims benefit of Japanese Application No. 2006-305916 filed in Japan on Nov. 10, 2006, the entire contents of which are incorporated herein by this reference.

BACKGROUND OF INVENTION

1. Field of the Invention

The present invention relates to an image capturing system and a computer readable recording medium for recording an image processing program which performs noise reduction processing on an image signal acquired from an image capturing unit.

2. Description of the Related Art

An image capturing unit comprises an image capturing device, and an analog circuit, an A/D converter and so forth, which are provided as components associated with the image capturing device. In general, an image signal acquired by an image capturing unit includes noise components. These noise components are roughly classified into fixed pattern noise components and random noise components.

The aforementioned fixed pattern noise is noise that occurs principally due to the image capturing device, typical examples of which include noise due to defective pixels.

On the other hand, random noise occurs in the image capturing device and the analog circuit, and has noise characteristics close to white noise characteristics.

With regard to the latter noise, i.e., random noise, a technique has been disclosed in Japanese Patent Application Laid-Open Publication No. 2001-157057, for example, in which the noise amount N is represented as a function, i.e., as $N = ab^{cD}$, using constant terms a, b, and c, which are provided as static terms, and a signal level D which is a signal level converted to a density level. The noise amount N with respect to the signal level D is estimated using this function, and the frequency properties of the filtering are controlled based upon the noise amount N thus estimated, thereby providing adaptive noise reduction processing suitable for the signal level.

Also, a technique is described in Japanese Patent Application Laid-Open Publication No. 2006-23959, in which the noise amount is estimated in increments of blocks based upon a noise model, and noise reduction processing is controlled in increments of blocks. Furthermore, a technique is described in the above-mentioned Publication, in which a region which is similar to a target pixel is selected in each block, and the average value calculated with respect to the region thus selected is used to estimate the noise amount. This allows space variant noise reduction processing to be performed without involving the effects of the edge region, thereby providing a high-quality image signal.

Furthermore, Japanese Patent Application Laid-Open Publication No. 2006-246080 describes an edge preserving filtering technique called bilateral filter employing a combination of smoothing processing and edge enhancement processing. This provides an image with reduced noise components while suppressing degradation of the edge components.

In recent years, a technique has been proposed in which an image that has degraded due to degrading factors such as noise is restored by calculating a diffusion image based upon a nonlinear diffusion equation. For example, an example of this technique is described in "IEEE SIGNAL PROCESSING MAGAZINE SEPTEMBER 2002" (pp. 16-25).

SUMMARY OF THE INVENTION

An image capturing system according to one aspect of the present invention is an image capturing system which performs noise reduction processing on an image signal acquired from an image capturing unit. The image capturing system includes: local region extracting means which extracts, from the image signal, a local region including a target pixel to be subjected to the noise reduction processing and at least one neighboring pixel positioned spatially in the vicinity of the target pixel; first noise reducing means which performs adaptive noise reduction processing on the target pixel within the local region; noise estimating means which estimates the noise amount with respect to the target pixel based upon the target pixel value subjected to the noise reduction processing by the first noise reducing means; and second noise reducing means which performs noise reduction processing on the target pixel based upon the target pixel value subjected to the noise reduction processing by the first noise reducing means and the noise amount estimated by the noise estimating means.

Also, a computer readable recording medium for recording an image processing program according to another aspect of the present invention is a computer readable recording medium for recording an image processing program for performing noise reduction processing on an image signal acquired from an image capturing unit. The computer readable recording medium records the image processing program which includes: a local region extraction step for extracting, from the image signal, a local region including a target pixel to be subjected to the noise reduction processing and at least one neighboring pixel positioned spatially in the vicinity of the target pixel; a first noise reduction step for performing adaptive noise reduction processing on the target pixel within the local region; a noise estimation step for estimating the noise amount with respect to the target pixel based upon the target pixel value subjected to the noise reduction processing in the first noise reduction step; and a second noise reduction step for performing noise reduction processing on the target pixel based upon the target pixel value subjected to the noise reduction processing in the first noise reduction step and the noise amount estimated in the noise estimation step.

BRIEF DESCRIPTION OF THE DRAWINGS

FIG. 2 is a diagram which shows a pattern of a Bayer-type primary color filter for a local region according to the embodiment 1.

FIG. 3 is a diagram which shows the R-color signal separated with respect to the local region according to the embodiment 1.

FIG. 4 is a diagram which shows the Gr-color signal separated with respect to the local region according to the embodiment 1.

FIG. 5 is a diagram which shows the Gb-color signal separated with respect to the local region according to the embodiment 1.

FIG. 6 is a diagram which shows the B-color signal separated with respect to the local region according to the embodiment 1.

FIG. 7 is a diagram which shows a pattern of a color-difference line-sequential type complementary color filter for a local region according to the embodiment 1.

FIG. 8 is a diagram which shows the Cy-color signal separated with respect to the local region according to the embodiment 1.

FIG. 9 is a diagram which shows the Ye-color signal separated with respect to the local region according to the embodiment 1.

FIG. 10 is a diagram which shows the G-color signal separated with respect to the local region according to the embodiment 1.

FIG. 11 is a diagram which shows the Mg-color signal separated with respect to the local region according to the embodiment 1.

FIGS. 27A to 27D are diagrams for describing separation of an even-numbered field signal shown in FIG. 26B into a GCy-color signal, a MgYe-color signal, an MgCy-color signal, and a GYe-color signal according to the embodiment 2.

FIG. 38 is a diagram which shows a pattern of a color filter for a first CCD with respect to a local region according to the embodiment 3.

FIG. 39 is a diagram which shows a pattern of a color filter for a second CCD with respect to a local region according to the embodiment 3.

FIG. 40 is a diagram which shows an R-color signal in the local region obtained by performing interpolation processing on the output of the second CCD, according to the embodiment 3.

FIG. 41 is a diagram which shows a B-color signal in the local region obtained by performing interpolation processing on the output of the second CCD, according to the embodiment 3.

FIG. 42 is a diagram which shows a Y signal in the local region obtained by separating the G signal shown in FIG. 38, the R signal shown in FIG. 40, and the B signal shown in FIG. 41, according to the embodiment 3.

FIG. 43 is a diagram which shows a Cb signal in the local region obtained by separating the G signal shown in FIG. 38, the R signal shown in FIG. 40, and the B signal shown in FIG. 41, according to the embodiment 3.

FIG. 44 is a diagram which shows a Cr signal in the local region obtained by separating the G signal shown in FIG. 38, the R signal shown in FIG. 40, and the B signal shown in FIG. 41, according to the embodiment 3.

DETAILED DESCRIPTION OF THE PREFERRED EMBODIMENT(S)

Description will be made below regarding embodiments according to the present invention with reference to the drawings.

[Embodiment 1]

Figure 1:
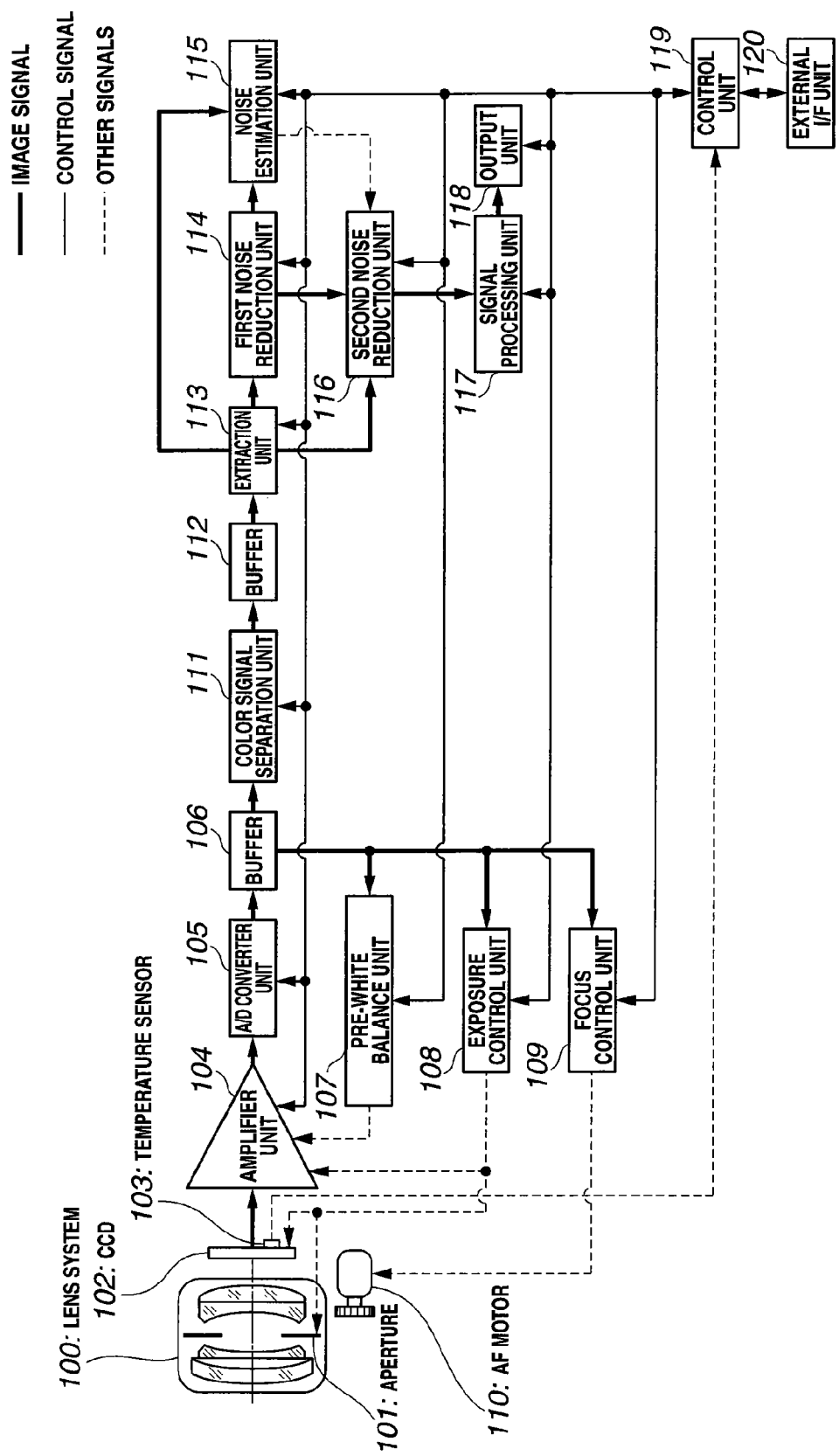
FIG. 1 is a block diagram which shows a configuration of an image capturing system according to an embodiment 1 of the present invention.
Figure 12:
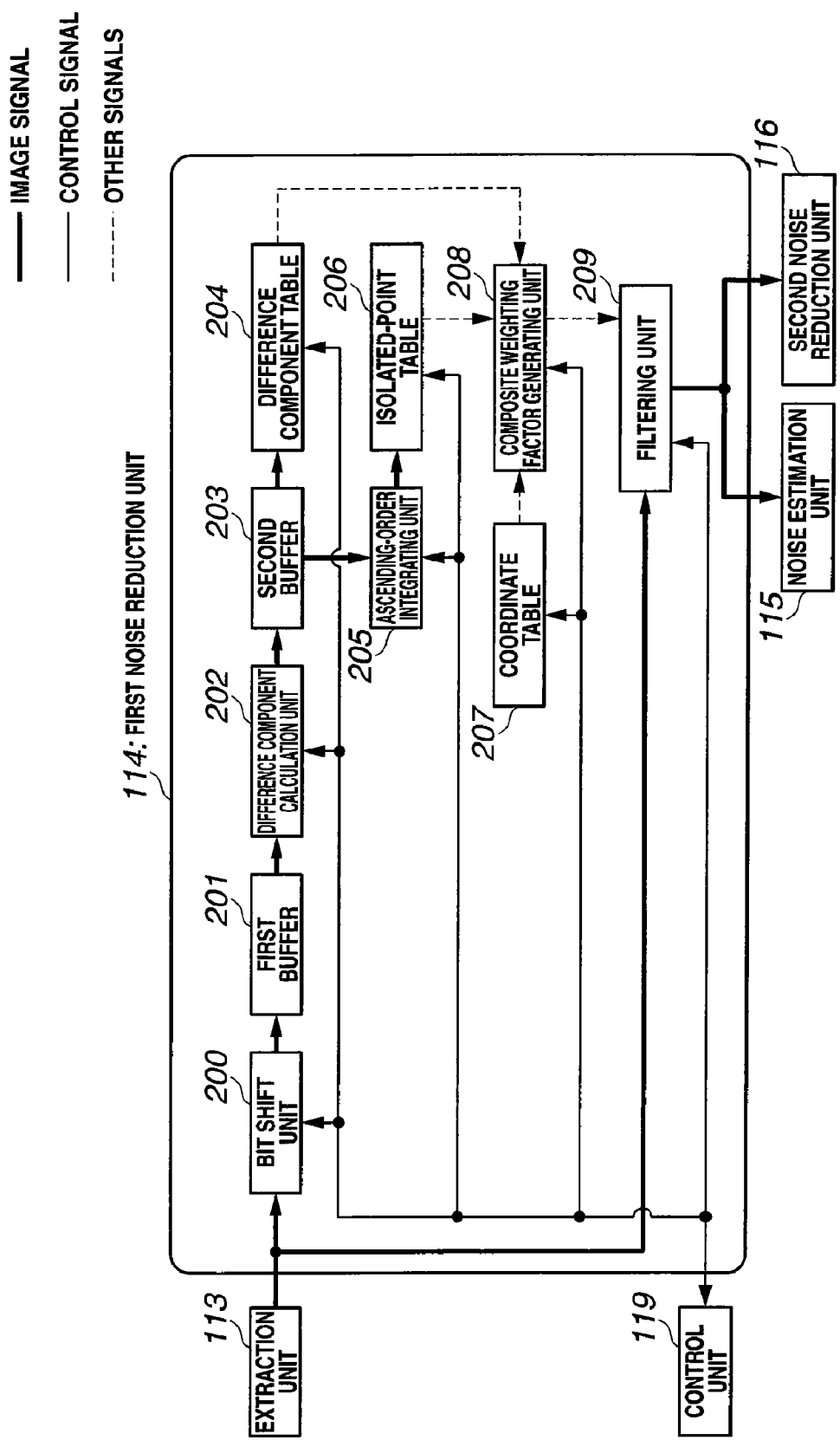
FIG. 12 is a block diagram which shows an example configuration of a first noise reduction unit which generates a composite weighting factor based upon three components according to the embodiment 1.
Figure 13:
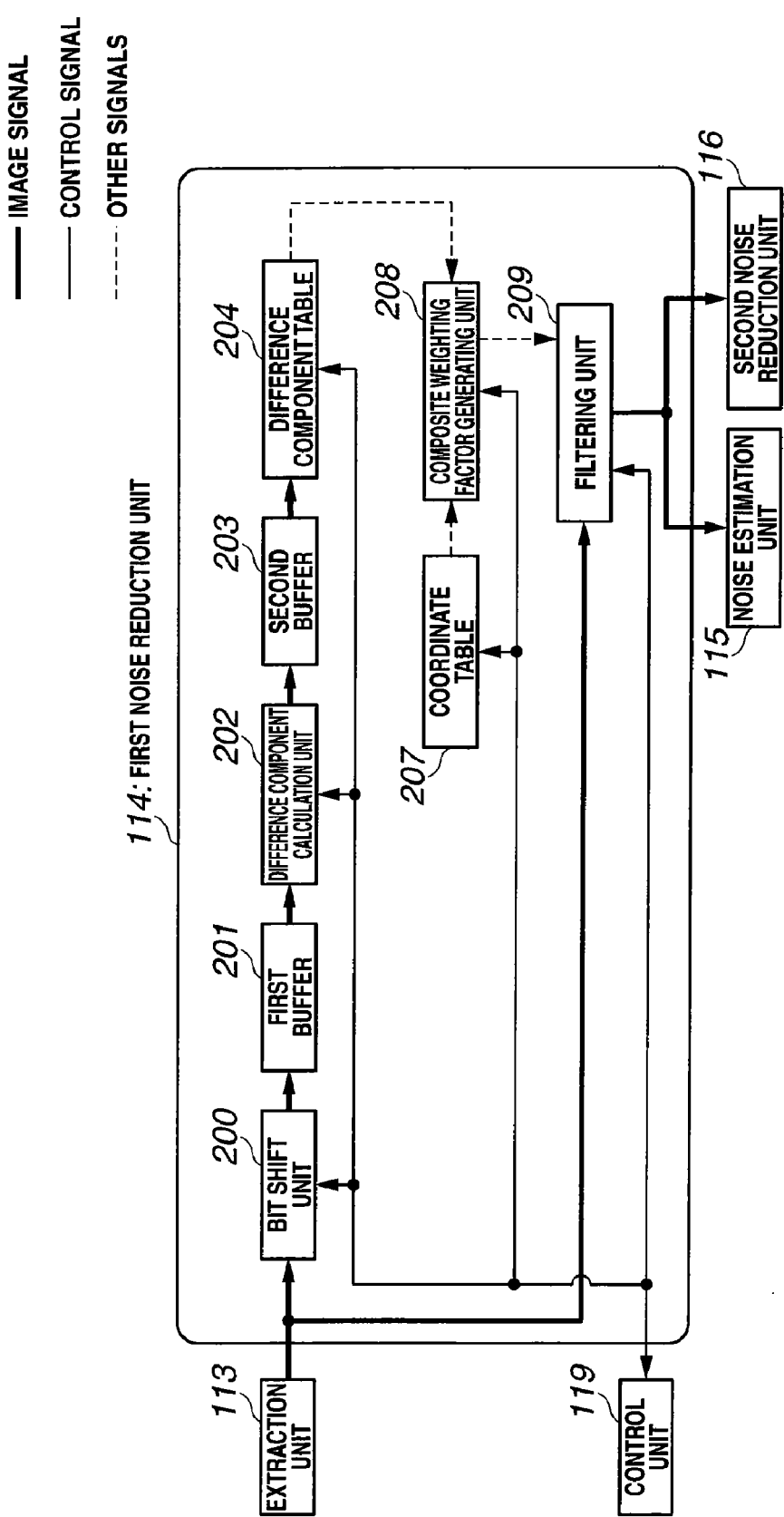
FIG. 13 is a block diagram which shows an example configuration of a first noise reduction unit which generates a composite weighting factor based upon two components according to the embodiment 1.
Figure 14:
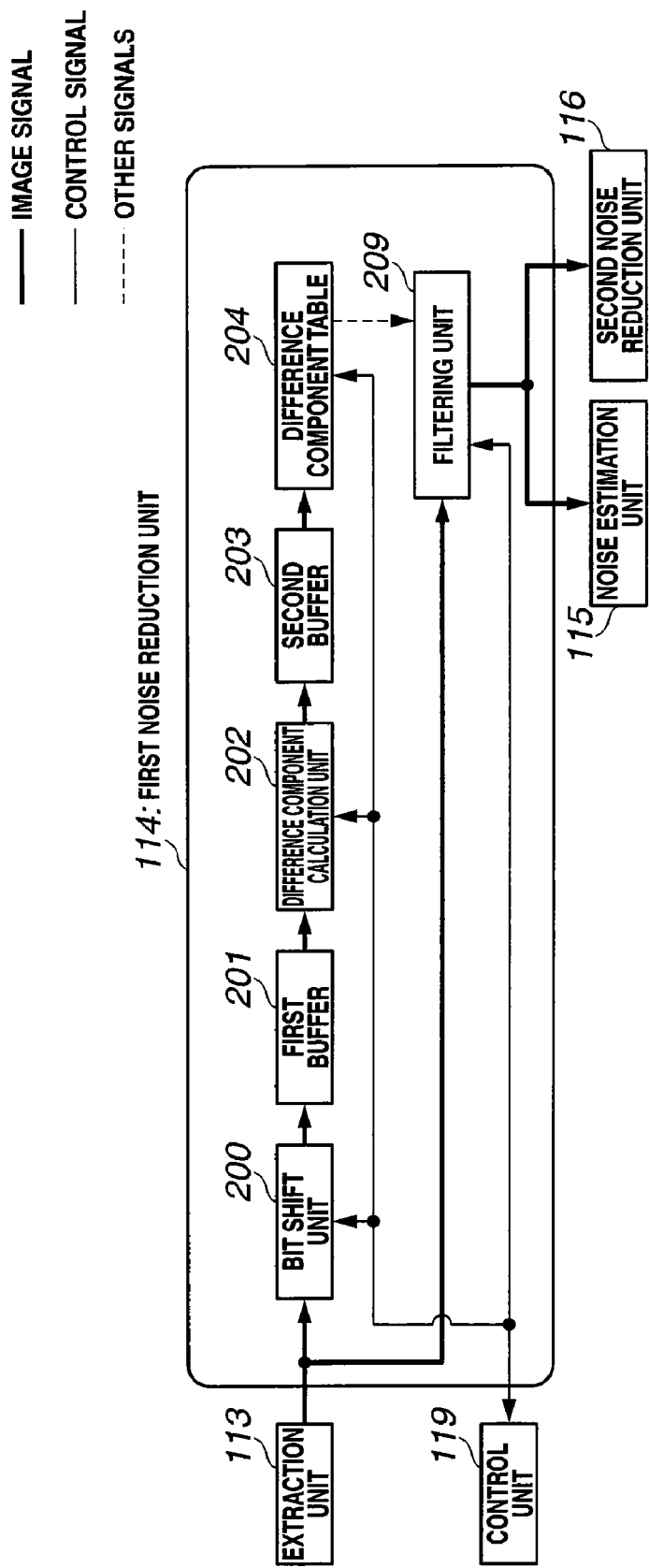
FIG. 14 is a block diagram which shows an example configuration of a first noise reduction unit which generates a composite weighting factor based upon a single component according to the embodiment 1.
Figure 15:
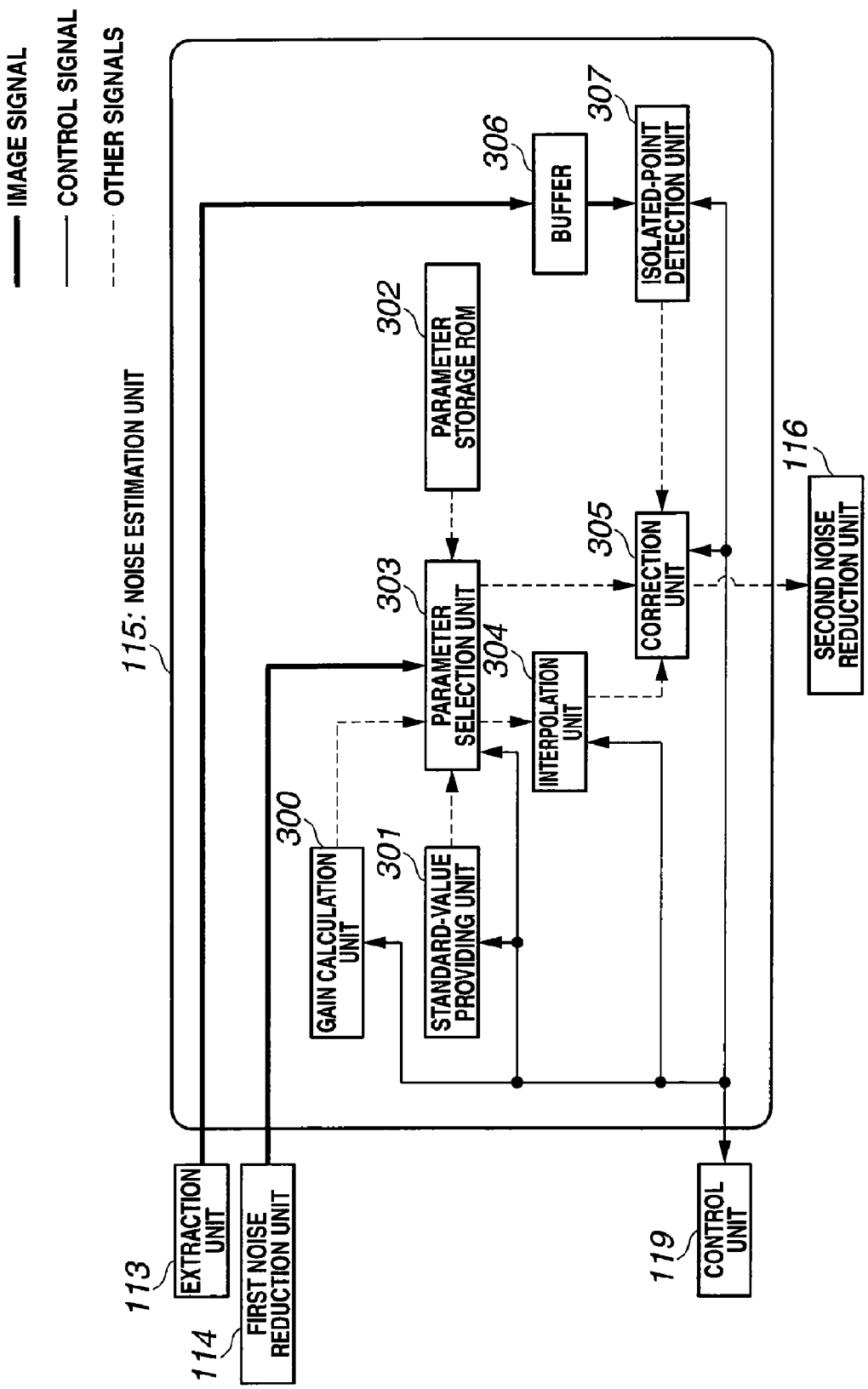
FIG. 15 is a block diagram which shows a configuration of a noise estimation unit according to the embodiment 1.
Figure 16:
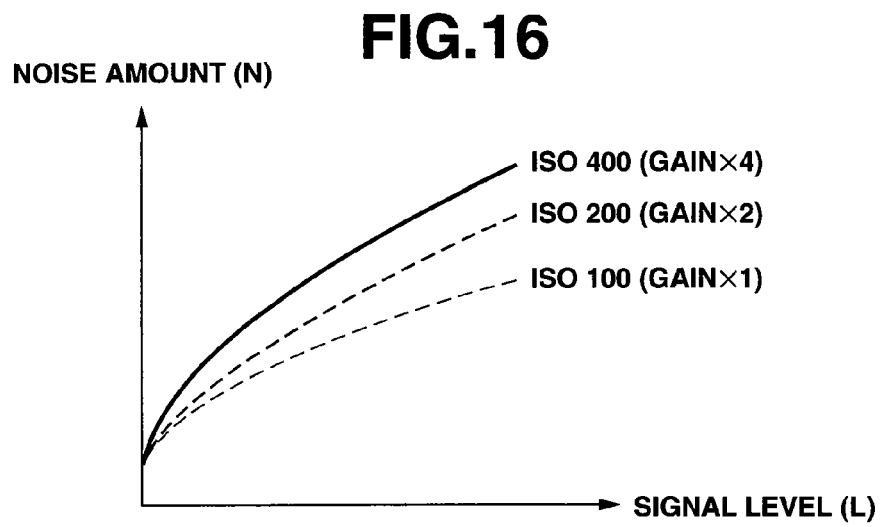
FIG. 16 is a graph which indicates the relation between the signal level and the noise amount estimated based upon the signal level according to the embodiment 1.
Figure 17:
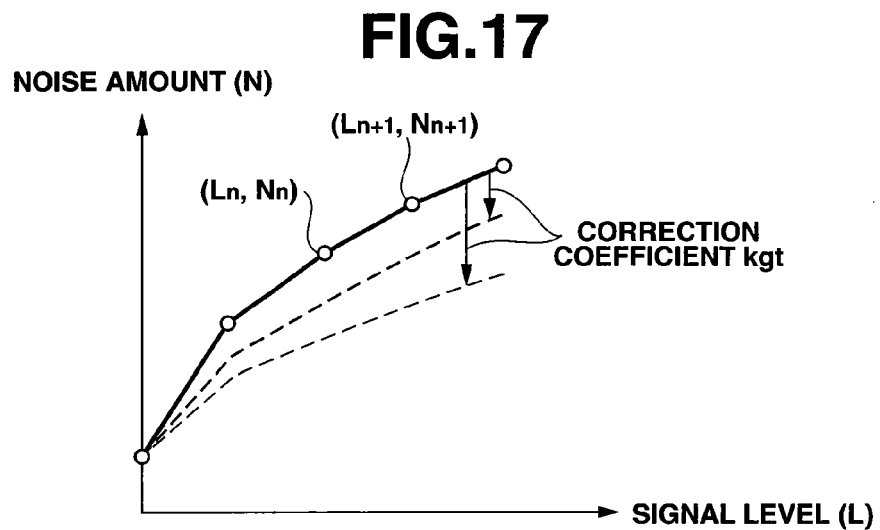
FIG. 17 is a graph which indicates a noise model obtained by simplifying the noise model shown in FIG. 16, according to the embodiment 1.

FIG. 1 through FIG. 24 show an embodiment 1 according to the present invention. FIG. 1 is a block diagram which shows a configuration of an image capturing system. FIG. 2 is a diagram which shows a pattern of a Bayer-type primary color filter. FIG. 3 is a diagram which shows the R-color signal extracted from a local region. FIG. 4 is a diagram which shows the Gr-color signal extracted from a local region. FIG. 5 is a diagram which shows the Gb-color signal extracted from a local region. FIG. 6 is a diagram which shows the B-color signal extracted from a local region. FIG. 7 is a diagram which shows a pattern of a color-difference line-sequential type complementary color filter for a local region. FIG. 8 is a diagram which shows the Cy-color signal extracted from a local region. FIG. 9 is a diagram which shows the Ye-color signal extracted from a local region. FIG. 10 is a diagram which shows the G-color signal extracted from a local region. FIG. 11 is a diagram which shows the Mg-color signal extracted from a local region. FIG. 12 is a block diagram which shows an example configuration of a first noise reduction unit which generates a composite weighting factor based upon three components. FIG. 13 is a block diagram which shows an example configuration of a first noise reduction unit which generates a composite weighting factor based upon two components. FIG. 14 is a block diagram which shows an example configuration of a first noise reduction unit which generates a composite weighting factor based upon one component. FIG. 15 is a block diagram which shows an example configuration of a noise estimation unit. FIG. 16 is a graph which indicates the relation between the signal level and the noise amount estimated based upon the signal level. FIG. 17 is a graph which indicates a noise model obtained by simplifying the noise model shown in FIG. 16.

Figure 18:
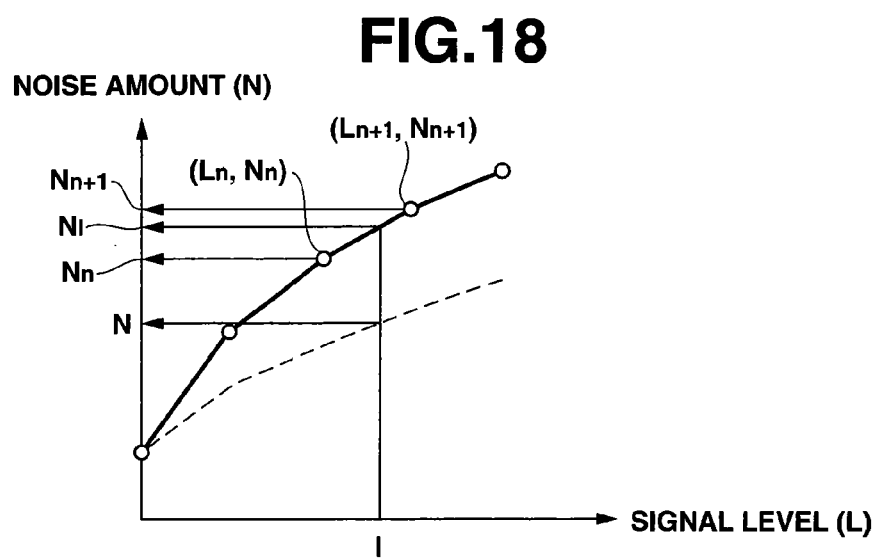
FIG. 18 is a graph for describing a method for calculating the noise amount based upon the noise model thus simplified shown in FIG. 17, according to the embodiment 1.
Figure 19:
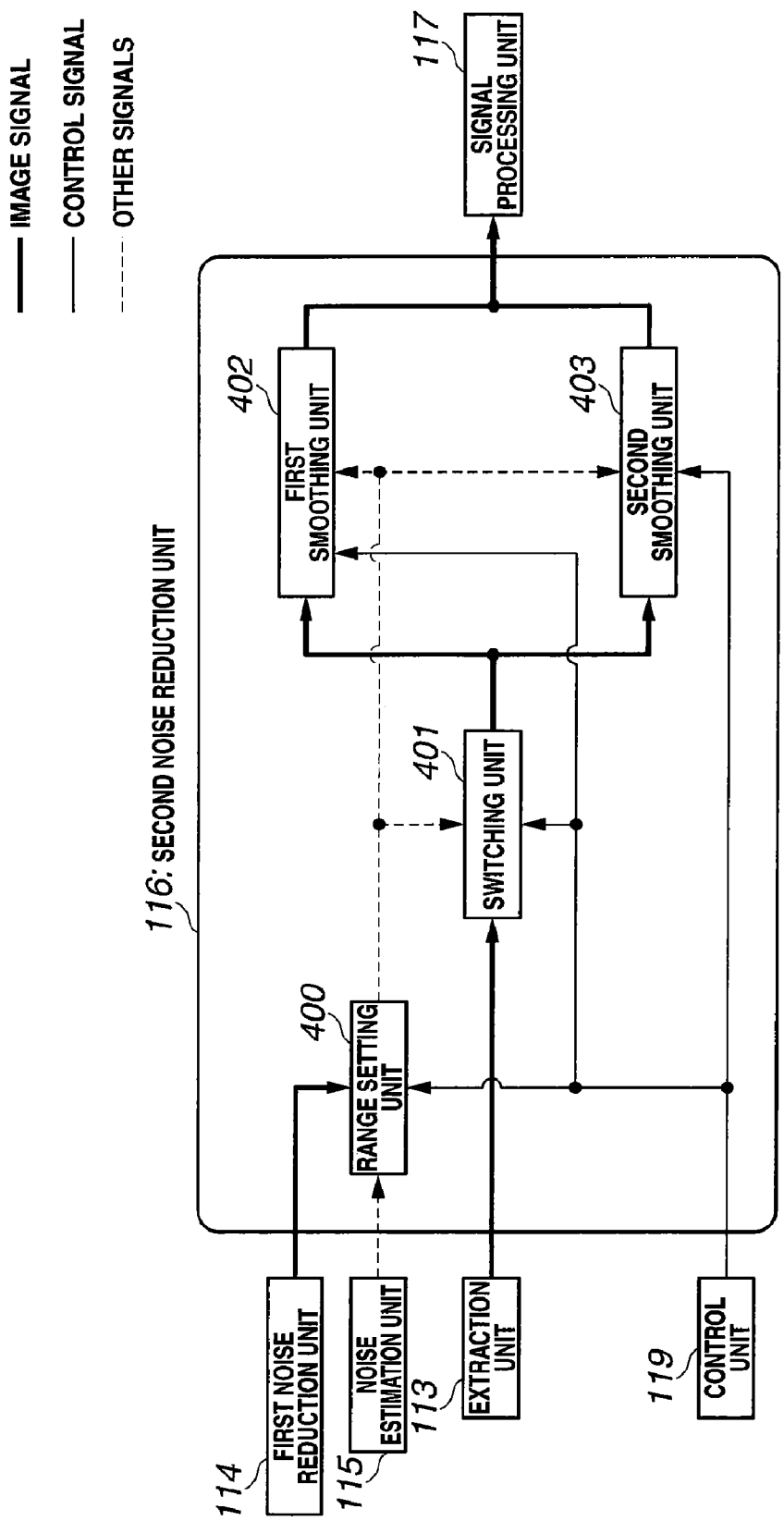
FIG. 19 is a block diagram which shows a configuration of a second noise reduction unit according to the embodiment 1.
Figure 20:
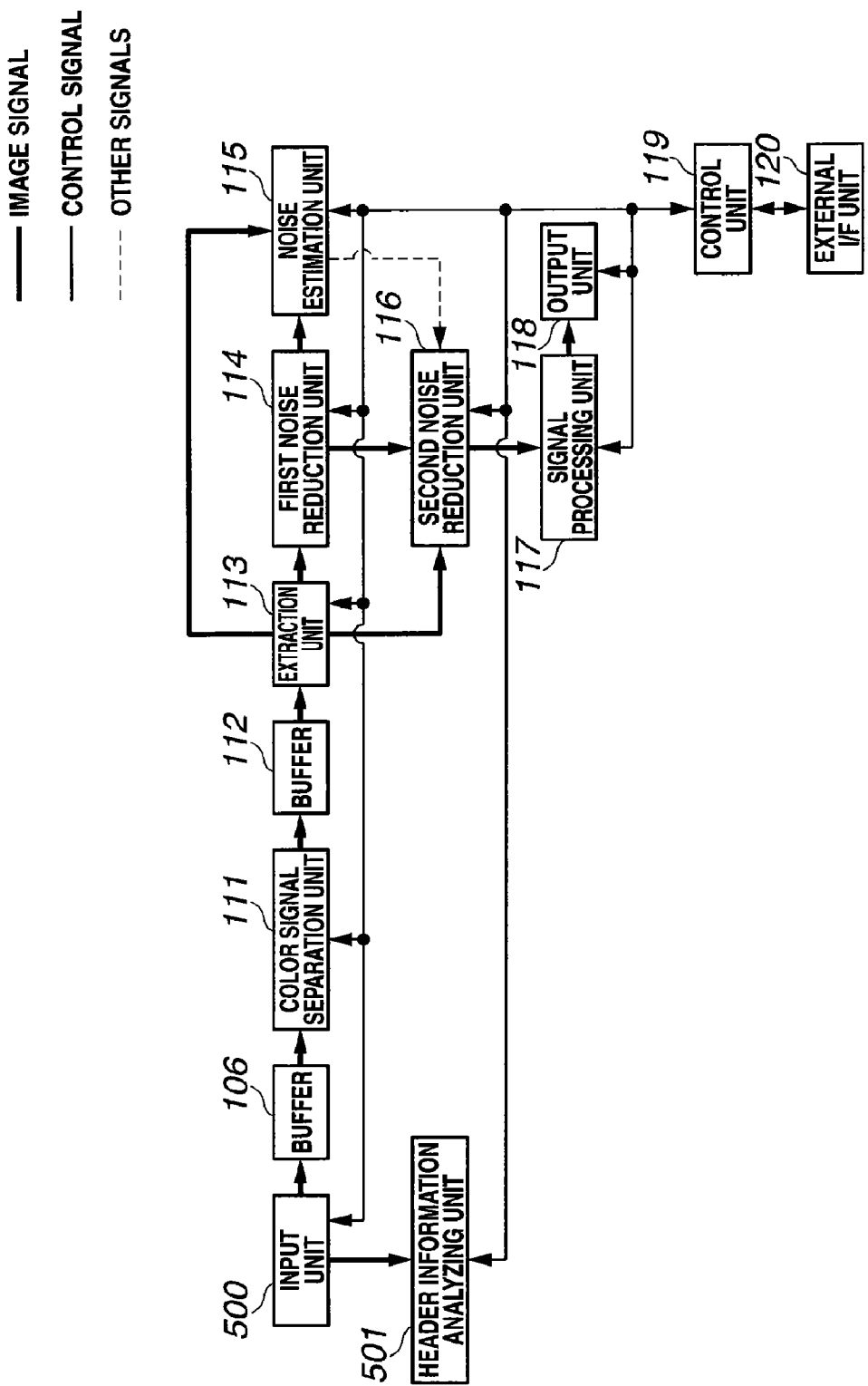
FIG. 20 is a block diagram which shows a configuration of the image capturing system having an image capturing unit provided in the form of a separate unit according to the embodiment 1.
Figure 21:
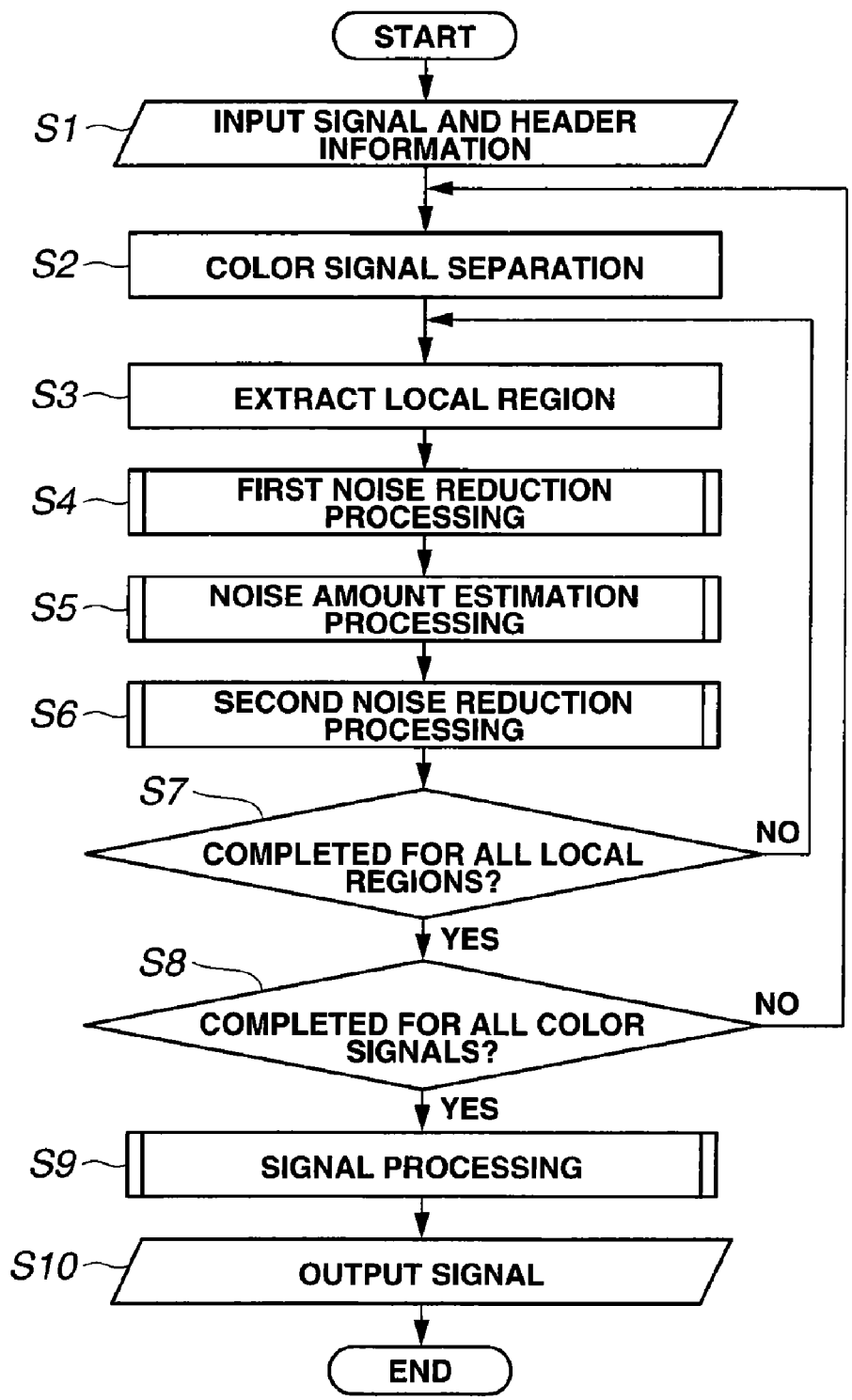
FIG. 21 is a flowchart which shows the overall flow of the processing according to an image processing program according to the embodiment 1.
Figure 22:
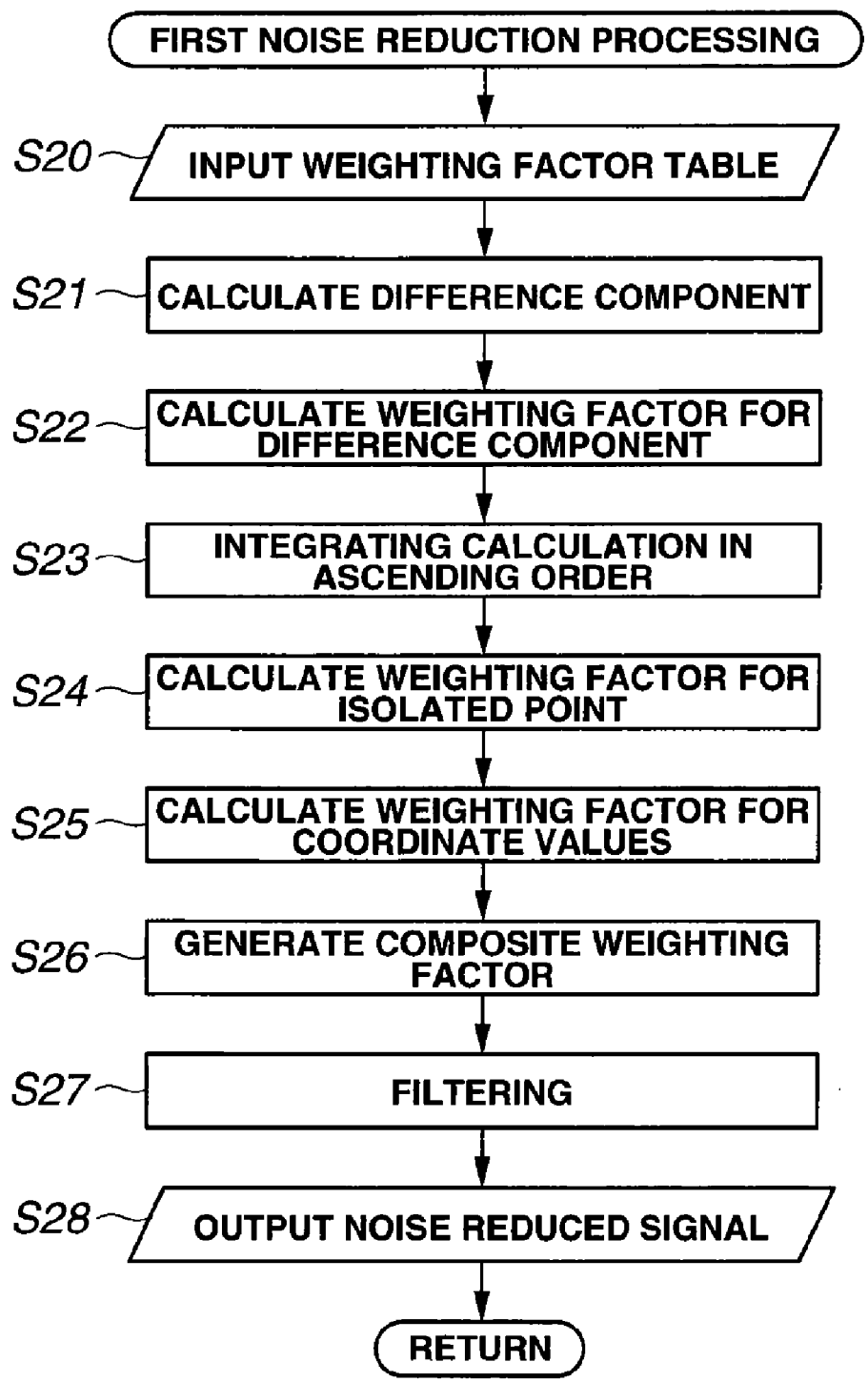
FIG. 22 is a flowchart which shows in detail the first noise reduction processing performed in S4 shown in FIG. 21, according to the embodiment 1.
Figure 23:
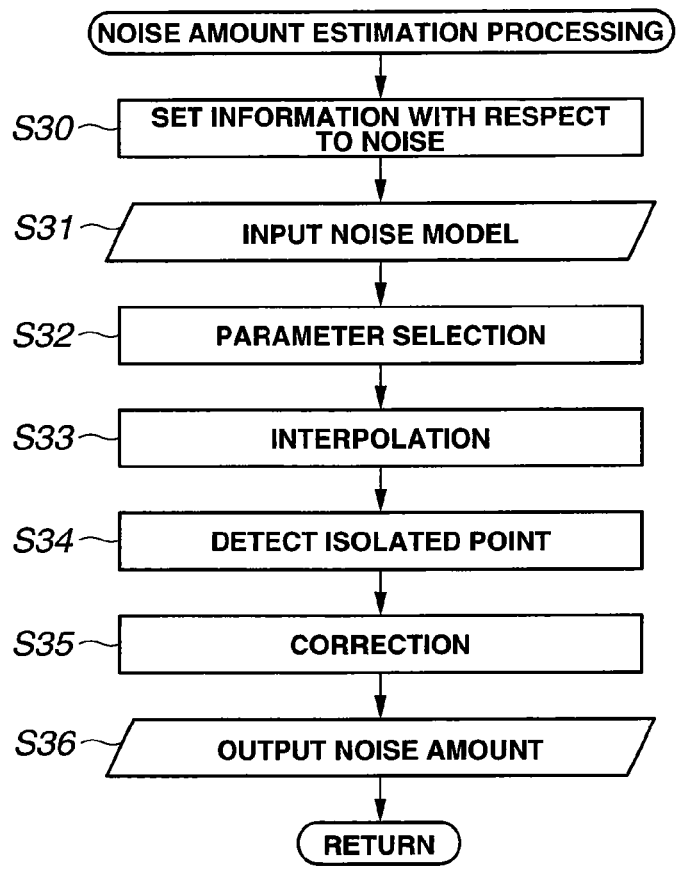
FIG. 23 is a flowchart which shows in detail the noise amount estimation processing performed in S5 shown in FIG. 21, according to the embodiment 1.
Figure 24:
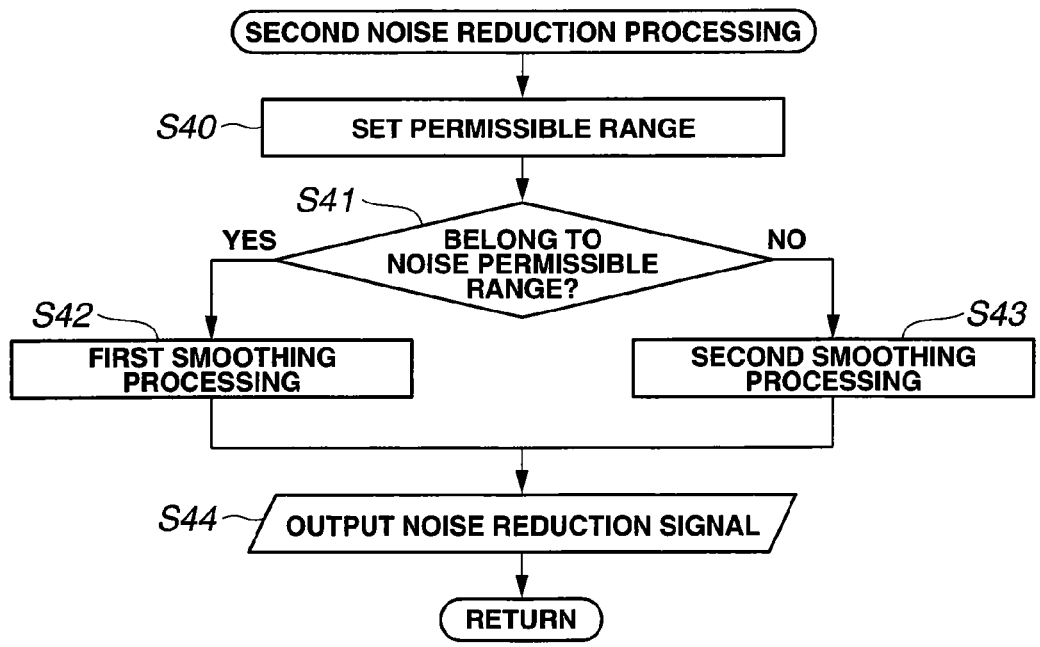
FIG. 24 is a flowchart which shows in detail the second noise reduction processing performed in S6 shown in FIG. 21, according to the embodiment 1.

FIG. 18 is a graph for describing a method for calculating the noise amount based upon the noise model thus simplified shown in FIG. 17. FIG. 19 is a block diagram which shows a configuration of a second noise reduction unit. FIG. 20 is a block diagram which shows a configuration of the image capturing system having an image capturing unit provided in the form of a separate unit. FIG. 21 is a flowchart which shows the overall flow of the processing according to an image processing program. FIG. 22 is a flowchart which shows in detail the flow of first noise reduction processing performed in S4 shown in FIG. 21. FIG. 23 is a flowchart which shows in detail the flow of noise amount estimation processing performed in S5 shown in FIG. 21. FIG. 24 is a flowchart which shows in detail the flow of second noise reduction processing performed in S6 shown in FIG. 21.

As shown in FIG. 1, the image capturing system includes a lens system 100, an aperture 101, a CCD 102, a temperature sensor 103, an amplifier unit 104, an A/D converter unit 105, a buffer 106, a pre-white balance unit 107, an exposure control unit 108, a focus control unit 109, an AF motor 110, and a color signal separation unit 111 which is color signal separating means, a buffer 112, an extraction unit 113 which is local region extracting means for extracting, a first noise reduction unit 114 which is first noise reducing means, a noise estimation unit 115 which is noise estimating means, a second noise reduction unit 116 which is second noise reducing means, a signal processing unit 117, an output unit 118, a control unit 119 which is acquiring means and signal control means, and an external I/F unit 120.

The analog image signal acquired and output via the lens system 100, the aperture 101, and the CCD 102 is amplified by the amplifier unit 104, and is converted into a digital signal by the A/D converter unit 105.

The image signal output from the A/D converter unit 105 is transmitted to the color signal separation unit 111 via the buffer 106. The buffer 106 is also connected to the pre-white balance unit 107, the exposure control unit 108, and the exposure control unit 109.

The pre-white balance unit 107 is connected to the amplifier unit 104. The exposure control unit 108 is connected to the aperture 101, the CCD 102, and the amplifier unit 104. The focus control unit 109 is connected to the AF motor 110.

The signal output from the color signal separation unit 111 is connected to the extraction unit 113 via the buffer 112. The extraction unit 113 is connected to the first noise reduction unit 114, the noise estimation unit 115, and the second noise reduction unit 116.

The first noise reduction unit 114 is connected to the noise estimation unit 115 and the second noise reduction unit 116. The noise estimation unit 115 is connected to the second noise reduction unit 116. The second noise reduction unit 116 is connected to an output unit 118 such as a memory card via the signal processing unit 117.

The control unit 119 is configured as a microcomputer, for example. The control unit 119 is bidirectionally connected to the amplifier unit 104, the A/D converter unit 105, the pre-white balance unit 107, the exposure control unit 108, the focus control unit 109, the color signal separation unit 111, the extraction unit 113, the first noise reduction unit 114, the noise estimation unit 115, the second noise reduction unit 116, the signal processing unit 117, and the output unit 118, and is configured so as to control these units.

Furthermore, the external I/F unit 120 is bidirectionally connected to the control unit 119. The external I/F unit 120 is an interface including a power switch, a shutter button, a mode button which allows various kinds of modes to be switched in the image capturing operation, and so forth.

Moreover, the signal output from the temperature sensor 103 is connected to the control unit 119. The temperature sensor 103, which essentially measures the temperature of the CCD 102, is arranged in the vicinity of the CCD 102.

Next, description will be made regarding the operation of the image capturing system as shown in FIG. 1 with reference to the flow of the image signal.

Before the image capturing operation, the user sets the image capturing conditions such as the ISO sensitivity via the external I/F unit 120.

Subsequently, the user half-presses a two-stage shutter button provided to the external I/F unit 120, whereupon the image capturing system enters the pre-image capturing mode.

The lens system 100 forms an optical image of the subject on the image capturing surface of the CCD 102.

The aperture 101 controls the range of the aperture through which passes the luminous flux from the subject, the image of which is formed by means of the lens system 100. This adjusts the luminance of the optical image formed on the image capturing surface of the CCD 102.

The CCD 102 performs photoelectric conversion of the optical image thus formed, and outputs the image in the form of an analog image signal.

It should be noted that description will be made assuming that a single CCD having a Bayer-type primary color filter arranged on the front face thereof is employed as the CCD 102.

Here, referring to FIG. 2, description will be made regarding the configuration of the Bayer-type primary color filter.

The Bayer-type primary color filter is formed of basic 2×2 pixel units. Each basic unit includes a red (R) filter and a blue (B) filter arranged at opposing corners. Furthermore, each basic unit includes two green (Gr and Gb) filters at the other opposing corners. It should be noted that the green filter Gr and the green filter Gb have the same optical properties. However, description will be made distinguishing therebetween for convenience of description of the processing. Here, the green filter arranged on the same line as the red (R) filter is referred to as the "Gr" filter. The green filter arranged on the same line as the blue (B) line will be referred to as the "Gb" filter.

The analog signal thus output from the CCD 102 is amplified by the amplifier unit 104 with a predetermined gain. Subsequently, the analog signal thus amplified is converted by the A/D converter unit 105 into a digital signal, and the digital signal thus converted is transmitted to the buffer 106. Here, in the present embodiment, the gradation width of the image signal thus converted into a digital signal is 12 bits, for example.

The image signal stored in the buffer 106 is transmitted to the pre-white balance unit 107, the exposure control unit 108, and the focus control unit 109.

The pre-white balance unit 107 calculates a simple white balance coefficient by integrating (adding) signals within a predetermined range for each color signal. The pre-white balance unit 107 transmits the simple white balance coefficient thus calculated to the amplifier unit 104, and performs simple white balance processing by instructing the amplifier unit 104 to multiply the signal by a gain which is changed according to the color of the signal.

The exposure control unit 108 controls the aperture value of the aforementioned aperture 101, the electronic shutter speed of the CCD 102, the gain of the amplifier unit 104, and so forth, so as to provide a suitable exposure, based upon the image signal, giving consideration to the ISO sensitivity thus set, the camera shake shutter speed limit, and so forth.

Furthermore, the focus control unit 109 detects the edge magnitude in the image signal, and acquires a focus signal by controlling the AF motor 110 such that the edge magnitude exhibits the maximum value.

After the simple white balance processing, focus adjustment, exposure adjustment, and so forth are thus performed, when the user full-presses the shutter button provided in the external I/F unit 120 in the form of a two-stage switch, the image capturing system enters the real-image-capturing mode.

Subsequently, as in the pre-image capturing operation, the image signal is transmitted to the buffer 106. The real-image-capturing operation is performed based upon the simple white balance coefficient obtained by the pre-white balance unit 107, the exposure conditions obtained by the exposure control unit 108, and the focus conditions obtained by the focus control unit 109. These conditions used in the image capturing operation are transmitted to the control unit 119.

The image signal obtained in the real-image-capturing operation and subsequently stored in the buffer 106 is transmitted to the color signal separation unit 111.

Under the control of the control unit 119, the color signal separation unit 111 separates the image signal thus transmitted into color signals corresponding to the colors of color filters employed in the CCD 102. That is to say, in the present embodiment, the color signal separation unit 111 separates the image signal into four kinds of color signals, i.e., an R-color signal as shown in FIG. 3, a Gr-color signal as shown in FIG. 4, a Gb-color signal as shown in FIG. 5, and a B-color signal as shown in FIG. 6. Subsequently, the color separation unit 111 transmits these color signals thus separated to the buffer 112.

Under the control of the control unit 119, the extraction unit 113 sequentially extracts a local region including the target pixel which is to be subjected to noise reduction processing and the neighboring pixels located in the vicinity of the target pixel. The extraction unit 113 transmits the local region thus extracted to the first noise reduction unit 114, the noise estimation unit 115, and the second noise reduction unit 116.

Here, in the present embodiment, the extraction unit 113 extracts, as a local region, a 5×5 pixel region including the target pixel as the center pixel, as shown in FIG. 3 through FIG. 6. With such an arrangement, the noise reduction processing is performed for each pixel. Accordingly, the aforementioned 5×5 pixel local regions are sequentially extracted by shifting the pixel position of the target pixel in one pixel. Accordingly, a local region with respect to a target pixel at a given position and a new local region with respect to a new target pixel at a position shifted from the former target pixel by one pixel overlap by a four-pixel row or a four-pixel column. It should be noted that the aforementioned extraction is independently performed for each color signal. The pixel value in the local region will be represented by $C_{ij}$. ("C" represents a color signal which is R, Gr, Gb, or B, "i" represents the X-coordinate index (horizontal coordinate index) in a range of 0 to 4, and "j" represents the Y-coordinate index (vertical coordinate index) in a range of 0 to 4.) According to this notation, in a case in which the local region is a 5×5 pixel region, the target pixel is represented by $C_{22}$.

Under the control of the control unit 119, the first noise reduction unit 114 performs predetermined adaptive noise reduction processing on the target pixel in the local region transmitted from the extraction unit 113, and transmits the target pixel value $C'_{22}$ thus subjected to the noise reduction processing to the noise estimation unit 115 and the second noise reduction unit 116.

Under the control of the control unit 119, the noise estimation unit 115 estimates the noise amount $N_{22}$ with respect to the target pixel based upon the local region transmitted from the extraction unit 113, the target pixel value which has been subjected to the noise reduction processing and which has been transmitted from the first noise reduction unit 114, and the image capturing conditions transmitted from the control unit 119. Subsequently, the noise estimation unit 115 transmits the noise amount thus estimated to the second noise reduction unit 116.

Under the control of the control unit 119, the second noise reduction unit 116 performs second noise reduction processing on the target pixel (target pixel value $C_{22}$) transmitted from the extraction unit 113, based upon the target pixel value $C'_{22}$ thus subjected to the noise reduction processing and transmitted from the first noise reduction unit 114, and the noise amount $N_{22}$ transmitted from the noise estimation unit 115, thereby calculating the target pixel value $C''_{22}$ thus subjected to the noise reduction processing. Subsequently, the second noise reduction unit 116 transmits the target pixel value $C''_{22}$ thus calculated to the signal processing unit 117.

It should be noted that the aforementioned processing steps performed by the extraction unit 113, the first noise reduction unit 114, the noise estimation unit 115, and the second noise reduction unit 116 are performed synchronously for each local region under the control of the control unit 119.

Under the control of the control unit 119, the signal processing unit 117 performs known interpolation processing, enhancement processing, compression processing, etc., on the image signal thus subjected to the noise reduction processing, and transmits the image signal thus processed to the output unit 118.

The output unit 118 stores the image signal in a recording medium such as a memory card.

Next, description will be made regarding an example of the configuration of the first noise reduction unit 114 with reference to FIG. 12.

The first noise reduction unit 114 includes a bit shift unit 200 which is weighting factor calculating means and bit shift means, a first buffer 201, a difference component calculation unit 202 which is weighting factor calculating means, a second buffer 203, a difference component table 204 which provides functions as weighting factor calculating means, table means, and first table means, an ascending-order integrating unit 205, an isolated-point table 206 which is weighting factor calculating means and third table means, a coordinate table 207 which is weighting factor calculating means and second table means, a composite weighting factor generating unit 208 which is weighting factor calculating means and composite weighting factor generating means, and a filtering unit 209 which is filtering means.

The extraction unit 113 is connected to the bit shift unit 200 and the filtering unit 209. The bit shift unit 200 is connected to the second buffer 203 via the first buffer 201 and the difference component calculation unit 202. The second buffer 203 is connected to the difference component table 204 and the ascending-order integrating unit 205. The ascending-order integrating unit 205 is connected to the isolated-point table 206. The difference component table 204, the isolated-point table 206, and the coordinate table 207 are connected to the composite weighting factor generating unit 208. The composite weighting factor generating unit 208 is connected to the filtering unit 209. The filtering unit 209 is connected to the noise estimation unit 115 and the second noise reduction unit 116.

The control unit 119 is bidirectionally connected to the bit shift unit 200, the difference component calculation unit 202, the difference component table 204, the ascending-order integrating unit 205, the isolated-point table 206, the coordinate table 207, the composite weighting factor generating unit 208, and the filtering unit 209, and is configured so as to control these units.

Under the control of the control unit 119, the bit shift unit 200 performs extraction processing in which a predetermined number of higher-order bits are extracted with respect to the target pixel value and the neighboring pixel values within the local region transmitted from the extraction unit 113. As described above, description will be made in the present embodiment assuming that the A/D converter unit 105 provides a digital signal with a gradation width of 12 bits. In this case, for example, the bit shift unit 200 eliminates a small fluctuation component by performing bit-shift processing for the lower seven bits, thereby converting the signal into a 5-bit signal. The bit shift unit 200 transmits the 5-bit signal thus converted to the first buffer 201.

The difference component calculation unit 202 reads out, from the first buffer 201, the signal in the local region thus subjected to the bit-shift processing. As indicated by the following Equation 1, the difference component calculation unit 202 calculates the absolute value $\Delta_{ij}$ of the difference component between the pixel value $C_{ij}$ and the target pixel value $C_{22}$ in the local region.

$$\Delta_{ij} = |C_{ij} - C_{22}| \qquad \text{[Equation 1]}$$

Subsequently, the difference component calculation unit 202 transmits the absolute value $\Delta_{ij}$ of the difference component thus calculated to the second buffer 203.

Under the control of the control unit 119, in the difference component table 204, the absolute value $\Delta_{ij}$ of the difference component is read out from the second buffer 203, and a first weighting factor $w1_{ij}$ is obtained with respect to the absolute value $\Delta_{ij}$ of the difference component with reference to a table. The table stored in the difference component table 204 is provided beforehand by calculation based upon the functional equation as shown in the following Equation 2, for example.

$$w1_{ij} = e^{-\frac{\Delta_{ij}^2}{2\sigma1^2}} \qquad \text{[Equation 2]}$$

Here, σ1 is an adjusting parameter. A value of on the order of 1 to 10 is used as σ1.

It should be noted that, in the present embodiment, the absolute value $\Delta_{ij}$ of the difference component is a 5-bit signal (which has a signal value of 0 to 31), as described above. Accordingly, the table size of the difference component table is 32 items.

Subsequently, the difference component table 204 transmits the first weighting factor $w1_{ij}$ thus obtained to the composite weighting factor generating unit 208.

Under the control of the control unit 119, the ascending-order integrating unit 205 reads out the absolute values $\Delta_{ij}$ of the difference components from the second buffer 203, and sorts the absolute values $\Delta_{ij}$ in ascending order, following which the ascending-order integrating unit 205 calculates the integrated value R by integrating a predetermined number m of the sorted absolute values $\Delta_{ij}$, starting with the minimum value.

$$R = \sum_{k=1,m} S_k(\Delta_{ij}) \qquad \text{[Equation 3]}$$

Here, the symbol "Sk( )" represents a function which provides the value of the k-th absolute value thus sorted in ascending order. The number "m" represents a number which defines the number of neighboring pixels used to detect the degree of whether or not the target pixel is to be handled as an isolated point. For example, a value on the order of half the total number of pixels to be used is employed as "m". Accordingly, in the present embodiment, which employs a local region of 5×5=25 pixels, "m" is set to on the order of 12.

The integrated value R is obtained by adding the absolute values $\Delta_{ij}$ of the predetermined number m of the difference components of which the pixel values are closer to that of the target value. Accordingly, a small value of the integrated value R indicates that there is strong correlation between the target pixel and the neighboring pixels. On the other hand, a large value of the integrated value R indicates that there is a strong possibility that the target pixel is an isolated point.

Subsequently, the ascending-order integrating unit 205 transmits the integrated value R thus calculated and the absolute values $\Delta_{ij}$ of the difference components read out from the second buffer 203 to the isolated-point table 206.

In the isolated-point table 206, a second weighting factor w2 with respect to the integrated value R and the mixing factors $\epsilon_{ij}$ with respect to the absolute values $\Delta_{ij}$ of the difference components are obtained with reference to the table under the control of the control unit 119.

Here, the table for the second weighting factor w2, which is stored in the isolated-point table 206, is calculated beforehand based upon the functional equation as shown in the following Equation 4.

$$w2 = e^{-\frac{R^2}{2\sigma 2^2}} \qquad [\text{Equation 4}]$$

Here, σ2 is an adjusting parameter. A value of on the order of 25 to 50 is used as σ2.

Moreover, the table for the mixing factors $\epsilon_{ij}$, which is stored in the isolated-point table 206, is calculated beforehand based upon the functional equation as shown in the following Equation 5.

$$\varepsilon_{ij} = 1 - e^{-\frac{\left(\frac{\Delta_{ij}}{2}\right)^2}{2\sigma 3^2}} \qquad [\text{Equation 5}]$$

Here, σ3 is an adjusting parameter. A value of on the order of 30 to 60 is used as σ3. The mixing factors $\epsilon_{ij}$ can be set in a range of 0 to 1.

The mixing factor $\epsilon_{ij}$ defines the mixing ratio for mixing the first weighting factor w1$_{ij}$ and the second weighting factor w2.

It should be noted that, in the present embodiment, the absolute value $\Delta_{ij}$ of the difference component is a 5-bit signal, and m is set to 12, as described above. Accordingly, a table for the second weighting factor w2 requires a table size of 384 (5-bits×12). Furthermore, a table for the mixing factors $\epsilon_{ij}$ requires a table size of 32 (5-bits). Accordingly, there is a need to provide a table with a total table size of 416.

Subsequently, the isolated-point table 206 transmits the second weighting factor w2 thus obtained and the mixing factors $\epsilon_{ij}$ to the composite weighting factor generating unit 208.

Furthermore, in the coordinate table 207, a third weighting factor w3$_{ij}$ with respect to the coordinate values (i, j) of each pixel within the local region is obtained with reference to the table under the control of the control unit 119. Here, the table for the third weighting factors w3$_{ij}$, which are stored in the coordinate table 207, is calculated beforehand based upon the functional equation, for example, as shown in the following Equation 6.

$$w3_{ij} = e^{-\frac{(i-T_i)^2 + (j-T_j)^2}{2\sigma 4^2}} \qquad [\text{Equation 6}]$$

Here, σ4 is an adjusting parameter. A value of on the order of 1 to 10 is used as σ4. The symbol "$T_i$" represents the X-coordinate of the target pixel, and the symbol "$T_j$" represents the Y-coordinate of the target pixel. Accordingly, in the present embodiment which employs a 5×5 pixel area local region, $T_i$ is 2, and $T_j$ is 2.

It should be noted that, in the present embodiment, the size of the local region is 5×5 pixels. Accordingly, such an arrangement requires a coordinate table 207 having a table size of 25 items.

Subsequently, the coordinate table 207 transmits the third weighting factors w3$_{ij}$ thus obtained to the composite weighting factor generating unit 208.

Under the control of the control unit 119, the composite weighting factor generating unit 208 calculates the weighting factors w$_{ij}$ based upon the first weighting factor w1$_{ij}$ read out from the difference component table 204, the second weighting factor w2 and the mixing factors $\epsilon_{ij}$ read out from the isolated-point table 206, and the third weighting factors w3$_{ij}$ read out from the coordinate table 207, as represented by the following Equation 7.

$$w_{ij} = (1-\epsilon_{ij}) \cdot w1_{ij} \cdot \epsilon_{ij} w2 \cdot w3_{ij} \qquad [\text{Equation 7}]$$

Subsequently, the composite weighting factor generating unit 208 transmits the weighting factors w$_{ij}$ thus calculated to the filtering unit 209.

Under the control of the control unit 119, the filtering unit 209 performs filtering processing on the local region transmitted from the extraction unit 113, using the weighting factors w$_{ij}$ transmitted from the composite weighting factor generating unit 208, as represented by the following Equation 8, thereby calculating the target pixel value C'$_{22}$ subjected to the noise reduction processing.

$$C'_{22} = \frac{\sum_{i=0,4\,j=0,4}(w_{ij} \cdot C_{ij})}{\sum_{i=0,4\,j=0,4} w_{ij}} \qquad [\text{Equation 8}]$$

It should be noted that, as can be understood from the Equation 8, the filtering processing performed by the filtering unit 209 includes a step for performing normalization using the sum total of the weighting factors w$_{ij}$.

Subsequently, the filtering unit 209 transmits the target pixel value C'$_{22}$ thus subjected to the noise reduction processing to the noise estimation unit 115 and the second noise reduction unit 116.

It should be noted that the first noise reduction unit 114 having such a configuration shown in FIG. 12 generates a composite weighting factor based upon the three weighting factors so as to perform the filtering processing. However, the present invention is not limited to such an arrangement. For example, the first noise reduction unit 114 may have a configuration employing a smaller number of kinds of weighting factors.

FIG. 13 shows an example configuration obtained by eliminating the ascending-order integrating unit 205 and the isolated-point table 206 from the configuration of the first noise reduction unit 114 as shown in FIG. 12. With such an arrangement, a composite weighting factor is generated based upon two weighting factors. In this case, the composite weighting factor generating unit 208 calculates the weighting factor $w_{ij}$ based upon the following Equation 9.

$$w_{ij}=w1_{ij} \cdot w3_{ij}$$ [Equation 9]

Also, FIG. 14 shows an example configuration obtained by eliminating the ascending-order integrating unit 205, the isolated-point table 206, the coordinate table 207, and the composite weighting factor generating unit 208 from the configuration of the first noise reduction unit 114 as shown in FIG. 12. With such an arrangement, a composite weighting factor is generated based upon a single weighting factor. It should be noted that, with such a configuration shown in FIG. 14, the difference component table 204 is connected to the filtering unit 209. In this case, the first noise reduction unit 114 uses $w1_{ij}$ as the weighting factor $w_{ij}$.

In a case in which the configuration shown in FIG. 13 or FIG. 14 is employed, such an arrangement provides low cost and high-speed processing.

Next, description will be made regarding an example of the configuration of the noise estimation unit 115 with reference to FIG. 15.

The noise estimation unit 115 includes a gain calculation unit 300 which is acquiring means, a standard-value providing unit 301 which is providing means, parameter storage ROM 302 which is parameter storing means, a parameter selection unit 303 which is parameter selecting means, an interpolation unit 304 which is interpolating means, a correction unit 305 which is interpolating means and correcting means, a buffer 306, and an isolated-point detection unit 307 which is isolated-point detecting means.

The extraction unit 113 is connected to the isolated-point detection unit 307 via the buffer 306. The first noise reduction unit 114, the gain calculation unit 300, the standard-value providing unit 301, and the parameter storage ROM 302 are connected to the parameter selection unit 303. The parameter selection unit 303 is connected to the interpolation unit 304 and the correction unit 305. Furthermore, the interpolation unit 304 and the isolated-point detection unit 307 are connected to the correction unit 305. The correction unit 305 is connected to the second noise reduction unit 116.

The control unit 119 is bidirectionally connected to the gain calculation unit 300, the standard-value providing unit 301, the parameter selection unit 303, the interpolation unit 304, the correction unit 305, and the isolated-point detection unit 307, and is configured so as to control these units.

The first noise reduction unit 114 transmits the target pixel value $C'_{22}$, for which noise has been reduced by the filtering processing, to the parameter selection unit 303 under the control of the control unit 119.

The gain calculation unit 300 calculates the gain which is to be set for the amplifier unit 104, based upon the information with respect to the ISO sensitivity and the exposure conditions transmitted from the control unit 119, and transmits the gain thus obtained to the parameter selection unit 303.

Furthermore, the control unit 119 acquires the temperature information with respect to the CCD 102 from the temperature sensor 103, and transmits the temperature information thus acquired to the parameter selection unit 303.

In order to estimate the noise amount, the parameter selection unit 303 performs parameter selection based upon the target pixel value $C'_{22}$ subjected to the noise reduction processing and transmitted from the first noise reduction unit 114, the gain information transmitted from the gain calculation unit 300, and the temperature information transmitted from the control unit 119.

Now, description will be made regarding the noise amount estimation performed by the parameter selection unit 303, the interpolation unit 304, and the correction unit 305, with reference to FIG. 16 through FIG. 18.

FIG. 16 is a graph in which the estimated noise amount N is plotted against the signal level L. As shown in the drawing, the noise amount N increases according to the signal level L in a quadratic-curve manner, for example. The change in the noise amount N as shown in FIG. 16 can be modeled using a quadratic function, as represented by the following Equation 10, for example.

$$N=\alpha L^2+\beta L+\gamma$$ [Equation 10]

Here, the symbols "$\alpha$", "$\beta$", and "$\gamma$" represent constant terms which define the shape of the quadratic function curve.

It should be noted that the noise amount N does not depend on only the signal level L. Also, the noise amount N changes according to the temperature of the image-capturing device and the gain thereof. FIG. 16 is a graph in which the noise amounts are plotted, at a certain temperature, against three ISO sensitivities 100, 200, and 400, which are associated with the gain, as an example.

The shape of each curve shown in FIG. 16 is represented by the Equation 10.

The constant terms thereof, i.e., $\alpha$, $\beta$, and $\gamma$, change according to the ISO sensitivity, which is associated with the gain. Furthermore, the constant terms $\alpha$, $\beta$, and $\gamma$ also change according to the temperature. Accordingly, with the temperature as t, and with the gain as g, the noise model can be represented by the following Equation 11, giving consideration to the dependence on the temperature t and the gain g.

$$N=\alpha_{gt}L^2+\beta_{gt}L+\gamma_{gt}$$ [Equation 11]

Here, the symbols "$\alpha_{gt}$", "$\beta_{gt}$", and "$\gamma_{gt}$" represent constant terms which define the shape of the quadratic function curve, and which are determined depending on the temperature t and the gain g, as described above.

However, an arrangement in which multiple functions as shown in FIG. 11 are stored in association with combinations of temperature t and gain g, and in which each noise amount is calculated by calculation, leads to troublesome processing. In order to solve such a problem, the noise model is simplified as shown in FIG. 17.

In the simplified model, first, the noise model which provides the maximum noise amount is selected as a reference noise model. The reference noise model is approximated by a polygonal line having a predetermined number of nodes (see the polygonal indicated by the solid line shown in FIG. 17).

Each inflection point on the polygonal line is represented by coordinate data ($L_n$, $N_n$) with the signal level L and the noise amount N as the coordinate components. Here, n is a number which indicates, in ascending order, where the inflection point is positioned.

Furthermore, in the simplified model, correction coefficients $k_{gt}$ are provided for deriving other noise models based upon the aforementioned reference noise model. These correction coefficients $k_{gt}$ are calculated beforehand based upon the relation between each noise model and the reference noise model using the least square method. The correction coefficients $k_{gt}$ are stored beforehand in the parameter storage ROM 302.

In order to derive a different noise model based upon the reference noise model, the parameter storage ROM 302 is searched for the correction coefficient $k_{gt}$ that corresponds to the temperature t and the gain g, and the reference noise model is multiplied by the correction coefficient $k_{gt}$ thus obtained.

Description will be made regarding a method for calculating the noise amount based upon the simplified noise model as shown in FIG. 17.

Let us assume that, with the given signal level as 1, with the gain as g, and with the temperature as t, the noise amount N that corresponds to these conditions is calculated.

In this case, first, such an arrangement detects the interval in the reference noise model to which the signal level l belongs. Here, let us assume that the signal level l belongs to the interval between the nodes $(L_n, N_n)$ and $(L_{n+1}, N_{n+1})$, for example. In this case, the reference noise amount $N_1$ based upon the reference noise model is calculated by linear interpolation as represented by the following Equation 12.

$$N_1 = \frac{N_{n+1} - N_n}{L_{n+1} - L_n}(l - L_n) + N_n \quad \text{[Equation 12]}$$

Next, the noise amount N is calculated by multiplying the reference noise amount $N_1$ by the correction coefficient $k_{gt}$, as represented by the following Equation 13.

$$N = k_{gt} \cdot N_1 \quad \text{[Equation 13]}$$

According to such a mechanism, the noise amount is estimated as follows by the parameter selection unit 303, the interpolation unit 304, and the correction unit 305.

That is to say, first, the parameter selection unit 303 sets the signal level l based upon the target pixel value $C'_{22}$ subjected to the noise reduction processing and transmitted from the first noise reduction unit 114, the gain g based upon the gain information transmitted from the gain calculation unit 300, and the temperature t based upon the temperature information transmitted from the control unit 119.

Next, the parameter selection unit 303 searches the parameter storage ROM 302 for the coordinate data set for the interval to which the signal level l belongs, i.e., $(L_n, N_n)$ and $(L_{n+1}, N_{+1})$, and transmits the coordinate data set to the interpolation unit 304.

Furthermore, the parameter selection unit 303 searches the parameter storage ROM 302 for the correction coefficient $k_{gt}$ that corresponds to the gain g and the temperature t, and transmits the correction coefficient $k_{gt}$ thus obtained to the correction unit 305.

Subsequently, under the control of the control unit 119, the interpolation unit 304 calculates the reference noise amount $N_1$ according to the reference noise model based upon the signal level l transmitted from the parameter selection unit 303 and the coordinate data set for the interval, i.e., $(L_n, N_n)$ and $(L_{n+1}, N_{n+1})$, using the Equation 12. Then, the interpolation unit 304 transmits the reference noise amount $N_1$ thus calculated to the correction unit 305.

Subsequently, under the control of the control unit 119, the correction unit 305 calculates the noise amount N based upon the correction coefficient $k_{gt}$ transmitted from the parameter selection unit 303 and the reference noise amount $N_1$ transmitted from the interpolation unit 304, using the Equation 13.

Furthermore, the extraction unit 113 transmits the local region to the buffer 306 under the control of the control unit 119.

The isolated-point detection unit 307 detects whether or not the target pixel positioned within the local region is an isolated point with respect to the local region stored in the buffer 306. This detection is performed based upon the magnitude correlation between the target pixel and the eight neighboring pixels surrounding the target pixel. In the present embodiment, a 5×5 pixel local region is employed, as shown in FIG. 3 through FIG. 6. In a case in which either the condition represented by Equation 14 or the condition represented by Equation 15 is satisfied with respect to the local region, the isolated-point detection unit 307 judges that an isolated point has been detected. On the other hand, in a case in which neither the condition represented by Equation 14 nor the condition represented by Equation 15 is satisfied, the isolated-point detection unit 307 judges that an isolated point has not been detected.

$$C_{22} > C_{11}, C_{22} > C_{21}, C_{22} > C_{31}, C_{22} > C_{12}, C_{22} > C_{32},$$
$$C_{22} > C_{13}, C_{22} > C_{23}, \text{ and } C_{22} > C_{33} \quad \text{[Equation 14]}$$

$$C_{22} < C_{11}, C_{22} < C_{21}, C_{22} < C_{31}, C_{22} < C_{12}, C_{22} < C_{32},$$
$$C_{22} < C_{13}, C_{22} < C_{23}, \text{ and } C_{22} < C_{33} \quad \text{[Equation 15]}$$

Here, Equation 14 is a conditional equation which represents a condition in which the target pixel value $C_{22}$ is larger than the pixel values of all the eight surrounding neighboring pixels, and Equation 15 is a conditional equation which represents a condition in which the target pixel value $C_{22}$ is smaller than the pixel values of all the eight surrounding neighboring pixels.

Subsequently, the isolated-point detection unit 307 transmits the result of the isolated point detection to the correction unit 305.

Only in a case in which a judgment result that an isolated point has been detected has been transmitted from the isolated-point detection unit 307, the correction unit 305 multiplies the noise amount N by a predetermined correction coefficient ki, which is in a range of 1.5 to 4, for example, under the control of the control unit 119.

Subsequently, the correction unit 305 transmits the noise amount N thus corrected to the second noise reduction unit 116 as the noise amount $N_{22}$ estimated for the target pixel value $C_{22}$.

It should be noted that, with such an arrangement described above, information such as the temperature t, and the gain g is obtained every time an image is acquired, and the information thus obtained is used to calculate the noise amount. However, the present invention is not limited to such an arrangement. For example, an arrangement may be made in which desired information is stored beforehand in the standard-value providing unit 301, and the information thus stored in the standard-value providing unit 301 is read out and used in the step for calculating the noise amount, thereby eliminating the calculation steps. Such an arrangement provides high-speed processing and reduced power consumption.

Next, description will be made regarding an example of the configuration of the second noise reduction unit 116 with reference to FIG. 19.

The second noise reduction unit 116 includes a range setting unit 400 which is noise range setting means, a switching unit 401, a first smoothing unit 402 which is first smoothing means, and a second smoothing unit 403 which is second smoothing means.

The first noise reduction unit 114 and the noise estimation unit 115 are connected to the range setting unit 400. The range setting unit 400 is connected to the switching unit 401, the first smoothing unit 402, and the second smoothing unit 403. The extraction unit 113 is connected to the switching unit 401. The switching unit 401 is connected to the first smoothing unit 402 and the second smoothing unit 403. The first smoothing unit 402 and the second smoothing unit 403 are connected to the signal processing unit 117.

The control unit 119 is bidirectionally connected to the range setting unit 400, the switching unit 401, the first smoothing unit 402, and the second smoothing unit 403, and is configured so as to control these units.

The first noise reduction unit 114 transmits the target pixel value $C'_{22}$ subjected to the first noise reduction processing to the range setting unit 400. Furthermore, the noise estimation unit 115 transmits the noise amount $N_{22}$ estimated with respect to the target pixel to the range setting unit 400.

Under the control of the control unit 119, the range setting unit 400 sets the upper limit Up and the lower limit Low of the permissible range for the noise amount, as represented by the following Equation 16.

$$Up = C'_{22} + N_{22}/2$$

$$Low = C'_{22} - N_{22}/2 \quad \text{[Equation 16]}$$

Subsequently, the range setting unit 400 transmits the upper limit Up and the lower limit Low thus set to the switching unit 401. Furthermore, the range setting unit 400 transmits the noise amount $N_{22}$ and the target pixel value $C'_{22}$ subjected to the first noise reduction processing to the first smoothing unit 402 and the second smoothing unit 403.

Under the control of the control unit 119, the switching unit 401 reads out the target pixel value $C_{22}$ from the extraction unit 113, and judges whether or not the target pixel value $C_{22}$ is within the permissible range transmitted from the range setting unit 400. The judgment result is one of three possible results: "the target pixel value $C_{22}$ belongs to the noise range", "the target pixel value $C_{22}$ is higher than the noise range", and "the target pixel value $C_{22}$ is lower than the noise range".

Then, in a case in which judgment has been made that the target pixel value $C_{22}$ belongs to the permissible noise range, the switching unit 401 transmits the target pixel value $C_{22}$ to the first smoothing unit 402. Otherwise, the switching unit 401 transmits the target pixel value $C_{22}$ to the second smoothing unit 403.

In a case in which the switching unit 401 has transmitted the target pixel value $C_{22}$ to the first smoothing unit 402, the first smoothing unit 402 substitutes the target pixel value $C'_{22}$, which has been subjected to the first noise reduction processing and which has been transmitted from the range setting unit 400, for the target pixel value $C''_{22}$ subjected to the second noise reduction processing, as represented by Equation 17.

$$C''_{22} = C'_{22} \quad \text{[Equation 17]}$$

Subsequently, the first smoothing unit 402 transmits the target pixel value $C''_{22}$ subjected to the second noise reduction processing to the signal processing unit 117.

Also, in a case in which the switching unit 401 has transmitted the target pixel value $C_{22}$ to the second smoothing unit 403, the second smoothing unit 403 performs correction processing on the target pixel value $C_{22}$ based upon the noise amount $N_{22}$ transmitted from the range setting unit 400.

That is to say, in a case in which judgment has been made that the target pixel value $C_{22}$ is higher than the permissible noise range, the second smoothing unit 403 corrects the target pixel value $C_{22}$ as represented by the following Equation 18, thereby calculating the target pixel value $C''_{22}$ subjected to the second noise reduction processing.

$$C''_{22} = C_{22} - N_{22}/2 \quad \text{[Equation 18]}$$

On the other hand, in a case in which judgment has been made that the target pixel value $C_{22}$ is lower than the permissible noise range, the second smoothing unit 403 corrects the target pixel value $C_{22}$ as represented by the following Equation 19, thereby calculating the target pixel value $C''_{22}$ subjected to the second noise reduction processing.

$$C''_{22} = C_{22} + N_{22}/2 \quad \text{[Equation 19]}$$

Subsequently, the second smoothing unit 403 transmits the target pixel value $C''_{22}$ thus subjected to the second noise reduction processing, performed by calculation according to Equation 18 or Equation 19, to the signal processing unit 117.

It should be noted that description has been made above regarding an arrangement employing a Bayer-type primary color filter. However, the present invention is not limited to such an arrangement. For example, an arrangement may be made employing a color-difference line-sequential type complementary color filter as shown in FIG. 7. Also, an arrangement may be made employing two image capturing devices or three image capturing devices. For example, in the case of employing an arrangement using a color-difference line-sequential type complementary color filter as shown in FIG. 7, the color signal separation unit 111 separates the image signal transmitted from the image capturing device into four kinds of color signals, i.e., a Cy-color (cyan) signal as shown in FIG. 8, a Ye-color (yellow) signal as shown in FIG. 9, a G-color (green) signal as shown in FIG. 10, and a Mg-color (magenta) signal as shown in FIG. 11. Then, the extraction unit 113 sets 5×5 pixel local regions with the target pixel as the center, as shown in FIG. 8 through FIG. 11. The symbol "C", which is used in the symbol "$C_{ij}$" which represents the pixel value within the local region, represents "Cy", "Mg", "Ye", and "G".

Description has been made above regarding an image capturing system having a configuration in which an image capturing unit including the lens system 100, the aperture 101, the CCD 102, the temperature sensor 103, the amplifier unit 104, the A/D converter unit 105, the pre-white balance unit 107, the exposure control unit 108, the focus control unit 109, and the AF motor 110 are integrated. However, the present invention is not limited to such an arrangement. Also, as shown in FIG. 20, the image capturing unit may be provided in the form of a separate unit. That is to say, the image capturing system shown in FIG. 20 is configured such that an image is acquired by the image capturing unit provided in the form of a separate unit, and an image signal stored in the form of unprocessed Raw data in a recording medium such as a memory card or the like is read from the recording medium and the Raw data thus read out is processed. It should be noted that, with such an arrangement, additional information such as the temperature of the image capturing device, and exposure conditions in the image capturing operation is stored in the header or the like. It should be noted that the present invention is not limited to such an arrangement in which transmission of various kinds of information from the image capturing device provided in the form of a separate unit to the image capturing system is performed via a recording medium. Also, data transmission may be performed via a communication line.

The image capturing system shown in FIG. 20 has a configuration obtained by eliminating the lens system 100, the aperture 101, the CCD 102, the temperature sensor 103, the amplifier unit 104, the A/D converter unit 105, the pre-white balance unit 107, the exposure control unit 108, the focus control unit 109, and the AF motor 110 from the image capturing system shown in FIG. 1, and by adding an input unit 500 and a header information analyzing unit 501 to the image capturing system shown in FIG. 1. The other basic components included in the image capturing system shown in FIG. 20 are the same as those shown in FIG. 1. Accordingly, the same components will be referred to by the same names and will be denoted by the same reference numerals, and description thereof will be omitted as appropriate. Description will be made mainly regarding the differences in the configuration.

The input unit 500 is connected to the buffer 106 and the header information analyzing unit 501. The control unit 119 is bidirectionally connected to the input unit 500 and the header information analyzing unit 501, and is configured so as to control these units.

Next, description will be made below regarding a different operation of the image capturing system shown in FIG. 20.

For example, when a playback operation is started via an external I/F unit 120 such as a mouse, or keyboard the image signal and the header information stored in the recording medium such as a memory card are read out via the input unit 500.

Of the information read out via the input unit 500, the image signal is transmitted to the buffer 106, and the header information is transmitted to the header information analyzing unit 501.

The header information analyzing unit 501 extracts the information with respect to the image capturing operation (i.e., the exposure conditions, the temperature of the image capturing device, etc., as described above) based upon the header information transmitted from the input unit 500, and transmits the information thus extracted to the control unit 119.

The subsequent steps are the same as those performed by the image capturing system as shown in FIG. 1.

Description has been made above regarding an arrangement in which the processing is performed by means of hardware. However, the present invention is not limited to such an arrangement. For example, an arrangement may be made in which the image signal transmitted from the CCD 102 is stored in the form of unprocessed Raw data in the recording medium such as a memory card, and the additional information such as image capturing conditions (e.g., the temperature of the image capturing device, and exposure conditions transmitted from the control unit 190) is stored in the recording medium as header information. With such an arrangement, a computer may be instructed to read a computer readable recording medium for recording an image processing program provided in the form of a software component and execute the image processing program so as to read out the Raw data and the header information stored in the recording medium and to process the image signal. It should be noted that the present invention is not limited to such an arrangement in which transmission of various kinds of information from the image capturing device to the computer is performed via a recording medium. Also, data transmission may be performed via a communication line or the like.

Referring to FIG. 21, description will be made regarding the overall flow of the process performed according to the image processing program.

When the processing is started, first, an image signal is read out, and the header information such as the temperature of the image capturing device, and the exposure conditions is read out (Step S1).

Next, the image signal is separated into color signals corresponding to the colors of the color filters employed in the image capturing device (Step S2).

Subsequently, as shown in FIG. 3 through FIG. 6, the local regions are extracted with the target pixel as the center (Step S3).

Then, the first noise reduction processing is performed on the target pixel as described later with reference to FIG. 22 (Step S4).

Furthermore, the noise amount is estimated with respect to the target pixel as described later with reference to FIG. 23 (Step S5).

Subsequently, the second noise reduction processing is performed on the target pixel as described later with reference to FIG. 24 (Step S6).

Next, judgment is made whether or not the processing has been completed with respect to all the local regions (Step S7). In a case in which judgment has been made that the processing has not been completed with respect to all the local regions, the flow returns to Step S3, and the above-described processing is performed for the unprocessed local regions.

On the other hand, in a case in which judgment has been made that the processing has been completed with respect to all the local regions, judgment is made whether or not the processing has been completed with respect to all the color signals (Step S8). In a case in which judgment has been made that the processing has not been completed for all the color signals, the flow returns to Step S2, and the above-described processing is performed for the unprocessed color signals.

On the other hand, in a case in which judgment has been made that the processing has been completed for all the color signals, known interpolation processing, enhancement processing, compression processing, etc., are performed (Step S9).

Subsequently, the image signal thus processed is output (Step S10), whereupon the processing ends.

Next, detailed description will be made regarding the first noise reduction processing performed in the aforementioned Step S4, with reference to FIG. 22.

When this processing is started, the table which stores the three weighting factors and the mixing factors calculated based upon Equation 2, Equation 4, Equation 5, and Equation 6 is input (Step S20).

Subsequently, the absolute value $\Delta_{ij}$ of the difference component between the pixel value of each pixel within the local region and the target pixel value is calculated as represented by Equation 1 (Step S21).

Then, the first weighting factor $w1_{ij}$ that corresponds to the absolute value $\Delta_{ij}$ of the difference component is obtained with reference to the table (Step S22).

Furthermore, as represented by Equation 3, after the absolute values $\Delta_{ij}$ of the difference components are sorted in ascending order, the integrated value R is calculated by integrating a predetermined number m of the sorted absolute values $\Delta_{ij}$, starting with the minimum value (Step S23).

Next, the second weighting factor w2 that corresponds to the integrated value R and the mixing factors $\epsilon_{ij}$ that correspond to the absolute values $\Delta_{ij}$ of the difference components are obtained with reference to the table (Step S24).

Subsequently, the third weighting factors $w3_{ij}$ that correspond to the coordinate values within the local region are obtained with reference to the table (Step S25).

Furthermore, the weighting factors $w_{ij}$ are calculated as represented by Equation 7 (Step S26).

Then, the filtering processing is performed on the local region using the weighting factors $w_{ij}$ as represented by Equation 8, thereby calculating the target pixel value thus subjected to the noise reduction processing (Step S27).

Subsequently, the target pixel value thus subjected to the first noise reduction processing is output (Step S28), whereupon the flow returns to the processing shown in FIG. 21.

Next, detailed description will be made regarding the noise amount estimation processing performed in the aforementioned Step S5, with reference to FIG. 23.

When this processing is started, first, the information such as the temperature, and the gain is set based upon the header information read out. In a case in which a necessary parameter is not in the header information, predetermined standard values are set (Step S30).

Subsequently, the coordinate data and the correction coefficient are read out with respect to the reference noise model (Step S31).

Furthermore, the coordinate data of the interval in the reference noise model to which the target pixel value thus subjected to the first noise reduction processing belongs and the correction coefficient that corresponds to the temperature and the gain are selected (Step S32).

Then, the interpolation processing is performed as represented by Equation 12, thereby obtaining the reference noise amount (step S33).

Furthermore, judgment is made whether or not the target pixel is an isolated point by performing the processing according to Equation 14 and Equation 15 (Step S34).

Next, the noise amount is calculated by performing the correction processing as represented by Equation 13. It should be noted that, in a case in which judgment has been made that the target pixel is an isolated point, the noise amount thus calculated is multiplied by a predetermined correction coefficient (S35).

Subsequently, the noise amount thus calculated is output (Step S36), whereupon the flow returns to the processing shown in FIG. 21.

Next, referring to FIG. 24, detailed description will be made regarding the second noise reduction processing performed in the aforementioned Step S6.

When the processing is started, first, the permissible range is set for the target pixel value, as represented by Equation 16 (Step S40).

Subsequently, judgment is made whether or not the target pixel value belongs to the permissible range (Step S41).

In a case in which judgment has been made that the target pixel value belongs to the permissible range, the processing is performed as represented by Equation 17 (Step S42).

On the other hand, in a case in which judgment has been made in Step S41 that the target pixel value does not belong to the permissible range, the processing is performed as represented by Equation 18 or Equation 19, depending on whether the target pixel value is higher or lower than the permissible noise range (Step S43).

Subsequently, the target pixel value thus subjected to the second noise reduction processing is output (Step S44), whereupon the flow returns to the processing shown in FIG. 21.

It should be noted that the image signal to be processed is not limited to a still image. Also, multiple image signals acquired in a time-series manner (a so-called video signal) may be processed.

The embodiment 1 as described above allows high-precision noise reduction processing optimized for the image capturing conditions to be performed, thereby providing a high-quality image signal.

Furthermore, such an embodiment suppresses the effects of the edge components in an edge region even if the edge has a complicated shape. This allows the noise amount to be estimated with high precision, thereby improving the stability and reliability of the processing.

In the first noise reduction processing, the weighting factors are obtained based upon the difference in the signal level, thereby effectively suppressing the effects of the edge components. Furthermore, the weighting factors are obtained based upon coordinate positions, thereby suppressing adverse effects of the filtering processing. Moreover, an isolated point is detected based upon the difference in the signal level, and a weighting factor is obtained based upon the isolated point detection result, thereby effectively suppressing noise due to the isolated point. Furthermore, the weighting factors are obtained with reference to a table, thereby providing high-speed processing. Moreover, the weighting factor is obtained based upon an image signal subjected to bit shift processing. This allows the table size to be reduced, thereby providing the image capturing system at a low cost. In addition, small noise components are eliminated by performing the bit shift processing, thereby improving the stability and the reliability of the processing.

Furthermore, the noise amount is estimated using a model, thereby allowing the noise amount to be estimated with high precision. Moreover, the interpolation processing can be easily implemented, thereby allowing the system to be built at low cost. In addition, the noise amount with respect to noise that occurs in the form of an isolated point is appropriately set, thereby providing high-precision noise reduction processing for various kinds of noise.

Furthermore, the second noise reduction processing is processing in which judgment is made with respect to the noise reduction processing based upon the noise amount, thereby allowing optimum noise reduction processing to be performed. Moreover, this suppresses the occurrence of discontinuity due to the noise reduction processing, thereby allowing a high-quality image signal to be generated. In a case in which an image capturing device including a Bayer-type primary color filter arranged on the front face thereof is employed, such an arrangement is highly compatible with conventional image capturing units. Thus, such an arrangement can be applied to various kinds of image capturing systems. In addition, with such an arrangement, the noise reduction processing is independently performed for each color signal. Thus, such an arrangement prevents the diffusion of noise between colors, thereby providing a high-quality image signal.

[Embodiment 2]

Figure 25:
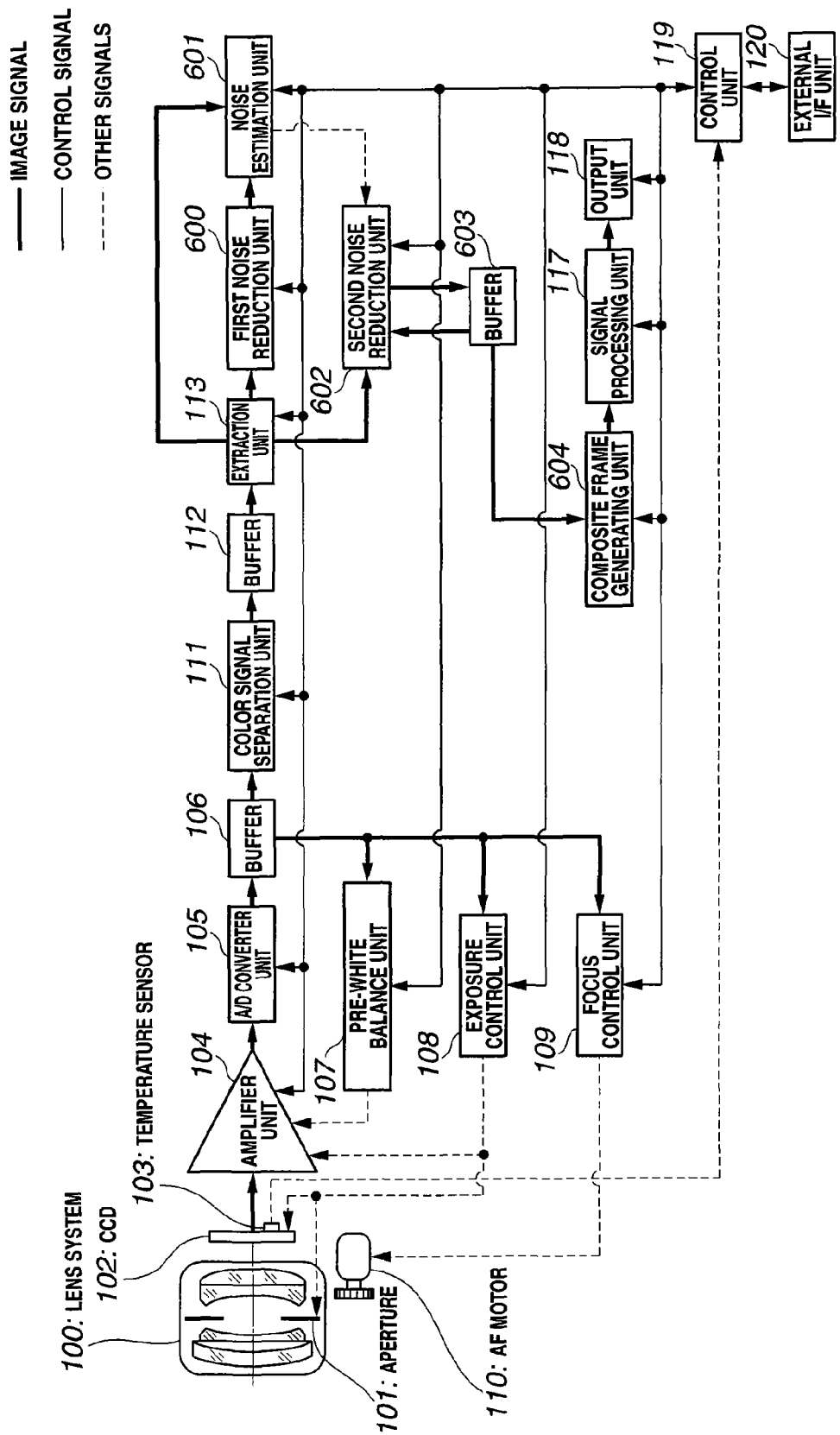
FIG. 25 is a block diagram which shows an image capturing system according to an embodiment 2 of the present invention.
Figure 28:
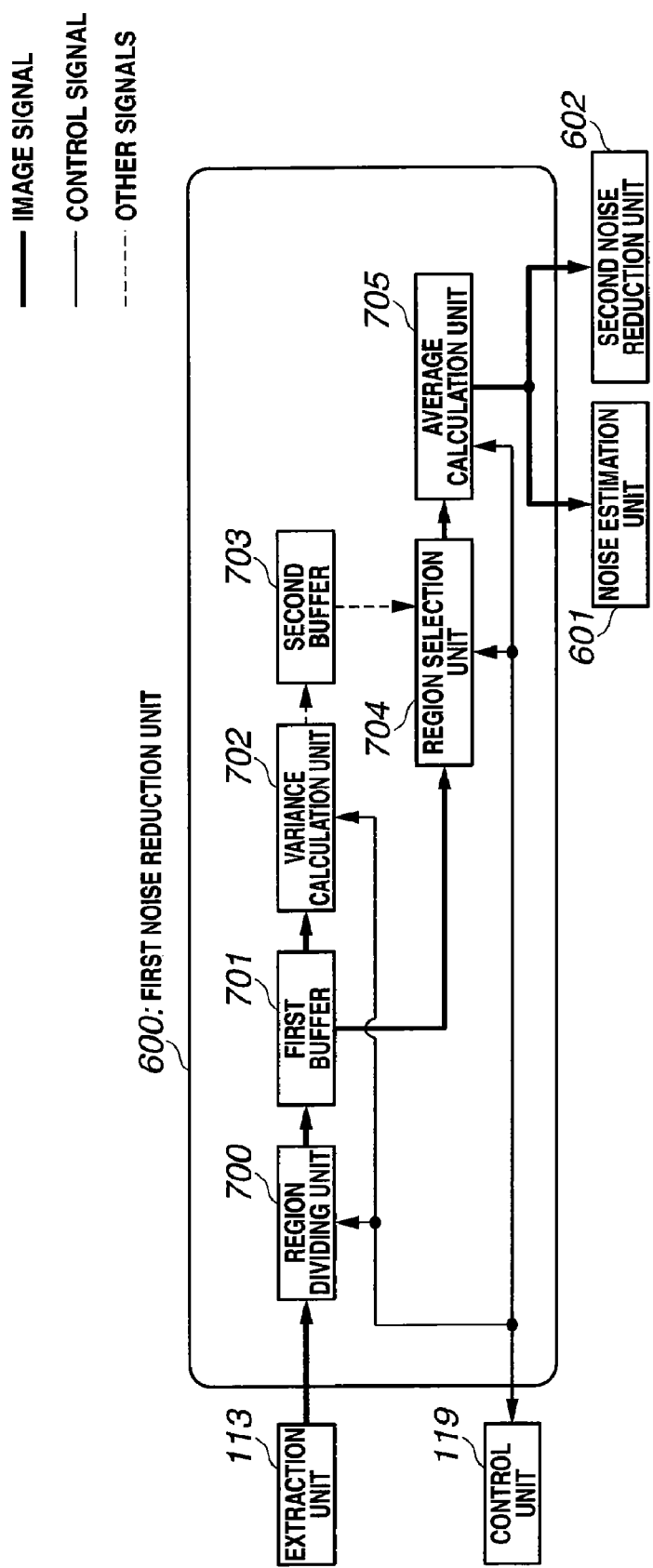
FIG. 28 is a block diagram which shows a first noise reduction unit according to the embodiment 2.
Figure 29:
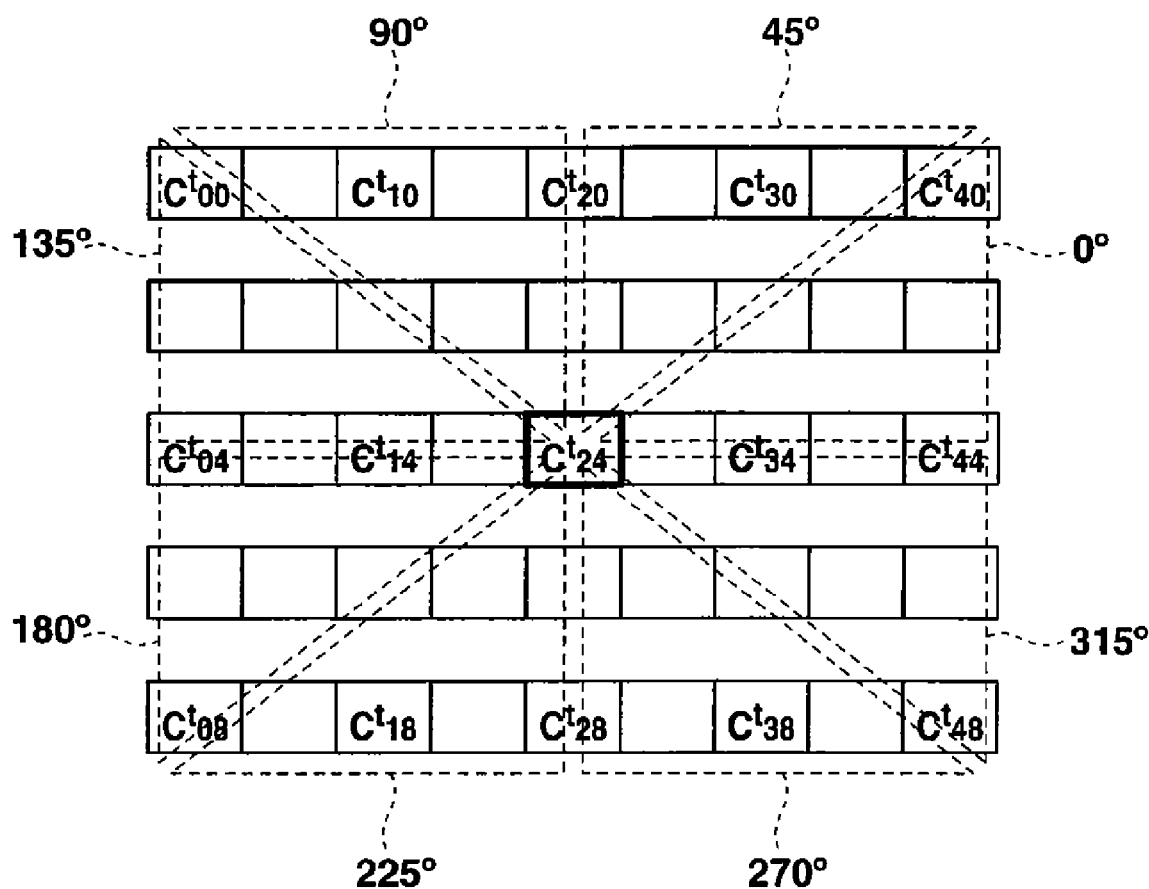
FIG. 29 is a diagram for describing directionally-divided regions divided by a region dividing unit according to the embodiment 2.
Figure 30:
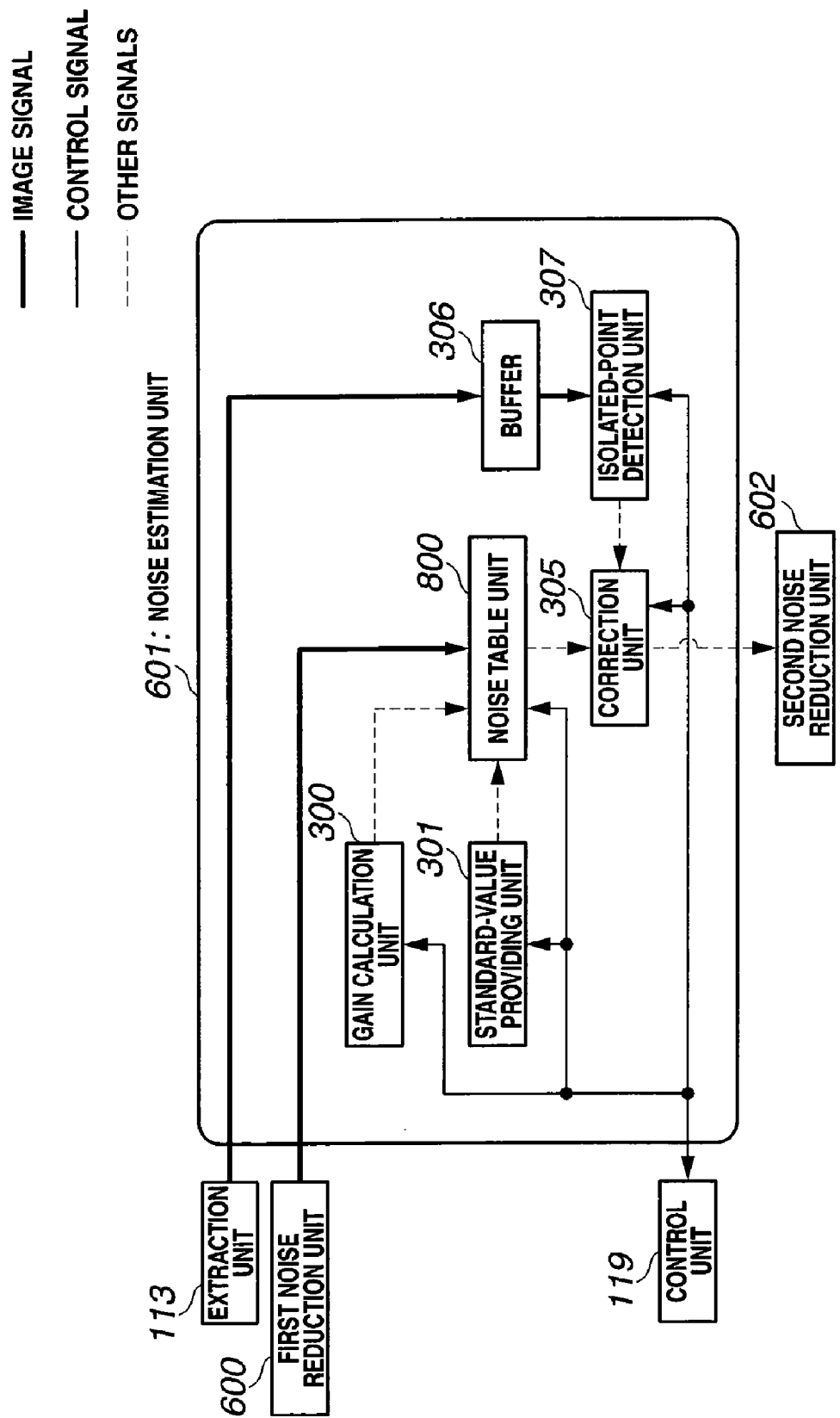
FIG. 30 is a block diagram which shows a configuration of a noise estimation unit according to the embodiment 2.
Figure 31:
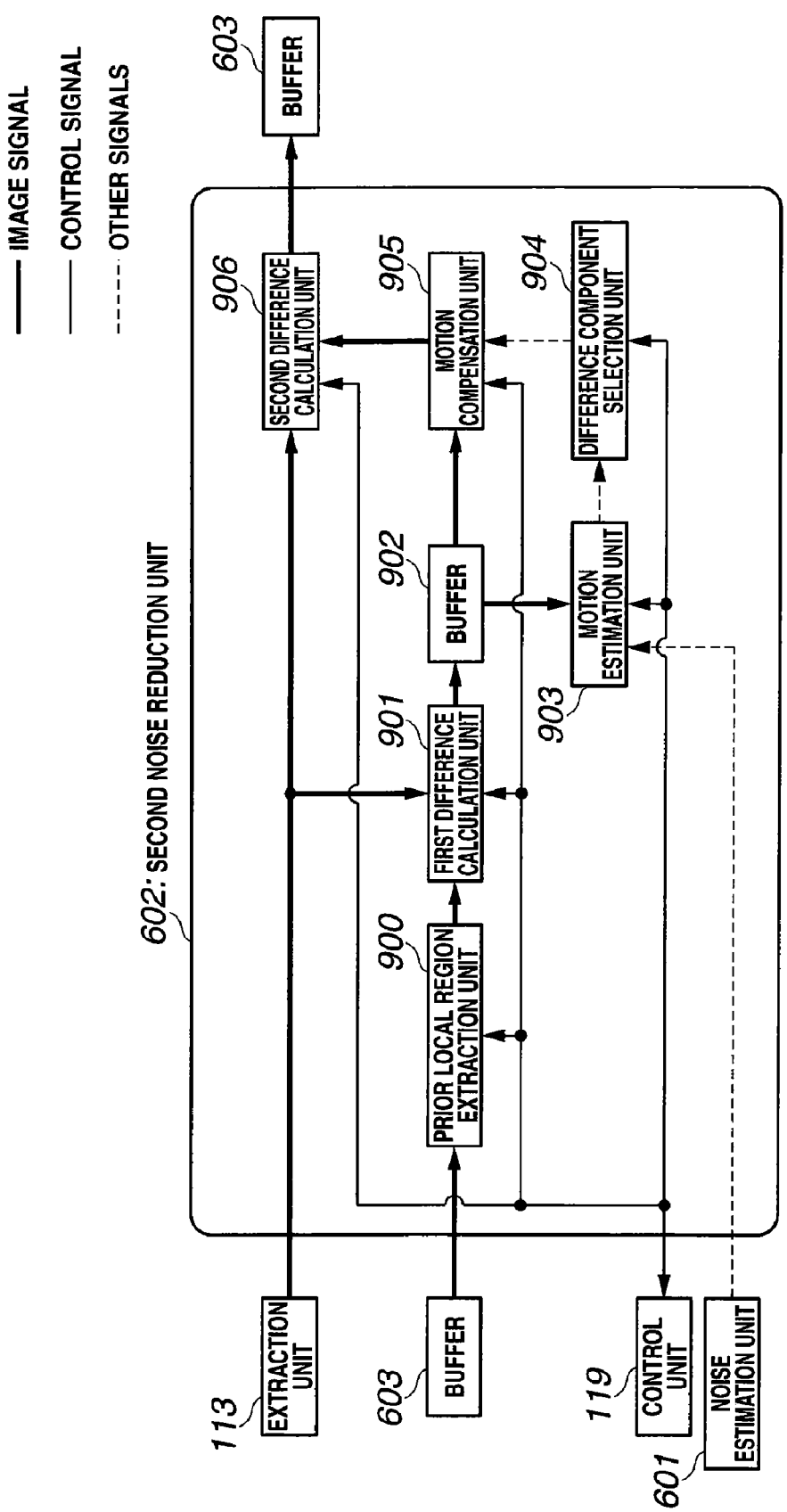
FIG. 31 is a block diagram which shows a configuration of a second noise reduction unit according to the embodiment 2.
Figures 32A, 32B:
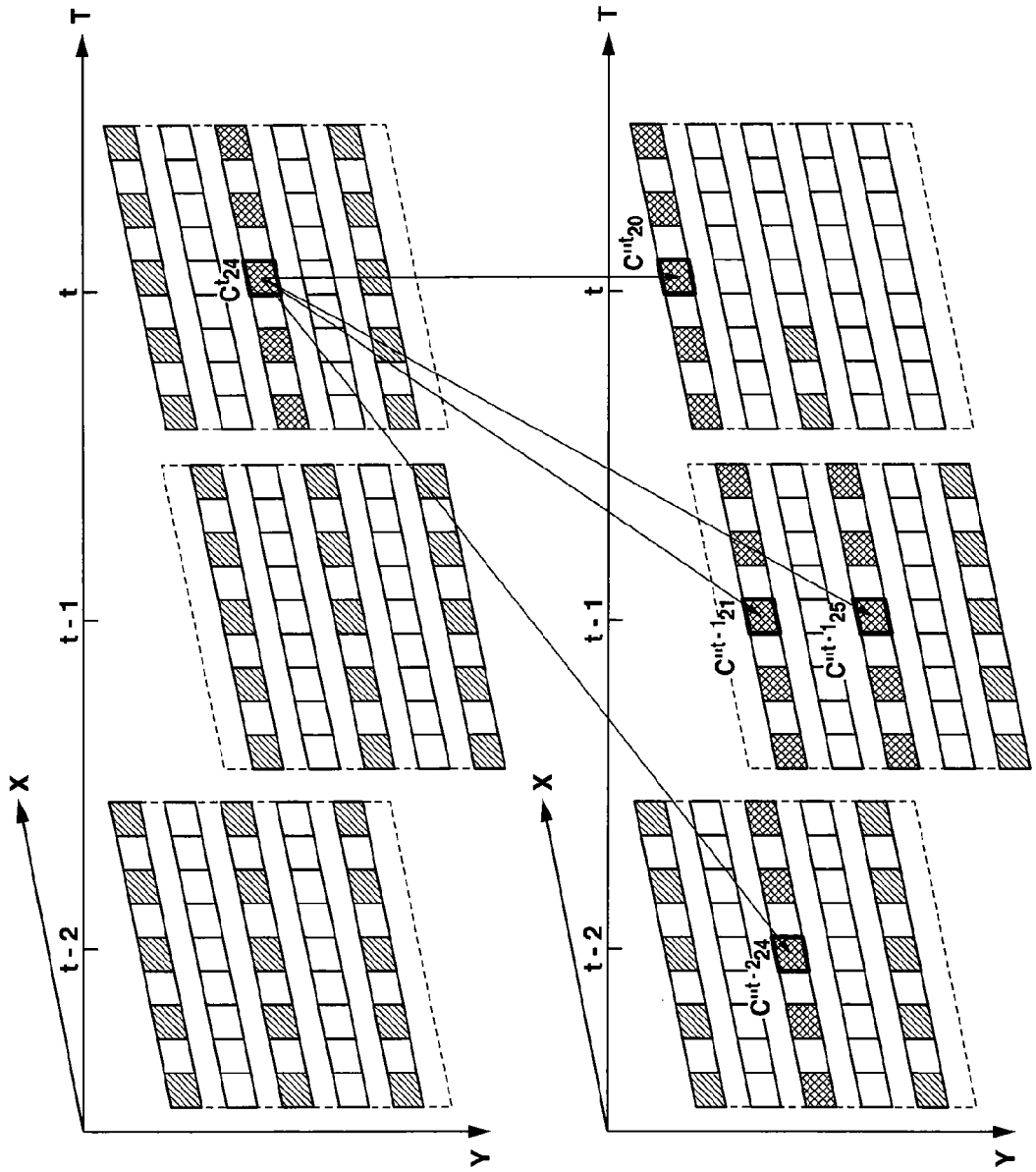
FIGS. 32A and 32B are diagrams for describing neighboring pixels used by the second noise reduction unit according to the embodiment 2.
Figure 33:
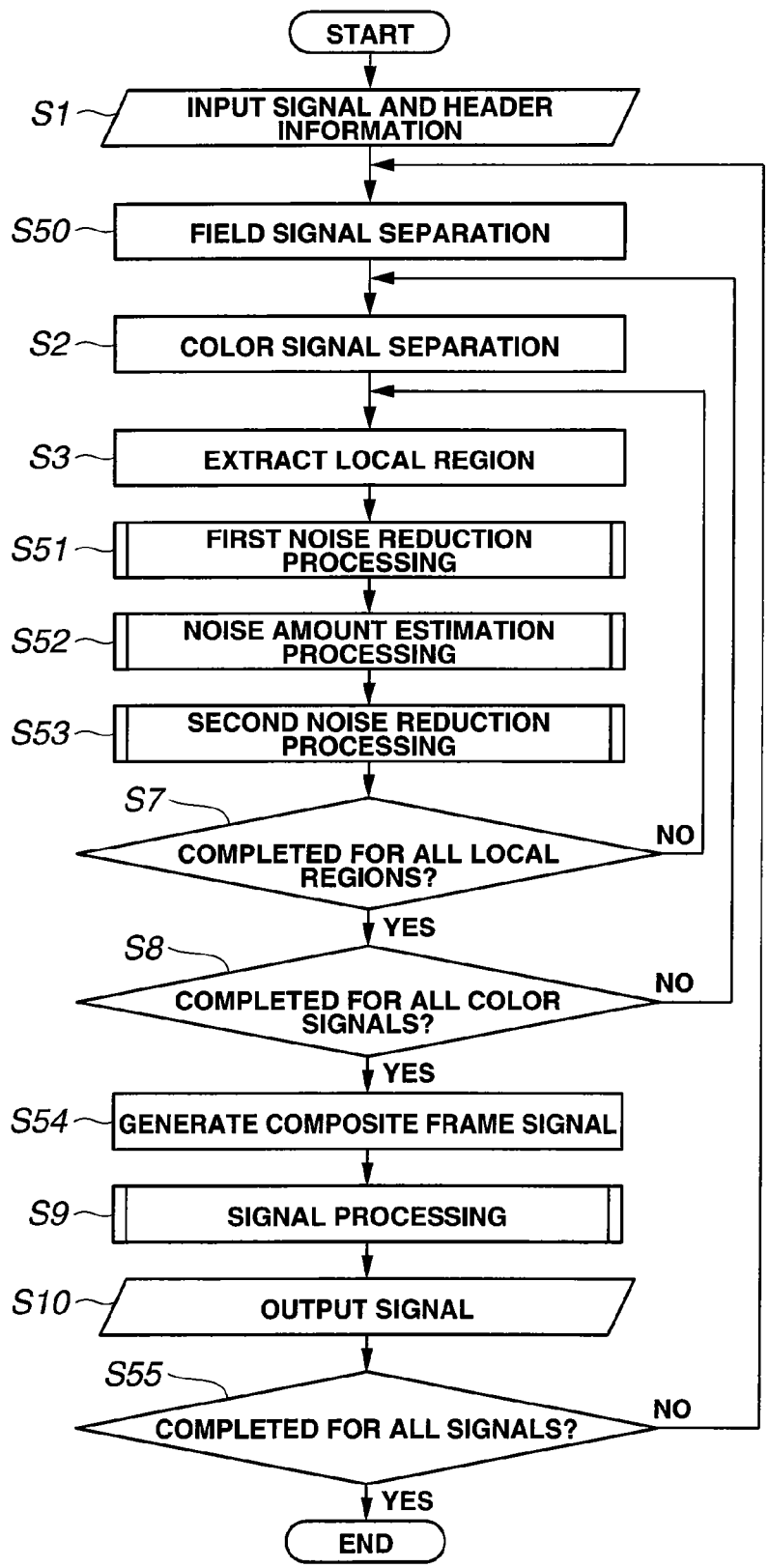
FIG. 33 is a flowchart which shows the overall flow of the processing performed according to an image processing program according to the embodiment 2.
Figure 34:
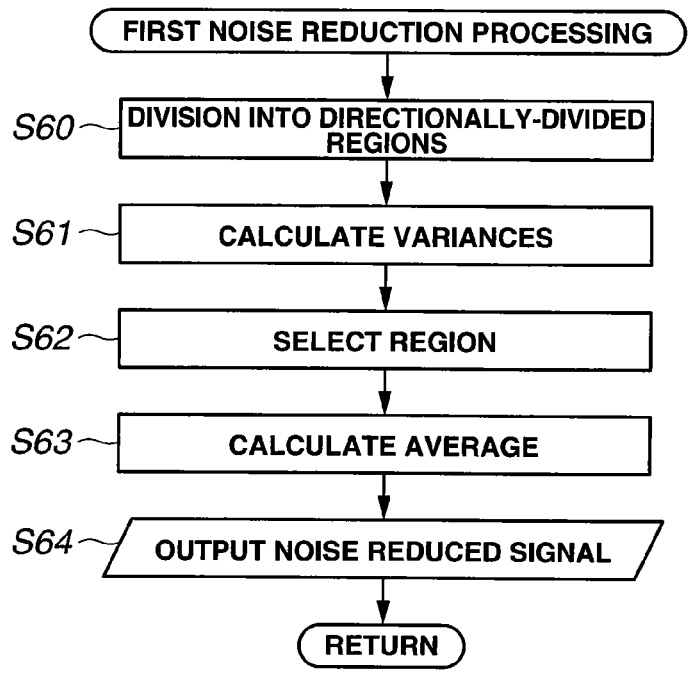
FIG. 34 is a flowchart which shows in detail the first noise reduction processing performed in Step S51 shown in FIG. 33, according to the embodiment 2.
Figure 35:
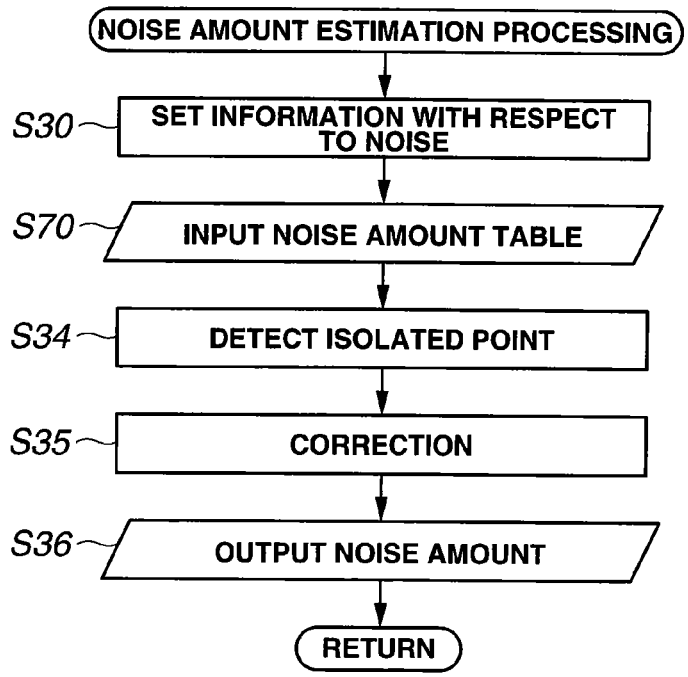
FIG. 35 is a flowchart which shows in detail the noise amount estimation processing performed in Step S52 shown in FIG. 33, according to the embodiment 2.
Figure 36:
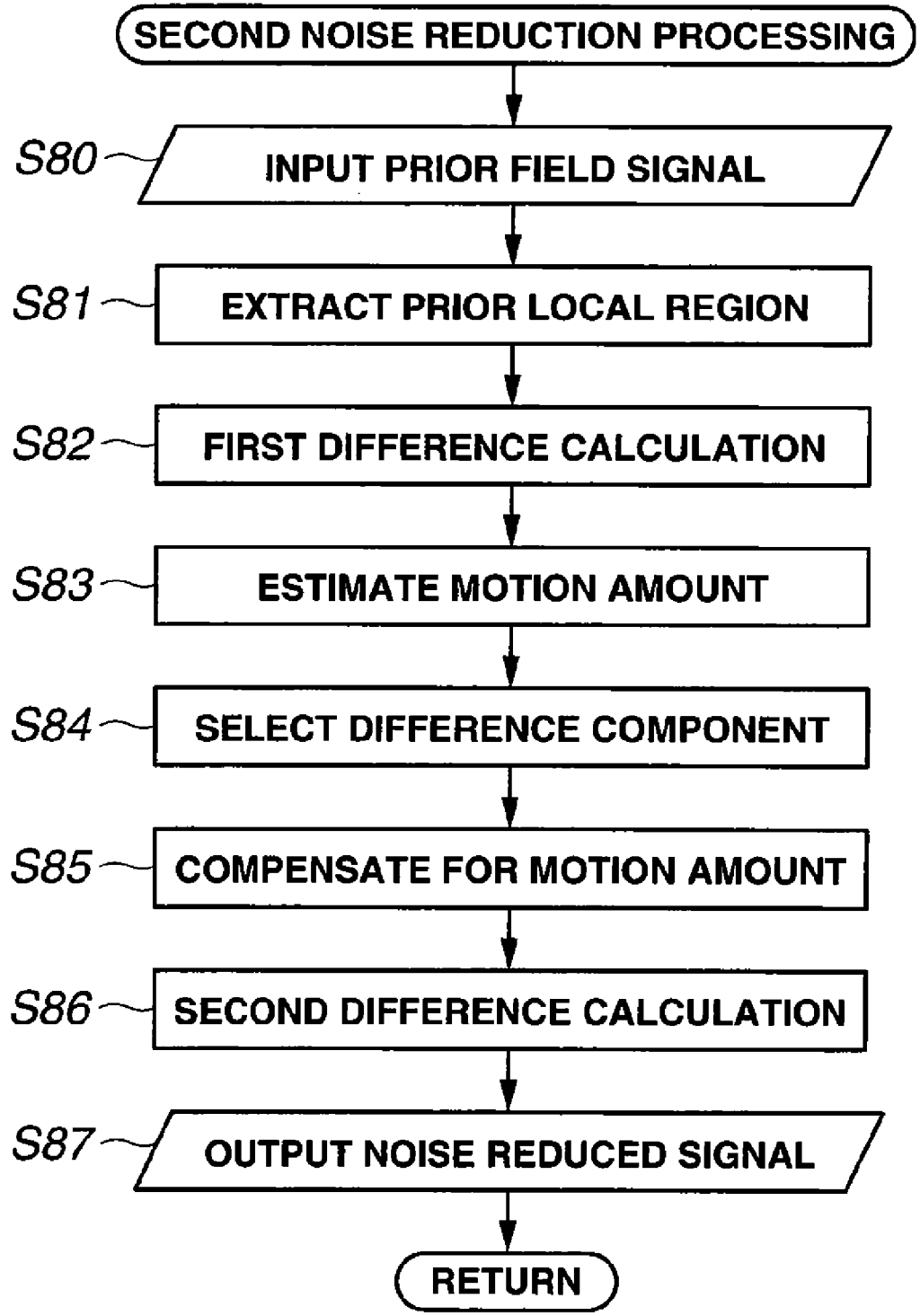
FIG. 36 is a flowchart which shows in detail the second noise reduction processing performed in Step S53 shown in FIG. 33, according to the embodiment 2.

FIG. 25 through FIG. 36 show an embodiment 2 according to the present invention. FIG. 25 is a block diagram which shows a configuration of an image capturing system. FIGS. 26A to 26C are diagrams for describing the pattern of a color-difference line-sequential type complementary color filter, a field signal output by performing two-pixel mixing processing, and a local region. FIGS. 27A to 27D diagrams for describing separation of an even-numbered field signal shown in FIG. 26B into a GCy-color signal, a MgYe-color signal, a MgCy-color signal, and a GYe-color signal. FIG. 28 is a block diagram which shows a configuration of a first noise reduction unit. FIG. 29 is a diagram for describing directionally-divided regions divided by a region dividing unit. FIG. 30 is a block diagram which shows a configuration of a noise estimation unit. FIG. 31 is a block diagram which shows a configuration of a second noise reduction unit. FIGS. 32A and 32B are diagrams for describing neighboring pixels used by the second noise reduction unit. FIG. 33 is a flowchart which shows the overall flow of the processing performed according to an image processing program. FIG. 34 is a flowchart which shows in detail the flow of the first noise reduction processing performed in Step S51 shown in FIG. 33. FIG. 35 is a flowchart which shows in detail the flow of the noise amount estimation processing performed in Step S52 shown in FIG. 33. FIG. 36 is a flowchart which shows in detail the flow of the second noise reduction processing performed in Step S53 shown in FIG. 33.

In the embodiment 2, the same components as those in the above-described embodiment 1 are denoted by the same reference numerals, and description thereof will be omitted. Description will mainly be made regarding only the points of difference.

The image capturing system according to the present embodiment has a configuration obtained by adding a buffer 603 which is signal storing means and a composite frame generating unit 604 to the image capturing system according to the embodiment 1 described above with reference to FIG. 1, and by replacing the first noise reduction unit 114, the noise estimation unit 115, and the second noise reduction unit 116 by a first noise reduction unit 600 which is first noise reducing means, a noise estimation unit 601 which is noise estimating means, and a second noise reduction unit 602 which is second noise reducing means. The other basic components are the same as those in the above-described embodiment 1.

The extraction unit 113 is connected to the first noise reduction unit 600, the noise estimation unit 601, and the second noise reduction unit 602. The first noise reduction unit 600 is connected to the noise estimation unit 601. The noise estimation unit 601 is connected to the second noise reduction unit 602. The second noise reduction unit 602 is bidirectionally connected to the buffer 603. The buffer 603 is connected to the composite frame generating unit 604. The composite frame generating unit 604 is connected to the signal processing unit 117.

Furthermore, the control unit 119 is bidirectionally connected to the first noise reduction unit 600, the noise estimation unit 601, the second noise reduction unit 602, and the composite frame generating unit 604, and is configured so as to control these units.

The operation of the image capturing system as shown in FIG. 25 is basically the same as that in the embodiment 1. Accordingly, description will mainly be made regarding only the points of difference with reference to the flow of the image signal.

Description will be made in the present embodiment assuming that a single CCD having a color-difference line-sequential type complementary color filter arranged on the front face thereof is employed as the CCD 102. Furthermore, description will be made in the present embodiment assuming that a video image composed of multiple image signals acquired in a time-series manner is handled as an image signal.

Figures 26A, 26B, 26C:
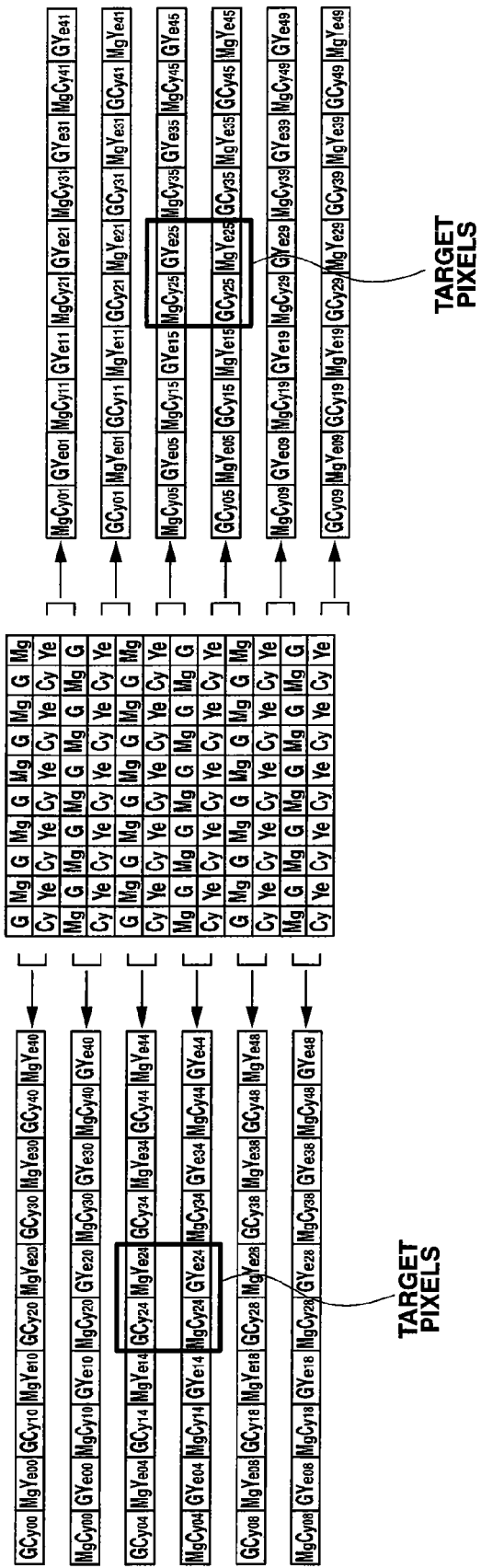
FIGS. 26A to 26C are diagrams for describing the pattern of a color-difference line-sequential type complementary color filter, field signals output by performing two-pixel mixing processing, and a local region, according to the embodiment 2.

FIG. 26A shows a configuration of a color-difference line-sequential type complementary color filter. The color-difference line-sequential type complementary color filter is configured of a basic 2×2 pixel unit region having a cyan (Cy) pixel and a yellow (Ye) pixel on the same line of the 2×2 pixel region, and a magenta (Mg) pixel and a green (G) pixel on the other line thereof. And, it should be noted that the positions of the magenta (Mg) and green (G) pixels are reversed each line.

The output of the CCD 102 is divided into an even-numbered field signal as shown in FIG. 26B and an odd-numbered field signal as shown in FIG. 26C. These field signals are alternately output in a time-series manner.

FIG. 26B shows the even-numbered field signal and the target pixels obtained by mixing two pixels. FIG. 26C shows the odd-numbered field signal and the target pixels obtained by mixing two pixels.

The even-numbered field signal is a signal obtained by mixing two pixels on the (2n−1)-th line and the 2n-th line along the vertical direction as shown in FIG. 26B. On the other hand, the odd-numbered field signal is a signal obtained by mixing two pixels on the 2n-th line and the (2n+1)-th line along the vertical direction as shown in FIG. 26C. Here, n represents an integer which is equal to or greater than 1.

By performing such mixing processing, the even-numbered field signal and the odd-numbered field signal are composed of four kinds of color signals, i.e., a (G+Cy) signal (which will be referred to as a "GCy signal" hereafter), a (Mg+Ye) signal (which will be referred to as a "MgYe signal" hereafter), a (Mg+Cy) signal (which will be referred to as a "MgCy signal" hereafter), and a (G+Ye) signal (which will be referred to as a "GYe signal" hereafter).

With such an arrangement, a single image signal (which will be referred to as a "frame signal" hereafter) is completed by generating a composite image based upon the aforementioned even-numbered field signal and odd-numbered field signal.

Let us assume that the buffer 106 stores image signals for two frame signals, i.e., four field signals. With such an arrangement, the image signal in the buffer 106 is overwritten in a time-series manner, thereby replacing a prior image signal with a new image signal.

Under the control of the control unit 119, the color signal separation unit 111 separates the field signal into four kinds of color signals, i.e., a GCy-color signal, a MgYe-color signal, a MgCy-color signal, and a GYe-color signal, as shown in FIGS. 27A to 27D, for example, and transmits the color signals thus separated to the buffer 112. It should be noted that FIGS. 27A to 27D show separation of the even-numbered field signal shown in FIG. 26B.

Let us assume that the buffer 112 stores image signals for two frame signals, i.e., four field signals, for each of the four kinds of color signals. In the same way as with the buffer 106, the color signal stored in the buffer 112 is overwritten in a time-series manner, thereby replacing a prior color signal with a new color signal.

Under the control of the control unit 119, the extraction unit 113 sequentially extracts a local region, which includes the target pixel to be subjected to the noise reduction processing and the neighboring pixels positioned in the vicinity of the target pixel, from multiple field signals, e.g., three field signals in the present embodiment, and transmits the local regions thus extracted to the first noise reduction unit 600, the noise estimation unit 601, and the second noise reduction unit 602.

With the present embodiment, as shown in FIGS. 27A to 27D, the extraction unit 113 extracts a 5×3 pixel region with the target pixel as the center from each field signal for each color, and creates a local region composed of the three 5×3 pixel regions extracted from the three field signals. Accordingly, each neighboring pixel is a pixel spatially and temporally positioned in the vicinity of the target pixel.

FIG. 32A shows a state of the local region distributed temporally in a two-dimensional space (i.e., three-dimensionally distributed). It should be noted that there is a difference by one line in the coordinate position of the target pixel between the even-numbered field signal and the odd-numbered field signal.

It should be noted that each pixel value within the local region will be represented by $C^k_{ij}$. ("C" represents a color signal, i.e., "C" represents the GCy-color signal, the MgYe-color signal, the MgCy-color signal, or GYe-color signal, "i" represents the X-coordinate (horizontal-direction coordinate) in a range of 0 through 4 within the local region, and "j" represents the Y-coordinate (vertical-direction coordinate). In the case of the even-numbered field, j is 0, 4, or 8. In the case of the odd-numbered field, j is 1, 5, or 9. "k" represents the point in time that corresponds to the field signal. With the point in time that corresponds to the current field signal as t, k is t, t−1, or t−2.) According to this notation, in the case of the even-numbered field signal, the target pixel value is represented by $C^t_{24}$, and in the case of the odd-numbered field signal, the target pixel value is represented by $C^t_{25}$.

Under the control of the control unit 119, the first noise reduction unit 600 performs predetermined adaptive noise reduction processing on the target pixel transmitted from the extraction unit 113, and transmits the target pixel thus subjected to the noise reduction processing to the noise estimation unit 601 and the second noise reduction unit 602.

Under the control of the control unit 119, the noise estimation unit 601 estimates the noise amount with respect to the target pixel based upon the local region transmitted from the extraction unit 113, the target pixel value subjected to the noise reduction processing and transmitted from the first noise reduction unit 600, and the image capturing conditions transmitted from the control unit 119. The noise estimation unit 601 transmits the noise amount thus estimated to the second noise reduction unit 602.

Under the control of the control unit 119, the second noise reduction unit 602 performs noise reduction processing on the target pixel transmitted from the extraction unit 113 based upon the noise amount transmitted from the noise estimation unit 601 and the prior image signals subjected to the noise reduction processing in a time-series manner and transmitted from the buffer 603. The second noise reduction unit 602 transmits the target pixel value thus subjected to the noise reduction processing to the buffer 603.

It should be noted that the processing items performed by the extraction unit 113, the first noise reduction unit 600, the noise estimation unit 601, and the second noise reduction unit 602, described above are performed synchronously in increments of local region units under the control of the control unit 119.

Under the control of the control unit 119, the composite frame generating unit 604 reads out the even-numbered field signal and the odd-numbered field signal subjected to the noise reduction processing from the buffer 603 so as to generate a single composite frame signal. Furthermore, with the present embodiment, when the composite frame generating unit 604 generates a composite frame signal, the composite frame generating unit 604 converts the image signal into the luminance signal Y and the color difference signals Cb and Cr in this stage, as represented by the following Equation 20.

$Y = GCy + MgYe$ or $Y = MgCy + GYe$ $Cb = MgCy - Gye$ $Cr = MgYe - GCy$ [Equation 20]

Then, the composite frame generating unit 604 transmits the image signal thus generated in the form of a composite frame signal composed of the luminance signal Y and the color difference signals Cb and Cr, thus converted, to the signal processing unit 117.

Under the control of the control unit 119, the signal processing unit 117 performs known interpolation processing, enhancement processing, compression processing, etc., on the image signal thus subjected to the noise reduction processing, and transmits the image signal thus processed to the output unit 118.

The output unit 118 sequentially stores the image signal in a recording medium such as a memory card, a disk medium, or the like.

Next, description will be made regarding an example of the configuration of the first noise reduction unit 600 with reference to FIG. 28.

The first noise reduction unit 600 includes a region dividing unit 700 which is region dividing means, a first buffer 701, a variance calculation unit 702 which is variance calculating means, a second buffer 703, a region selection unit 704 which is region selecting means, and an average calculation unit 705 which is average calculating means.

The extraction unit 113 is connected to the first buffer 701 via the region dividing unit 700. The first buffer 701 is connected to the variance calculation unit 702 and the region selection unit 704. The variance calculation unit 702 is connected to the region selection unit 704 via the second buffer 703. The region selection unit 704 is connected to the average calculation unit 705. The average calculation unit 705 is connected to the noise estimation unit 601 and the second noise reduction unit 602.

The control unit 119 is bidirectionally connected to the region dividing unit 700, the variance calculation unit 702, the region selection unit 704, and the average calculation unit 705, and is configured so as to control these units.

Under the control of the control unit 119, the region dividing unit 700 extracts a portion of the local region transmitted from the extraction unit 113, e.g., the image signal acquired at the point in time t that corresponds to the current field signal in the present embodiment, and divides the image signal thus extracted into multiple directionally-divided regions along multiple predetermined directions with the target pixel as the base point. FIG. 29 shows an example of the directionally-divided regions divided from the even-numbered field signal. FIG. 29 shows eight directionally-divided regions, i.e., regions directionally divided at 0°, 45°, 90°, 135°, 180°, 225°, 270°, and 315°. Each of the directionally-divided regions is composed of four pixels including the target pixel (accordingly, a pixel positioned on a boundary between two directionally-divided regions is included in both the two directionally-divided regions; furthermore, all the directionally-divided regions include the target pixel).

The directionally-divided image signals thus divided are transmitted to the first buffer 701. Under the control of the control unit 119, the variance calculation unit 702 sequentially reads out the directionally-divided regions, and calculates the variances with respect to the directionally-divided regions. The variance calculation unit 702 transmits the variances thus calculated to the second buffer 703.

Under the control of the control unit 119, the region selection unit 704 reads out the variances with respect to the directionally-divided regions from the second buffer 703, and selects the directionally-divided region which exhibits the smallest variance. Next, the region selection unit 704 reads out the image signal that belongs to the directionally-divided region thus selected from the first buffer 701, and transmits the image signal thus read out to the average calculation unit 705.

Under the control of the control unit 119, the average calculation unit 705 calculates the average with respect to the directionally-divided region transmitted from the region selection unit 704. The average calculation unit 705 transmits the average thus calculated as the target pixel value $C't_{24}$ (in the case of the even-numbered field signal) or $C't_{25}$ (in the case of the odd-numbered field signal) subjected to the noise reduction processing, to the noise estimation unit 601 and the second noise reduction unit 602.

Next, description will be made regarding an example of the configuration of the noise estimation unit 601 with reference to FIG. 30.

The noise estimation unit 601 has a configuration obtained by adding a noise table unit 800 which is noise table means to the noise estimation unit 115 described above in the embodiment 1 with reference to FIG. 15, and by eliminating the parameter storage ROM 302, the parameter selection unit 303, and the interpolation unit 304 therefrom. The other basic components are the same as those in the noise estimation unit 115 shown in FIG. 15. Accordingly, the same components will be referred to by the same names and will be denoted by the same reference numerals, and description thereof will be omitted as appropriate. Description will mainly be made regarding only the differences in the configuration.

The first noise reduction unit 600, the gain calculation unit 300, and the standard-value providing unit 301 are connected to the noise table unit 800. The noise table unit 800 and the isolated point detection unit 307 are connected to the correction unit 305.

Furthermore, the control unit 119 is bidirectionally connected to the noise table 800, and is configured so as to control the noise table 800.

Under the control of the control unit 119, the first noise reduction unit 600 transmits the target pixel value $C''_{24}$ (in the case of the even-numbered field signal) or $C''_{25}$ (in the case of the odd-numbered field signal) thus subjected to the noise reduction processing to the noise table unit 800.

The gain calculation unit 300 calculates a gain to be set for the amplifier unit 104, based upon the information with respect to the ISO sensitivity and the exposure conditions transmitted from the control unit 119, and transmits the gain thus obtained to the noise table unit 800.

Furthermore, the control unit 119 acquires the temperature information with respect to the CCD 102 from the temperature sensor 103, and transmits the temperature information thus acquired to the noise table unit 800.

In the noise table unit 800, a noise amount is obtained based upon the target pixel value subjected to the noise reduction processing and transmitted from the first noise reduction unit 600, the gain information transmitted from the gain calculation unit 300, and the temperature information transmitted form the control unit 119. The noise table unit 800 is a lookup table which stores the relations between the temperature, the signal level, the gain, and the noise amount, and is formed in the same way as in the above-described embodiment 1. The noise table unit 800 transmits the noise amount N thus obtained to the correction unit 305.

In the same way as in the above-described embodiment 1, only in a case in which the isolated point detection unit 307 has transmitted the judgment result that an isolated point has been detected, the correction unit 305 multiplies the aforementioned noise amount N by a predetermined correction coefficient $k_i$, e.g., $k_i$=1.5 to 4. The noise amount N corrected by the correction unit 305 is transmitted to the second noise reduction unit 602 as the noise amount $N_{24}$ with respect to the target pixel value $C'_{24}$ (in the case of the even-numbered field signal) or the noise amount $N_{25}$ with respect to the $C'_{25}$ (in the case of the odd-numbered field signal).

Next, description will be made regarding an example of the configuration of the second noise reduction unit 602 with reference to FIG. 31.

The second noise reduction unit 602 includes a prior local region extraction unit 900 which is prior local region extraction means, a first difference calculation unit 901 which is first difference calculating means, a buffer 902, a motion estimation unit 903 which is motion amount estimating means, a difference component selection unit 904 which is difference component selecting means, a motion compensation unit 905 which is motion amount compensation means, and a second difference calculation unit 906 which is second difference calculating means.

The extraction unit 113 is connected to the first difference calculation unit 901 and the second difference calculation unit 906. The buffer 603 is connected to the first difference calculation unit 901 via the prior local region extraction unit 900. The first difference calculation unit 901 is connected to the buffer 902. The buffer 902 is connected to the motion estimation unit 903 and the motion compensation unit 905. The noise estimation unit 601 is connected to the motion estimation unit 903. The motion estimation unit 903 is connected to the motion compensation unit 905 via the difference component selection unit 904. The motion compensation unit 905 is connected to the second difference calculation unit 906. The second difference calculation unit 906 is connected to the buffer 603.

The control unit 119 is bidirectionally connected to the prior local region extraction unit 900, the first difference calculation unit 901, the motion estimation unit 903, the difference component selection unit 904, the motion compensation unit 905, and the second difference calculation unit 906, and is configured so as to control these units.

Under the control of the control unit 119, the prior local region extraction unit 900 extracts as the prior local region (see FIG. 32B), from the buffer 603, at least one image signal positioned at the same position at which the local region (see FIG. 32A) with respect to the current target pixel is positioned, from among multiple image signals subjected to the noise reduction processing in prior steps in a time-series manner. The prior local region extraction unit 900 transmits the prior local region thus extracted to the first difference calculation unit 901.

Also, under the control of the control unit 119, the first difference calculation unit 901 receives the local region from the extraction unit 113. FIG. 32A shows the pixel pattern of the local region transmitted from the extraction unit 113. FIG. 32B shows the pixel pattern of the prior local region transmitted from the prior local region extraction unit 900.

In the example shown in FIGS. 32A and 32B, the target pixel value is $C'_{24}$ in the even-numbered field signal. Description will be made below regarding an example in which the target pixel is $C'_{24}$ in the even-numbered field signal. Also, the same technique can be applied to an example in which the target pixel is $C'_{25}$ in the odd-numbered field signal.

The first difference calculation unit 901 performs difference calculation processing between the unprocessed local region and the prior local region subjected to the second noise reduction processing. The difference calculation processing is performed on three kinds of temporal data sets, i.e., the data set of the current field signal (time t) and the current field signal (time t), the data set of the current field signal (time t) and the field signal (time t−1) one field prior to the current field signal, and the data set of the current field signal (time t) and the field signal (time t−2) two fields prior to the current field signal. The difference is calculated between a reference region and a comparison region with a predetermined size. With the present embodiment, the difference is calculated using a 1×5 pixel size area, i.e., between lines along the X-coordinate direction. That is to say, the first difference calculation unit 901 performs the difference calculation processing as represented by the following Equation 21.

$$d_i^t = C''^t_{i0} - C_{i4}^t$$

$$d^{t-1}_i = (C'''^{t-1}_{i1} + 3C'^{t-1}_{i6})/4 - C_{i4}^t$$

$$d^{t-2}_i = C'''^{t-2}_{i4} - C_{i4}^t \qquad \text{[Equation 21]}$$

Here, "i" represents the coordinate index along the X-coordinate direction. In the present embodiment, i is set to a value in a range of 0 to 4. Accordingly, five difference components are calculated for each of three kinds of difference components $d^t_i$, $d^{t-1}_i$, and $d^{t-2}_i$. Furthermore, C represents the unprocessed pixel value, and C" represents the pixel value subjected to the second noise reduction processing.

Then, the first difference calculation unit 901 transmits the three kinds of difference components $d^t_i$, $d^{t-1}_i$, and $d^{t-2}_i$ thus calculated to the buffer 902.

Under the control of the control unit 119, the motion estimation unit 903 reads out the three kinds of difference components $d^t_i$, $d^{t-1}_i$, and $d^{t-2}_i$, from the buffer 902, and reads out the noise amount $N_{24}$ with respect to the target pixel value $C^t_{24}$ from the noise estimation unit 601. Then, the motion estimation unit 903 sequentially compares each of the absolute values of the difference components with the noise amount $N_{24}$ for each kind of difference component. The motion estimation unit 903 judges that a difference component that exhibits an absolute value which is equal to or greater than the noise amount $N_{24}$ is a difference component that corresponds to a moving pixel due to motion, and adds a label to this difference component. Subsequently, the motion estimation unit 903 transmits the label information and the noise amount $N_{24}$ to the difference component selection unit 904.

Under the control of the control unit 119, the difference component selection unit 904 reads out the label information with respect to the difference component from the motion estimation unit 903, and selects the difference components of the kind of difference component (i.e., the difference components of a kind selected from among the three kinds of difference components $d^t_i$, $d^{t-1}_i$, and $d^{t-2}_i$) which exhibits the smallest motion amount (i.e., which has the smallest number of difference components that have been judged to be due to pixel motion). The aforementioned selection is performed by selecting the kind of difference components to which the smallest number of labels have been added. Then, the difference component selection unit 904 transmits the selection information and the noise amount $N_{24}$ to the motion compensation unit 905.

Under the control of the control unit 119, the motion compensation unit 905 reads out the selection information from the difference component selection unit 904, and reads out the difference components of the kind which has been judged to exhibit the smallest motion amount, based upon the selection information thus read out. The difference components thus selected (i.e., the difference components of the kind which exhibits the smallest motion amount) will be represented by $d_i$ hereafter. The motion compensation unit 905 performs compensation processing on the difference component $d_2$ with respect to the target pixel position in the difference components $d_i$, based upon the noise amount $N_{24}$ transmitted from the difference component selection unit 904, thereby calculating $d'_2$.

In a case in which the difference component $d_2$ is greater than the noise amount $N_{24}$, the compensation processing is performed according to the following Equation 22.

$$d'_2 = N_{24} \quad \text{[Equation 22]}$$

In a case in which the difference component $d_2$ is smaller than the noise amount $N_{24}$, the compensation processing is performed according to the following Equation 23.

$$d'_2 = -N_{24} \quad \text{[Equation 23]}$$

Otherwise, the compensation processing is performed according to the following Equation 24.

$$d'_2 = d_2 \quad \text{[Equation 24]}$$

The motion compensation unit 905 transmits the difference component $d'_2$ with respect to the target pixel position thus subjected to the compensation processing to the second difference calculation unit 906.

Under the control of the control unit 119, the second difference calculation unit 906 calculates the difference between the target pixel value $C^t_{24}$ transmitted from the extraction unit 113 and the difference component $d'_2$ subjected to the compensation processing and transmitted from the motion compensation unit 905, as represented by the following Equation 25, thereby calculating the target pixel value $C'''_{24}$ subjected to the second noise reduction processing.

$$C'''_{24} = C^t_{24} - d'_2 \quad \text{[Equation 25]}$$

The second difference calculation unit 906 transmits the target pixel value $C'''_{24}$ thus subjected to the second noise reduction processing to the buffer 603.

Description has been made above regarding an arrangement in which a color-difference line-sequential type complementary color filter is employed in the image capturing device. However, the present invention is not limited to such an arrangement. For example, also, an arrangement may be made employing a Bayer-type primary color filter as shown in FIG. 2. Also, an arrangement may be made employing two image capturing devices, or three image capturing devices.

Description has been made above in which the directionally-divided processing is employed as the first noise reduction processing, and the second noise reduction processing uses multiple image signals acquired in a time-series manner. However, the present invention is not limited to such an arrangement. For example, also, the filtering processing may be applied using adaptive weighting factors as described in the embodiment 1 with reference to FIG. 12. Also, the processing may be applied in which noise is reduced in a single image as described in the embodiment 1 with reference to FIG. 19. It should be noted that, in the filtering processing using the weighting factors, the weighting factors are preferably calculated based upon the temporal correlation between the target pixel and the neighboring pixels, in addition to the calculation of the weighting factors based upon the spatial correlation and the pixel-value correlation between the target pixel and the neighboring pixels.

Also, as with the above-described embodiment 1, the image capturing unit may be provided in the form of a separate unit. An arrangement may be made in which multiple image signals captured by the image capturing unit provided in the form of a separate unit are acquired in the form of unprocessed Raw data via a recording medium or the like, and additional information such as the temperature of the image capturing device in the image capturing operation and the exposure conditions stored in the form of a header is acquired via the recording medium or the like, so as to perform the processing as described above.

Description has been made above regarding an arrangement in which the processing is performed by means of hardware. However, the present invention is not limited to such an arrangement. For example, an arrangement may be made in which the multiple image signals transmitted from the CCD 102 are stored in the form of unprocessed Raw data in a recording medium, and the additional information such as image capturing conditions (e.g., the temperature of the image capturing device in the image capturing operation, and exposure conditions transmitted from the control unit 119) is stored in the form of header information in the recording medium. With such an arrangement, a computer may be instructed to read a computer readable recording medium for recording an image processing program provided in the form of a software component and execute the image processing program so as to read out the Raw data and the header information stored in the recording medium and to process the image signals. It should be noted that the present invention is not limited to such an arrangement in which transmission of various kinds of information from the image capturing device to the computer is performed via a recording medium. Also, the data transmission may be performed via a communication line or the like.

Referring to FIG. 33, description will be made regarding the overall flow of the processing performed according to the image processing program. It should be noted that, in FIG. 33, basically the same processing steps as those in the above-described embodiment 1 shown in FIG. 21 are denoted by the same reference numerals.

When the processing is started, first, the multiple image signals are read out, and the header information such as the temperature of the image capturing device, and the exposure conditions is read out (Step S1).

Next, each image signal thus read out is separated into an even-numbered field signal as shown in FIG. 26B and an odd-numbered field signal as shown in FIG. 26C (Step S50).

Subsequently, as shown in FIGS. 27A to 27D, each field signal is separated into color signals in increments of colors of the color filters employed in the image capturing device (Step S2).

Then, as shown in FIG. 32A, the local region including the target pixel is extracted (Step S3).

Furthermore, as described later with reference to FIG. 34, the first noise reduction processing is performed on the target pixel (Step S51).

Subsequently, as described later with reference to FIG. 35, the noise amount with respect to the target pixel is estimated (Step S52).

In addition, as described later with reference to FIG. 36, the second noise reduction processing is performed on the target pixel (Step S53).

Next, judgment is made whether or not the processing is completed for all the local regions (Step S7). In a case in which judgment has been made that the processing has not been completed for all the local regions, the flow returns to Step S3, and the above-described processing is performed for the unprocessed local regions.

On the other hand, in a case in which judgment has been made that the processing has been completed for all the local regions, judgment is made whether or not the processing has been completed for all the color signals (Step S8). In a case in which judgment has been made that the processing has not been performed for all the color signals, the flow returns to Step S2, and the above-described processing is performed for the unprocessed color signals.

In a case in which judgment has been made that the processing has been performed for all the color signals, a composite signal is generated based upon the even-numbered field signal and the odd-numbered field signal, thereby calculating a frame signal (Step S54).

Then, known enhancement processing, compression processing, etc., are performed on the frame signal (Step S9).

Subsequently, the frame signal thus processed is output (Step S10).

Subsequently, judgment has been made whether or not the processing has been completed for all the image signals (Step S55). In a case in which judgment has been made that the processing has not been completed for all the image signals, the flow returns to Step S50, and the above-described processing is performed for the unprocessed image signals.

On the other hand, in a case in which judgment has been made that the processing has been completed for all the image signals, the processing ends.

Next, referring to FIG. 34, detailed description will be made regarding the first noise reduction processing in the aforementioned Step S51.

When the processing is started, first, as shown in FIG. 29, a portion of the local region is divided into a predetermined number of directionally-divided regions with the target pixel as the base point (Step S60).

Next, the variance is calculated for each of the directionally-divided regions (Step S61).

Subsequently, the directionally-divided region that exhibits the smallest variance is selected (Step S62).

Furthermore, the average is calculated with respect to the directionally-divided region thus selected (Step S63).

Subsequently, the average thus calculated is output as the target pixel subjected to the first noise reduction (Step S64), following which the flow returns to the processing shown in FIG. 33.

Next, referring to FIG. 35, detailed description will be made regarding the noise amount estimation processing performed in the aforementioned Step S52. It should be noted that basically the same processing steps as those in the above-described embodiment 1 shown in FIG. 23 are denoted by the same reference numerals.

When the processing is started, first, the information such as the temperature and gain is set based upon the header information read out. In a case in which there is no necessary parameter in the header information, predetermined standard values are set (Step S30).

Subsequently, the noise amount table that corresponds to the temperature and the gain is input so as to obtain the noise amount that corresponds to the pixel value (Step S70).

Furthermore, the processing is performed using the neighboring pixels according to Equation 14 and Equation 15, thereby detecting whether or not the target pixel is an isolated point (Step S34).

In a case in which judgment has been made that the target pixel is an isolated point, the noise amount thus obtained is multiplied by a predetermined correction coefficient (Step S35).

Subsequently, the noise amount thus calculated is output (Step S36), following which the flow returns to the processing shown in FIG. 33.

Next, referring to FIG. 36, detailed description will be made regarding the second noise reduction processing performed in the aforementioned Step S53.

When this processing is started, the prior field signals subjected to the noise reduction processing are read out in a time-series manner (Step S80).

Subsequently, as shown in FIG. 32B, the image signal which has been subjected to the noise reduction processing and which is positioned at the same position as that of the local region with respect to the current target pixel is extracted as the prior local region (Step S81).

Furthermore, three kinds of difference components are calculated as represented by Equation 21 (Step S82).

Then, the noise amount is sequentially compared with the absolute value of each difference component in increments of pixels, and the difference component that exhibits an absolute value which is equal to or greater than the noise amount is judged to be a difference component that corresponds to the motion pixel due to the motion (Step S83).

Subsequently, of the three kinds of difference components, the difference components of the kind having the smallest number of difference components which have been judged to be the difference components that correspond to the motion pixels are selected (Step S84).

Then, the compensation processing is performed based upon the noise amount $N_{24}$ as represented by Equation 22, Equation 23, or Equation 24, for the difference component that corresponds to the target pixel position in the difference components of the kind thus selected as that which exhibits the smallest motion amount (Step S85).

Subsequently, the difference calculation processing is performed for the target pixel value and the difference component thus subjected to the compensation processing as represented by Equation 25, thereby obtaining the target pixel value subjected to the second noise reduction processing (Step S86).

Subsequently, the target pixel value thus subjected to the second noise reduction processing is output (Step S87), following which the flow returns to the processing shown in FIG. 33.

The embodiment 2 as described above provides the high-precision noise reduction processing optimized for the image capturing situations, thereby offering a high-quality image signal.

Furthermore, the recursive noise reduction processing is performed on multiple image signals captured in a time-series manner. This improves the smoothing performance and the edge-preserving performance of the noise reduction processing.

Furthermore, in the first noise reduction processing, the region which exhibits the smallest variance is selected. This suppresses the effects of the edge components even in a case in which the edge region has a complicated shape, thereby improving the precision of the noise amount estimation in the downstream step. Moreover, the first noise reduction processing is relatively simple processing, thereby providing the processing at low costs.

Moreover, the estimation of the noise amount is performed using a model, thereby allowing the noise amount to be estimated with high precision. With such an arrangement, a lookup table is employed for obtaining the noise amount, thereby allowing the noise amount to be estimated at a high speed. Furthermore, the noise amount is appropriately set for the noise that occurs in the form of an isolated point, thereby providing high-precision noise reduction processing for various kinds of noise.

Furthermore, in the second noise reduction processing, judgment is made with respect to the noise reduction processing, based upon the noise amount, thereby providing the optimum noise reduction processing. Moreover, in the second noise reduction processing, the prior image signals are used in a time-series manner, thereby providing more effective noise reduction processing. With such an arrangement, the prior image signal or the current image signal is selected based upon the motion amount. This allows the noise reduction processing to be performed while suppressing adverse effects thereof even in a case in which the region has a great motion amount. In the case of employing the image capturing device including a color-difference line-sequential type complementary color filter arranged on the front face thereof, such an arrangement is highly compatible with conventional image capturing units. Thus, such an arrangement can be applied various kinds of image capturing systems. In addition, with such an arrangement, the noise reduction processing is independently performed for each color signal. Thus, such an arrangement prevents the diffusion of noise between colors, thereby providing a high-quality image signal.

[Embodiment 3]

Figure 37:
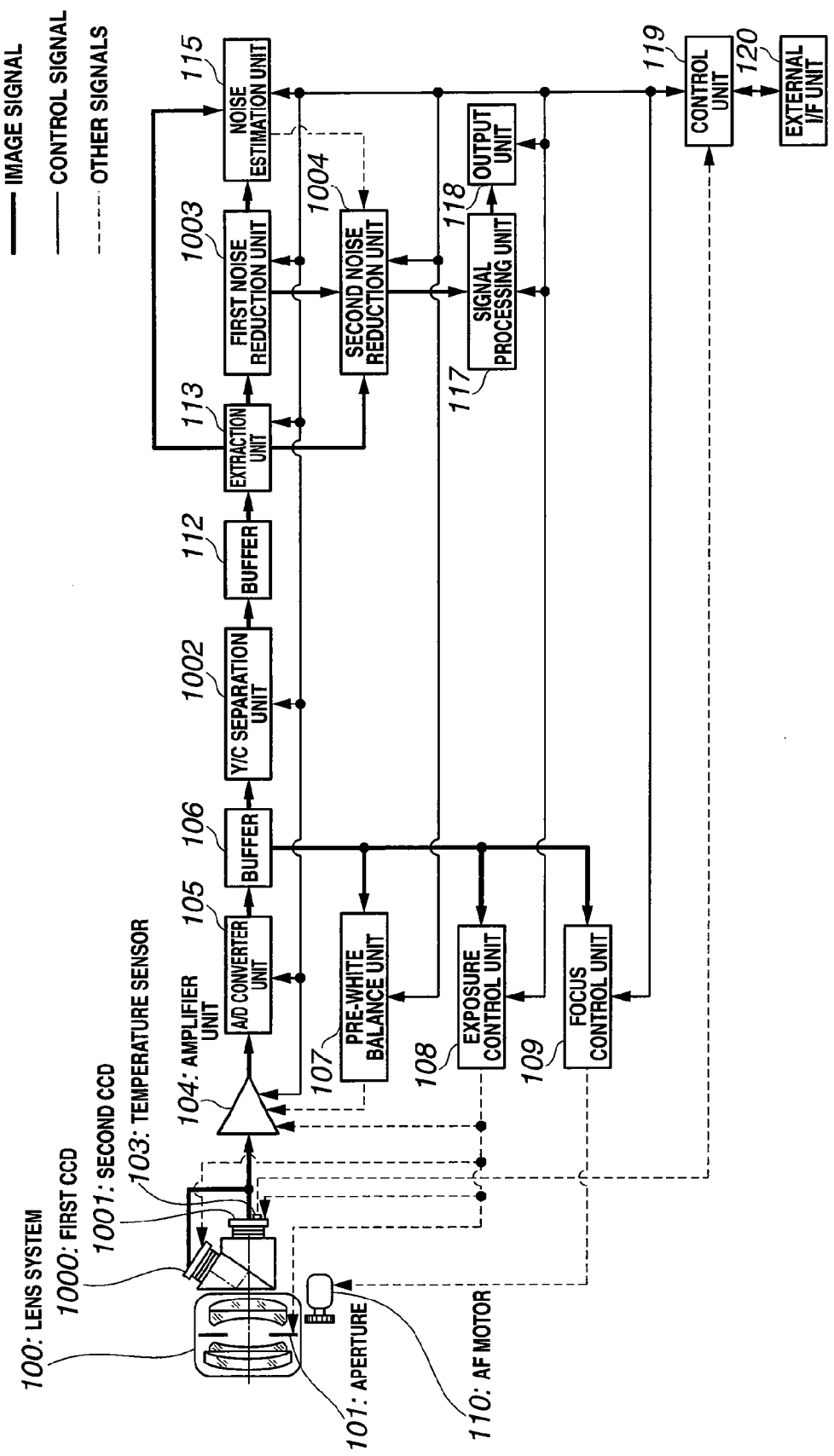
FIG. 37 is a block diagram which shows a configuration of an image capturing system according to an embodiment 3 of the present invention.
Figure 45:
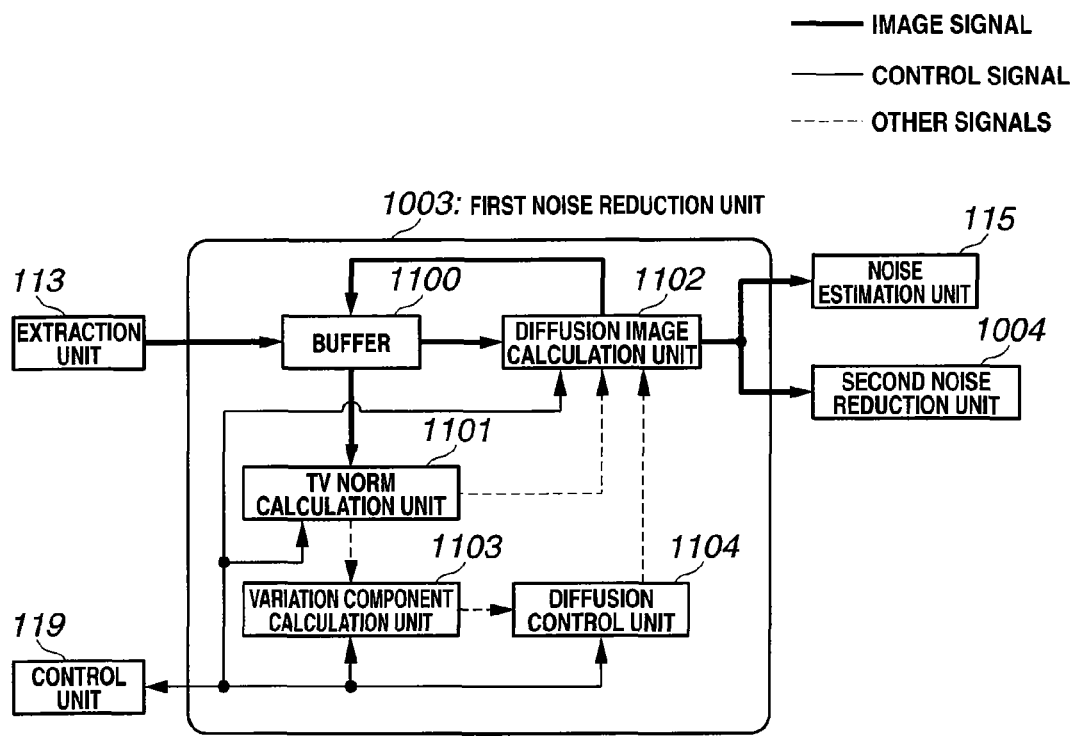
FIG. 45 is a block diagram which shows an example configuration of a first noise reduction unit according to the embodiment 3.
Figure 46:
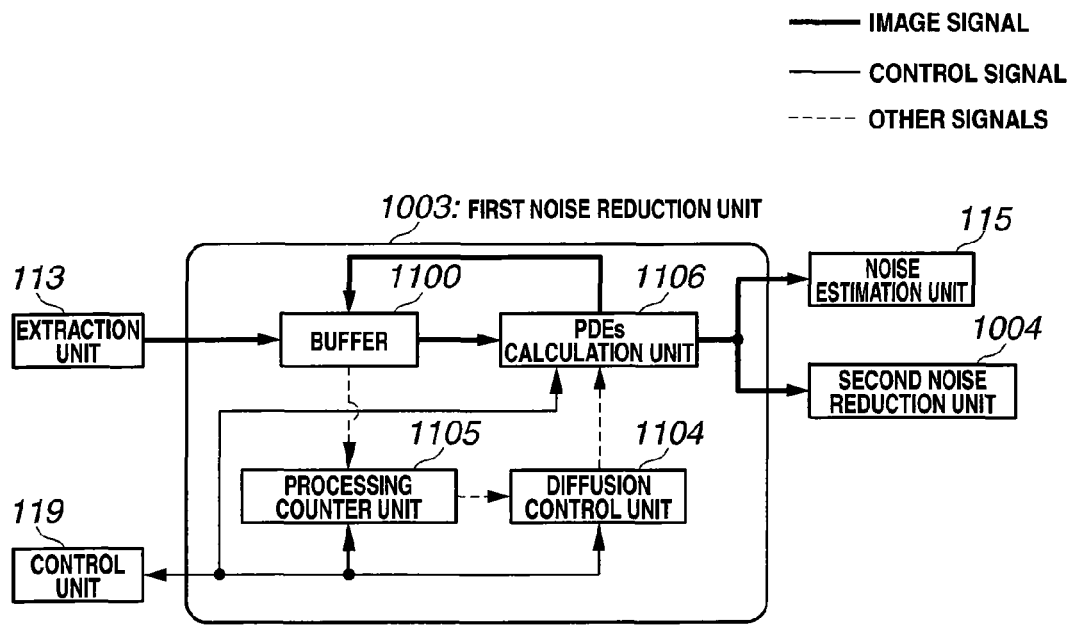
FIG. 46 is a block diagram which shows another example configuration of the first noise reduction unit according to the embodiment 3.
Figures 47, 48A, 48B, 48C, 48D, 49A, 49B, 49C, 49D:
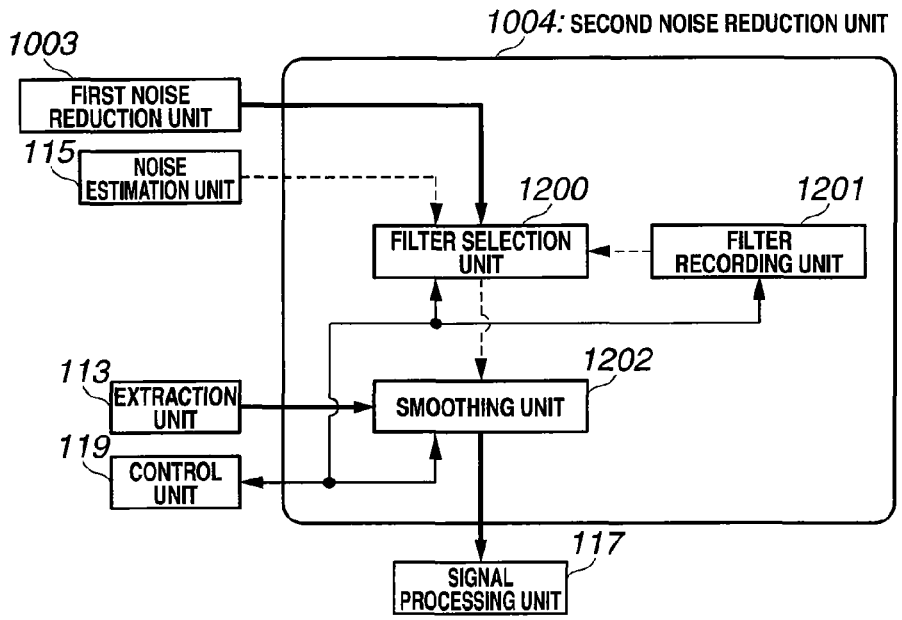
FIG. 47 is a block diagram which shows a configuration of a second noise reduction unit according to the embodiment 3.
FIGS. 48A to 48D are diagrams which show a smoothing filter having a 5×5 pixel region according to the embodiment 3.
FIGS. 49A to 49D are diagrams which show a smoothing filter having a 3×3 pixel region according to the embodiment 3.
Figure 50:
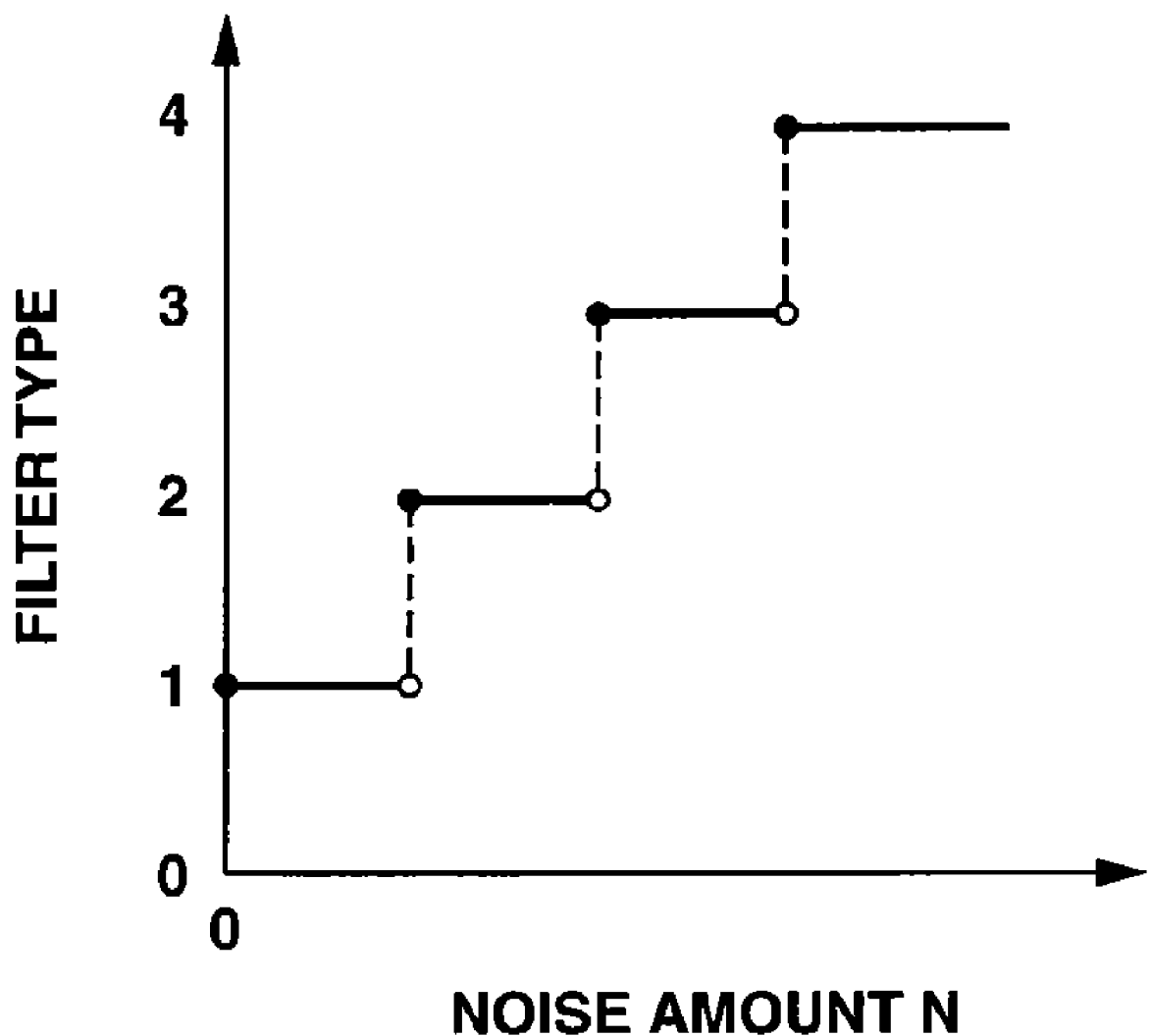
FIG. 50 is a diagram which shows the selection of the type of the smoothing filter performed based upon the noise amount.
Figure 51:
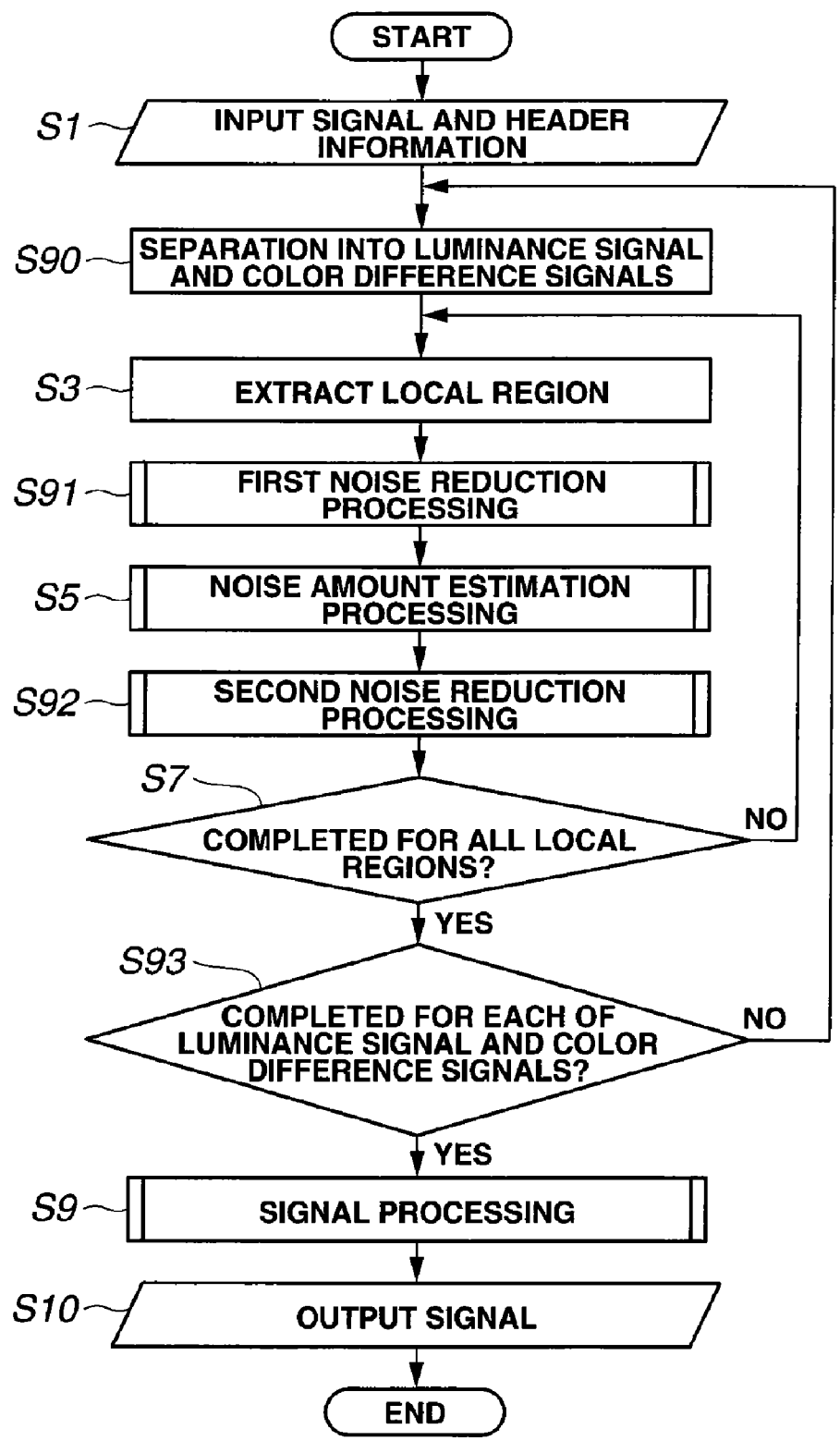
FIG. 51 is a flowchart which shows the overall flow of the processing performed according to an image processing program according to the embodiment 3.
Figure 52:
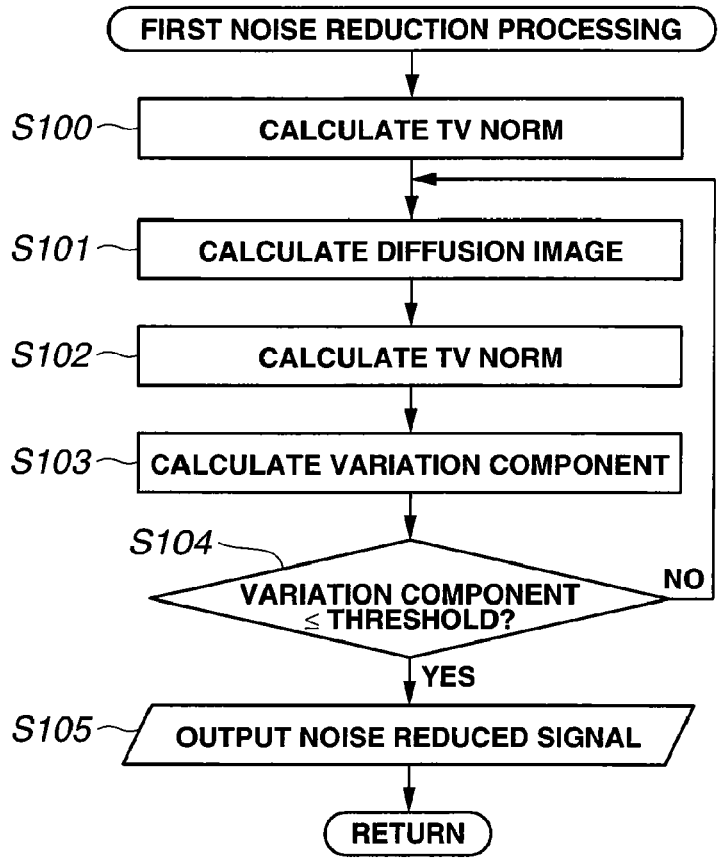
FIG. 52 is a flowchart which shows in detail the first noise reduction processing performed in Step S91 shown in FIG. 51 according to the embodiment 3.
Figure 53:
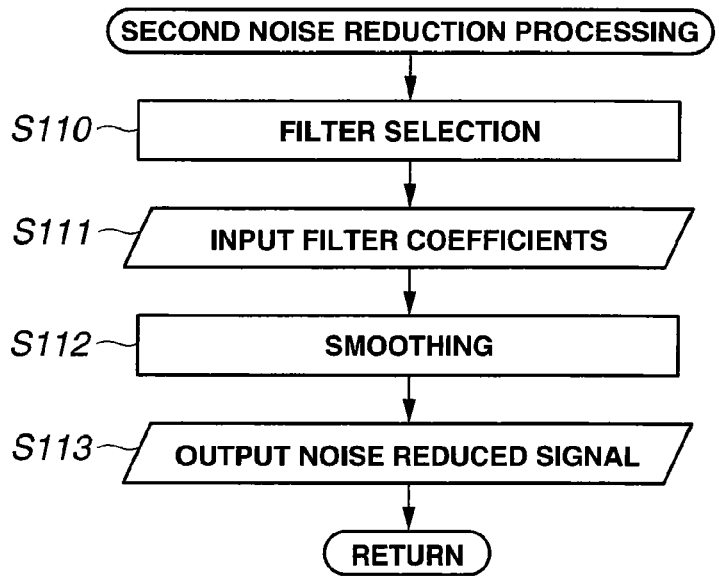
FIG. 53 is a flowchart which shows in detail the second noise reduction processing performed in Step S92 shown in FIG. 51 according to the embodiment 3.

FIG. 37 through FIG. 53 show an embodiment 3 according to the present invention. FIG. 37 is a block diagram which shows a configuration of an image capturing system. FIG. 38 is a diagram which shows a pattern of a color filter for a first CCD with respect to a local region. FIG. 39 is a diagram which shows a pattern of a color filter for a second CCD with respect to a local region. FIG. 40 is a diagram which shows an R-color signal in the local region obtained by performing interpolation processing on the output of the second CCD. FIG. 41 is a diagram which shows a B-color signal in the local region obtained by performing interpolation processing on the output of the second CCD. FIG. 42 is a diagram which shows a Y signal in the local region obtained by separating the G signal shown in FIG. 38, the R signal shown in FIG. 40, and the B signal shown in FIG. 41. FIG. 43 is a diagram which shows a Cb signal in the local region obtained by separating the G signal shown in FIG. 38, the R signal shown in FIG. 40, and the B signal shown in FIG. 41. FIG. 44 is a diagram which shows a Cr signal in the local region obtained by separating the G signal shown in FIG. 38, the R signal shown in FIG. 40, and the B signal shown in FIG. 41. FIG. 45 is a block diagram which shows an example configuration of a first noise reduction unit. FIG. 46 is a block diagram which shows another example configuration of the first noise reduction unit. FIG. 47 is a block diagram which shows a configuration of a second noise reduction unit. FIG. 48A to 48D are diagrams which show a smoothing filter having a 5×5 pixel region. FIGS. 49A to 49D are diagrams which show a smoothing filter having a 3×3 pixel region. FIG. 50 is a diagram which shows the selection of the type of the smoothing filter performed based upon the noise amount. FIG. 51 is a flowchart which shows the overall flow of the processing performed according to an image processing program. FIG. 52 is a flowchart which shows in detail the first noise reduction processing performed in Step S91 shown in FIG. 51. FIG. 53 is a flowchart which shows in detail the second noise reduction processing performed in Step S92 shown in FIG. 51.

In the embodiment 3, the same components as those in the above-described embodiments 1 and 2 are denoted by the same reference numerals, and description thereof will be omitted. Description will mainly be made regarding only the point of difference.

The image capturing system according to the present embodiment has the same configuration as that of the image capturing system according to the above-described embodiment 1 shown in FIG. 1, except that the CCD 102 is replaced by a first CCD 1000 and a second CCD 1001, and the color signal separation unit 111, the first noise reduction unit 114, and the second noise reduction unit 116 are replaced by a Y/C separation unit 1002 which is luminance/color-difference separating means, a first noise reduction unit 1003 which is first noise reducing means, and a second noise reduction unit 1004 which is second noise reducing means, respectively. The other basic components are the same as those in the above-described embodiment 1. Accordingly, the same components will be referred to by the same names and will be denoted by the same reference numerals, and description thereof will be omitted as appropriate. Description will mainly be made regarding only the different configuration.

The light flux input via the lens system 100 and the aperture 101 is divided into two light fluxes having different wavelength bands by a prism system having a dichroic face, for example, following which the two light fluxes thus divided are output in two directions. Then, one light flux thus divided reaches the first CCD 1000. The other light flux reaches the second CCD 1001. The image signal output from the first CCD 1000 and the image signal output from the second CCD 1001 are amplified by the amplifier unit 104. The image signals thus amplified are converted into digital signals by the A/D converter unit 105, and the digital signals thus converted are transmitted to the buffer 106.

The exposure control unit 108 is connected to the aperture 101, the first CCD 1000, the second CCD 1001, and the amplifier unit 104. The buffer 106 is connected to the pre-white balance unit 107, the exposure control unit 108, the focus control unit 109, and the Y/C separation unit 1002. The Y/C separation unit 1002 is connected to the buffer 112. The extraction unit 113 is connected to the first noise reduction unit 1003, the noise estimation unit 115, and the second noise reduction unit 1004. The first noise reduction unit 1003 is connected to the noise estimation unit 115 and the second noise reduction unit 1004. The noise estimation unit 115 is connected to the second noise reduction unit 1004. The second noise reduction unit 1004 is connected to the signal processing unit 117.

The control unit 119 is bidirectionally connected to the Y/C separation unit 1002, the first noise reduction unit 1003, and the second noise reduction unit 1004, and is configured so as to control these units.

Furthermore, the temperature sensor 103 is arranged in the vicinity of the second CCD 1001, and the output signal from the temperature sensor 103 is connected to the control unit 119.

The operation of the image capturing system as shown in FIG. 37 is basically the same as that of the embodiment 1. Accordingly, description will mainly be made below regarding only the point of difference with reference to the flow of the image signal.

The light flux input via the lens system 100 and the aperture 101 are divided by a prism system into a first light flux having a green wavelength band and a second light flux having the other wavelength band. Then, of these light fluxes, the first light flux is input to the first CCD 1000, and the second light flux is input to the second CCD 1001.

Description will be made in the present embodiment assuming that the first CCD 1000 is a CCD having green (G) filters arranged on the front face thereof as shown in FIG. 38, and the second CCD 1001 is a CCD having red (R) filters and blue (B) filters arranged on the front face thereof in a grid pattern. It should be noted that, in the case of employing the prism system including a dichroic face as described above, there is no need to provide such green (G) filters on the front face of the first CCD 1000 arranged on the optical path for the light flux having the green wavelength band.

With such an arrangement, the first CCD 1000 and the second CCD 1001 generate and output respective image signals.

The image signal output from the first CCD 1000 and the image signal output from the second CCD 1001 are transmitted to the buffer 106 via the A/D converter unit 105. The buffer 106 stores both the image signal transmitted from the first CCD 1000 and the image signal transmitted from the second CCD 1001.

Under the control of the control unit 119, the Y/C separation unit 1002 reads out, from the buffer 106, the image signal output from the first CCD 1000 and the image signal output from the second CCD 1001. Then, the Y/C separation unit 1002 performs known interpolation processing on the R-filter signal and the B-filter signal output from the second CCD 1001, thereby generating a signal without a missing pixel as shown in FIG. 40 and FIG. 41. Subsequently, the Y/C separation unit 1002 calculates the luminance signal (Y) and the color difference signals (Cb, Cr) based upon the R-filter signal (FIG. 40) thus generated so as to have no missing pixel, the B-filter signal (FIG. 41) thus generated so as to have no missing pixel, and the G-filter signal (FIG. 38) output from the first CCD 1000, as represented by the following Equation 26.

$Y = 0.29900R + 0.58700G + 0.11400B$ $Cb = -0.16874R - 0.33126G + 0.50000B$ $Cr = 0.50000R - 0.41869G - 0.08131B$ [Equation 26]

The Y/C separation unit 1002 transmits the luminance signal (Y) and the color difference signals (Cb, Cr) thus calculated to the buffer 112.

Under the control of the control unit 119, the extraction unit 113 sequentially extracts a local region including the target pixel to be subjected to the noise reduction processing and the neighboring pixels positioned in the vicinity of the target pixel, and transmits the local region thus extracted to the first noise reduction unit 1003, the noise estimation unit 115, and the second noise reduction unit 1004.

Here, in the present embodiment, the extraction unit 113 extracts, as the local region, a 5×5 pixel region with the target pixel as the center, as shown in FIG. 42 through FIG. 44. With such an arrangement, the noise reduction processing is performed in increment of pixels. Accordingly, the aforementioned 5×5 pixel local regions are sequentially extracted by shifting the pixel position of the target pixel in one pixel. Accordingly, a local region with respect to the target pixel at a given position and a new local region with respect to a new target pixel at a position shifted from the former target pixel by one pixel overlap by a four-pixel row or a four-pixel column. It should be noted that the aforementioned extraction is independently performed for each color signal. Each pixel value in the local region will be represented by $C_{ij}$ ("C" represents a color signal Y, Cb, or Cr; "i" represents the X-coordinate index (horizontal coordinate index) in a range of 0 to 4; and "j" represents the Y-coordinate index (vertical coordinate index) in a range of 0 to 4). According to this notation, in a case in which the local region is a 5×5 pixel region, the target pixel is represented by $C_{22}$.

Under the control of the control unit 119, the first noise reduction unit 1003 performs predetermined adaptive noise reduction processing on the target pixel in the local region transmitted from the extraction unit 113, and transmits the target pixel value thus subjected to the noise reduction processing to the noise estimation unit 115 and the second noise reduction unit 1004.

Under the control of the control unit 119, the noise estimation unit 115 estimates a noise amount with respect to the target pixel based upon the local region transmitted from the extraction unit 113, the target pixel value subjected to the noise reduction processing and transmitted from the first noise reduction unit 1003, and the image capturing conditions transmitted from the control unit 119. Then, the noise estimation unit 115 transmits the noise amount thus estimated to the second noise reduction unit 1004.

Under the control of the control unit 119, the second noise reduction unit 1004 performs the second noise reduction processing on the target pixel transmitted from the extraction unit 113, based upon the target pixel value subjected to the noise reduction processing and transmitted from the first noise reduction unit 1003 and the noise amount transmitted from the noise estimation unit 115. Then, the second noise reduction unit 1004 transmits the target pixel value thus subjected to the noise reduction processing to the signal processing unit 117.

It should be noted that the processing items performed by the extraction unit 113, the first noise reduction unit 1003, the noise estimation unit 115, and the second noise reduction unit 1004 described above are performed synchronously in increments of local region units under the control of the control unit 119.

Under the control of the control unit 119, the signal processing unit 117 performs enhancement processing, compression processing, etc., on the image signal thus subjected to the noise reduction processing, and transmits the image signal thus processed to the output unit 108.

The output unit 118 stores the image signal in a recording medium such as a memory card or the like.

Next, referring to FIG. 45, description will be made regarding an example of the configuration of the first noise reduction unit 1003.

The first noise reduction unit 1003 includes a buffer 1100 which is diffusion image storing means, a TV norm calculation unit 1101 which is diffusion image calculating means, a diffusion image calculation unit 1102 which is diffusion image calculating means, a variation component calculation unit 1103 which is iterative processing control means and variation component calculating means, and a diffusion control unit 1104 which is iterative processing control means and stop means.

The extraction unit 113 is connected to the buffer 1100. The buffer 1100 is connected to the TV norm calculation unit 1101 and the diffusion image calculation unit 1102. The TV norm calculation unit 1101 is connected to the diffusion image calculation unit 1102 and the variation component calculation unit 1103. The diffusion image calculation unit 1102 is connected to the buffer 1100, the noise estimation unit 115, and the second noise reduction unit 1004. The variation component calculation unit 1103 is connected to the diffusion image calculation unit 1102 via the diffusion control unit 1104.

The control unit 119 is bidirectionally connected to the TV norm calculation unit 1101, the diffusion image calculation unit 1102, the variation component calculation unit 1103, and the diffusion control unit 1104, and is configured so as to control these units.

The local region is transmitted from the extraction unit 113 to the buffer 1100.

Under the control of the control unit 119, the TV norm calculation unit 1101 calculates the total variation (TV) norm with respect to the local region stored in the buffer 1100 as represented by the following Equation 27.

$$TV = \int |\nabla R| dxdy \quad \text{[Equation 27]}$$

Here, "$\nabla R$" represents the gradient of the local region R.

The TV norm calculation unit 1101 transmits the TV norm thus calculated to the diffusion image calculation unit 1102 and the variation component calculation unit 1103.

Under the control of the control unit 119, the diffusion image calculation unit 1102 calculates a diffusion image with respect to the local region using the local region transmitted from the buffer 1100 and the TV norm transmitted from the TV norm calculation unit 1101. The diffusion image is iteratively calculated as a reconstructed image which exhibits the minimum energy function E( ) as represented by the following Equation 28.

$$E(R) = \rho(TV) + \int \lambda \cdot \rho(\phi R - O) dxdy \quad \text{[Equation 28]}$$

Here, "$\rho(\ )$" represents a predetermined cost function, "$\phi$" represents a degradation factor due to noise, "O" represents an original image without a noise component, and "$\lambda$" represents a predetermined constant term.

Then, the diffusion image calculation unit 1102 calculates the diffusion image according to the following Equation 29.

$$\frac{\partial}{\partial t} R = div[\psi(TV) \cdot TV] - \lambda \cdot \phi^* \psi(\phi R - O) \quad \text{[Equation 29]}$$

$$\psi(z) = \frac{1}{z} \cdot \frac{\partial}{\partial z} \rho(z)$$

Here, the "$\phi^*$" represents an adjoint variable of the degradation factor, and "$\partial t$" represents a first-order partial differential operator with respect to a virtual time parameter t.

The diffusion image calculation unit 1102 calculates the diffusion image $R^{(t)}$ by updating the virtual time parameter t according to Equation 29. It should be noted that the initial condition $R^{(0)} = R$ is employed for the calculation.

The diffusion image calculation unit 1102 transmits the diffusion image $R^{(t)}$ thus calculated to the buffer 1100.

Under the control of the control unit 119, the TV norm calculation unit 1101 again calculates the TV norm with respect to the local region stored in the buffer 1100. Then, the TV norm calculation unit 1101 transmits the TV norm thus calculated again to the diffusion image calculation unit 1102 and the variation component calculation unit 1103.

Under the control of the control unit 119, the variation component calculation unit 1103 calculates the variation of the TV norm transmitted from the TV norm calculation unit 1101. The TV norm with respect to the diffusion image $R^{(t)}$ at the virtual time parameter t will be represented by $TV^{(t)}$, and the TV norm with respect to the diffusion image $R^{(t+1)}$ at the virtual time parameter (t+1) updated by the diffusion image calculation unit 1102 will be represented by T hereafter. In this case, the variation of the TV norm is obtained by calculating the absolute value of the difference between $TV^{(t)}$ and $TV^{(t+1)}$. The variation component calculation unit 1103 transmits the variation of the TV norm thus calculated to the diffusion control unit 1104.

Under the control of the control unit 119, the diffusion control unit 1104 compares the variation of the TV norm transmitted from the variation component calculation unit 1103 with a predetermined threshold. In a case in which the variation of the TV norm is equal to or smaller than the predetermined threshold, judgment is made that the iterative processing has been converged, and transmits a control signal, which is an instruction to stop the processing, to the diffusion image calculation unit 1102.

In a case in which such a control signal has been transmitted from the diffusion control unit 1104, the diffusion image calculation unit 1102 extracts the pixel value that corresponds to the target pixel position from the diffusion image, and transmits the pixel value thus extracted to the noise estimation unit 115 and the second noise reduction unit 1004 as the target pixel value $C'_{22}$ subjected to the noise reduction processing. On the other hand. In a case in which such a control signal has not been transmitted from the diffusion control unit 1104, the diffusion image calculation unit 1102 again calculates a diffusion image with respect to the local region stored in the buffer 1100.

Description has been made above regarding an arrangement in which the diffusion processing is performed based upon the TV norm. However, the present invention is not limited to such an arrangement. For example, also, an arrangement may be made employing a combination of an ordinary energy function and partial differential equations (PDEs).

Referring to FIG. 46, description will be made regarding another example configuration of the first noise reduction unit 1003.

The first noise reduction unit 1003 shown in FIG. 46 has the same configuration as that of the first noise reduction unit 1003 shown in FIG. 45, except that the TV norm calculation unit 1101 is eliminated, the diffusion image calculation unit 1102 is replaced by a PDEs calculation unit 1106 which is diffusion image calculating means, and the variation component calculation unit 1103 is replaced by a processing counter unit 1105 which is iterative processing control means and processing counter means. The other basic components are the same as those in the first noise reduction unit 1003 shown in FIG. 45. Accordingly, the same components will be referred to by the same names and will be denoted by the same reference numerals, and description thereof will be omitted as appropriate. Description will mainly be made regarding only the different configuration.

The buffer 1100 is connected to the processing counter unit 1105 and the PDEs calculation unit 1106. The processing counter unit 1105 is connected to the diffusion control unit 1104. The diffusion control unit 1104 is connected to the PDEs calculation unit 1106. The PDEs calculation unit 1106 is connected to the buffer 1100, the noise estimation unit 115, and the second noise reduction unit 1004.

The control unit 119 is bidirectionally connected to the processing counter unit 1105 and the PDEs calculation unit 1106, and is configured so as to control these units.

Under the control of the control unit 119, the PDEs calculation unit 1106 calculates the PDEs with respect to a nonlinear diffusion equation for the local region R stored in the buffer 1100. Here, in general, the nonlinear diffusion equation is obtained in the form of an equation represented by the following Equation 30.

$$\frac{\partial}{\partial t} R = div[c(|\nabla R|^2) \cdot \nabla R] \qquad \text{[Equation 30]}$$

Here, "c( )" represents an energy function for calculating an image to be obtained, and "∂t" represents a first-order partial differential operator with respect to the virtual time parameter t.

The PDEs calculation unit 1106 calculates the updated image $R^{(t)}$ by updating the virtual time parameter t according to Equation 30. It should be noted that, as the initial condition of the calculation, the Equation $R^{(0)}=R$ is employed. The PDEs calculation unit 1106 transmits the updated image $R^{(t)}$ thus calculated to the buffer 1100.

Under the control of the control unit 119, the processing counter unit 1105 counts the number of the times the updated image $R^{(t)}$ is written to the buffer 1100, and transmits the number of times thus counted to the diffusion control unit 1104.

Under the control of the control unit 119, the diffusion control unit 1104 makes a comparison between the number of times the update is performed and a predetermined threshold. In a case in which the number of times the update is performed is equal to or greater than the predetermined threshold, the diffusion control unit 1104 transmits a control signal, which is an instruction to stop the processing, to the PDEs calculation unit 1106.

In a case in which such a control signal has been transmitted from the diffusion control unit 1104, the PDEs calculation unit 1106 extracts the pixel value that corresponds to the target pixel position from the updated image, and transmits the pixel value thus extracted to the noise estimation unit 115 and the second noise reduction unit 1004 as the target pixel value $C'_{22}$ subjected to the noise reduction processing. On the other hand, in a case in which such a control signal has not been transmitted from the diffusion control unit 1104, the PDEs calculation unit 1106 again calculates the updated image with respect to the local region stored in the buffer 1100.

It should be noted that such a technique using a diffusion image as described above is described in the aforementioned "IEEE SIGNAL PROCESSING MAGAZINE SEPTEMBER 2002" (pp. 16-25).

Next, referring to FIG. 47, description will be made regarding an example of the configuration of the second noise reduction unit 1004.

The second noise reduction unit 1004 includes a filter selection unit 1200 which is smoothing filter selecting means, a filter recording unit 1201 which is smoothing filter recording means, and a smoothing unit 1202 which is smoothing means.

The first noise reduction unit 1003, the noise estimation unit 115, and the filter recording unit 1201 are connected to the filter selection unit 1200. The filter selection unit 1200 and the extraction unit 113 are connected to the smoothing unit 1202. The smoothing unit 1202 is connected to the signal processing unit 117.

The control unit 119 is bidirectionally connected to the filter selection unit 1200, the filter recording unit 1201, and the smoothing unit 1202, and is configured so as to control these units.

Under the control of the control unit 119, the filter selection unit 1200 reads out the target pixel value $C'_{22}$ subjected to the first noise reduction processing from the first noise reduction unit 1003, reads out the noise amount $N_{22}$ with respect to the target pixel from the noise estimation unit 115, and selects a smoothing filter recorded in the filter recording unit 1201. Here, the filter recording unit 1201 records a total of eight kinds of smoothing filters, e.g., four kinds of smoothing filters with a filter size of 5×5 pixels and with different frequency properties (Type 1 through Type 4) as shown in FIG. 48A through FIG. 48D, and four kinds of smoothing filters with a filter size of 3×3 pixels and with different frequency properties (Type 1 through Type 4) as shown in FIG. 49A through FIG. 49D.

It should be noted that the smoothing filter of the type 1 has frequency properties which maintain a high-frequency component. Furthermore, the smoothing filters having such frequency properties are configured so as to reduce the high-frequency component in ascending order of the filter type number from the type 1 to the type 4. FIGS. 48A to 48D and FIGS. 49A to 49D show the filter coefficients obtained by multiplying the actual filter coefficients by 128. Accordingly, the actual filter coefficients employed in a practical arrangement are obtained by multiplying the filter coefficients shown in FIGS. 48A to 48D and FIGS. 49A to 49D by ⅟₁₂₈.

First, the filter selection unit 1200 makes a comparison between the target pixel value $C'_{22}$ transmitted from the first noise reduction unit 1003 and a predetermined threshold. In a case in which the target pixel value $C'_{22}$ is equal to or smaller than the predetermined threshold, the filter selection unit 1200 selects a smoothing filter having a filter size of 5×5 pixels. On the other hand, in a case in which the target pixel value $C'_{22}$ is greater than the predetermined threshold, the filter selection unit 1200 selects a smoothing filter having a filter size of 3×3 pixels. The reason is that, in general, noise is predominant in a dark region, and accordingly, a smoothing filter having a more effective noise reduction function should be applied to such a dark region.

Then, the filter selection unit 1200 selects a filter from among the filters having frequency properties of type 1 through type 4 based upon the noise amount $N_{22}$ with respect to the target pixel transmitted from the noise estimation unit 115. The selection is performed based upon the relation between the noise amount N and the filter type as shown in FIG. 50, for example. That is to say, in a case in which the noise amount N is small, the smoothing filter of the type 1 is selected. The type of the smoothing filter thus selected is changed in ascending order of the type 2, type 3, and type 4, according to an increase of the noise amount N. Thus, the smoothing filter having such frequency properties is selected in a way such that the efficiency of reducing the high-frequency component is increased according to an increase of the noise amount N.

Then, the filter selection unit 1200 transmits the smoothing filter coefficients of the filter having the filter size and the frequency properties thus selected to the smoothing unit 1202.

Under the control of the control unit 119, the smoothing unit 1202 performs the smoothing filter processing on the local region transmitted from the extraction unit 113, using the smoothing filter coefficients transmitted from the filter selection unit 1200. Then, the smoothing unit 1202 transmits the target pixel value thus subjected to the filtering processing to the signal processing unit 117 as the target pixel value $C''_{22}$ subjected to the second noise reduction processing.

Description has been made above regarding an arrangement in which two CCDs are employed as the image capturing unit. However, the present invention is not limited to such an arrangement. For example, a single CCD employing a Bayer-type primary color filter as shown in FIG. 2 or a color-difference line-sequential type complementary color filter as shown in FIG. 7 may be employed as the image capturing system. Also, three CCDs may be employed as the image capturing system.

Also, as with the above-described embodiment 1, the image capturing unit may be provided in the form of a separate unit. Also, an arrangement may be made in which the image signals captured by the image capturing unit provided in the form of a separate unit are acquired in the form of unprocessed Raw data via a recording medium or the like, and the additional information such as the temperature of the image capturing device in the image capturing operation and the exposure conditions is acquired in the form of a header via the recording medium or the like, so as to perform the processing as described above.

Description has been made above regarding an arrangement in which the processing is performed by means of hardware. However, the present invention is not limited to such an arrangement. For example, an arrangement may be made in which the image signal transmitted from the first CCD 1000 and the image signal transmitted from the second CCD 1001 are stored in the form of unprocessed Raw data in a recording medium, and the additional information such as image capturing conditions (e.g., the temperature of the image capturing device in the image capturing operation, and exposure conditions transmitted from the control unit 119) is stored in the form of header information in the recording medium. With such an arrangement, a computer may be instructed to read a computer readable recording medium for recording an image processing program provided in the form of a software component and execute the image processing program so as to read out the Raw data and the header information stored in the recording medium and to process the image signals. It should be noted that the present invention is not limited to such an arrangement in which transmission of various kinds of information from the image capturing device to the computer is performed via a recording medium. Also, the data transmission may be performed via a communication line or the like.

Referring to FIG. 51, description will be made regarding the overall flow of the processing performed according to the image processing program. It should be noted that, in FIG. 51, basically the same processing steps as those in the above-described embodiment 1 shown in FIG. 21 are denoted by the same reference numerals.

When the processing is started, first, the image signals are read out, and the header information such as the temperature of the image capturing device, and the exposure conditions is read out (Step S1).

Then, known interpolation processing is performed on the R-filter signal and the B-filter signal having missing pixels, following which these signals are separated into the luminance signal and the color-difference signals as represented by Equation 26 (Step S90).

Subsequently, as shown in FIG. 42 through FIG. 44, a local region is extracted with the target pixel as the center for each of the luminance signal and the color-difference signals (Step S3).

Then, as described later with reference to FIG. 52, the first noise reduction processing is performed on the target pixel (Step S91).

Furthermore, as described later with reference to FIG. 23, the noise amount is estimated with respect to the target pixel (Step S5).

In addition, as described later with reference to FIG. 53, the second noise reduction processing is performed on the target pixel (Step S92).

Then, judgment is made whether or not the processing has been completed for all the local regions (Step S7). In a case in which judgment has been made that the processing has not been completed for all the local regions, the flow returns to Step S3, and the above-described processing is performed for the unprocessed local regions.

On the other hand, in a case in which judgment has been made that the processing has been completed for all the local regions, judgment is made whether or not the processing has been completed for all the luminance signals and all the color-difference signals (Step S93). In a case in which judgment has been made that the processing has not been completed for all the luminance signals and all the color-difference signals, the flow returns to Step S90, and the above-described processing is performed for the unprocessed luminance signals or unprocessed color-difference signals.

On the other hand, in a case in which judgment has been made that the processing has been completed for all the luminance signals and all the color-difference signals, known enhancement processing, compression processing, etc., are performed (Step S9).

Subsequently, the image signal thus processed is output (Step S10), whereupon the processing ends.

Next, detailed description will be made regarding the first noise reduction processing performed in the aforementioned Step S91.

When this processing is started, first, the TV (Total Variation) norm is calculated for the local region as represented by Equation 27 (step S100).

Subsequently, the diffusion image is calculated according to Equation 29 (Step S101).

Furthermore, the TV norm is calculated with respect to the diffusion image as represented by Equation 27 (Step S102).

Then, the absolute value of the difference between these TV norms is calculated as the variation component (Step S103).

Then, the variation component is compared with a predetermined threshold (Step S104). In a case in which judgment has been made that the variation component is greater than the predetermined threshold, the flow returns to Step S101, and the above-described processing is repeatedly performed.

On the other hand, in a case in which the variation component is equal to or smaller than the predetermined threshold, the pixel value that corresponds to the target pixel position is extracted from the diffusion image, and the pixel value thus extracted is output as the target pixel value subjected to the first noise reduction processing (Step S105), following which the flow returns to the processing shown in FIG. 51.

Next, referring to FIG. 53, detailed description will be made regarding the second noise reduction processing performed in the aforementioned Step S92.

When this processing is started, first, a smoothing filter is selected from among the smoothing filters as shown in FIGS. 48A to 48D and FIGS. 49A to 49D based upon the target pixel value subjected to the first noise reduction processing and the noise amount (Step S110).

Subsequently, the smoothing filter thus selected is read out (Step S111).

Furthermore, the smoothing filtering processing is performed on the local region using the smoothing filter thus selected (Step S112).

Then, the target pixel value thus subjected to the filtering processing is output as the target pixel value subjected to the second noise reduction processing (Step S113), following which the flow returns to the processing shown in FIG. 51.

It should be noted that the image signal to be processed is not limited to a still image. Also, multiple image signals acquired in a time-series manner (so-called video signal) may be processed.

The embodiment 3 as described above allows the noise reduction processing optimized for the image capturing situation to be performed with high precision, thereby providing a high-quality image signal.

Furthermore, such an embodiment suppresses the effects of the edge components even if the edge has a complicated shape. This allows the noise amount to be estimated with high precision, thereby improving the stability and the reliability of the processing.

In the first noise reduction processing, the diffusion processing is performed using the TV norm or the partial differential equations. Of these methods, the method employing the TV norm has the advantage of high resolution of the edge component. Thus, an arrangement employing the TV norm is capable of suppressing the effects of the edge component even if the edge region has a complicated shape. On the other hand, a method employing the partial differential equations has a high degree of freedom for the processing. Thus, such an arrangement employing the partial differential equations allows the image quality to be adjusted in a flexible manner. Furthermore, with such an arrangement, when the diffusion processing enters the static state, the iterative processing is stopped, thereby providing an image signal with stable image quality. Furthermore, the iterative processing is stopped based upon the number of times the iterative diffusion processing is performed. This provides a constant processing speed, thereby improving the operability of the system.

Furthermore, in the second noise reduction processing, a smoothing filter is selected based upon the noise amount and the target pixel value subjected to the first noise reduction processing, thereby providing the optimum noise reduction processing. Furthermore, such an arrangement employing the smoothing filter allows the noise reduction processing to be easily performed for a particular frequency band. Thus, such an arrangement allows a subjectively desired image signal to be obtained. Furthermore, with such an arrangement, the noise reduction processing is independently performed for each of the luminance signal and the color-difference signals. This allows the optimum luminance noise reduction processing and the optimum color noise reduction processing to be performed, thereby providing a high-quality image signal.

It should be noted that the present invention is by no means intended to be restricted to the above-described embodiment. Rather, various modifications thereof may be made by changing the components without departing from the spirit and scope of the present invention. Also, various modifications according to the present invention may be made by making various combinations of multiple combinations disclosed in the above-described embodiments. For example, a modification may be made by eliminating several components from all the components disclosed in the embodiment. Also, a modification may be made by making a combination of the components over the different embodiments as appropriate. As described above, it is needless to say that various changes and applications may be made without departing from the scope and spirit of the present invention.

What is claimed is:

1. An image capturing system which performs noise reduction processing on an image signal acquired from an image capturing unit, including:
   a processor, said processor including:
      a local region extracting unit which extracts, from the image signal, a local region including a target pixel to be subjected to the noise reduction processing and at least one neighboring pixel positioned spatially in the vicinity of the target pixel;
      a first noise reducing unit which performs adaptive noise reduction processing on the target pixel within the local region;
      a noise estimating unit which estimates the noise amount with respect to the target pixel based upon the target pixel value subjected to the noise reduction processing by the first noise reducing unit; and
      a second noise reducing unit which performs noise reduction processing on the target pixel based upon the target pixel value subjected to the noise reduction processing by the first noise reducing unit and the noise amount estimated by the noise estimating unit.

2. The image capturing system according to claim 1, wherein the first noise reducing unit includes:
   a weighting factor calculating unit which calculates the weighting factors with respect to the target pixel and the neighboring pixel based upon at least one of a spatial correlation, a temporal correlation, and a pixel-value correlation between the target pixel and the neighboring pixel; and
   a filtering unit which performs filtering processing on the local region based upon the weighting factors.

3. The image capturing system according to claim 2, wherein the weighting factor calculating unit has a configuration including table in which the weighting factors are output based upon a difference component between the target pixel value and the neighboring pixel value.

4. The image capturing system according to claim 2, wherein the weighting factor calculating unit includes:
   a first table in which first weighting factors are output based upon a difference component between the target pixel value and the neighboring pixel value;
   a second table in which second weighting factors are output based upon relative coordinate positions of the target pixel and the neighboring pixel; and
   a composite weighting factor generating unit which generates composite weighting factors based upon the first weighting factors and the second weighting factors.

5. The image capturing system according to claim 2, wherein the weighting factor calculating unit includes:
   a first table in which first weighting factors are output based upon the difference component between the target pixel value and the neighboring pixel value;

a second table in which second weighting factors are output based upon relative coordinate positions of the target pixel and the neighboring pixel;

a third table in which third weighting factors are output based upon the difference component between the target pixel value and the neighboring pixel value; and a composite weighting factor generating unit which generates composite weighting factors based upon the first weighting factors, the second weighting factors, and the third weighting factors.

6. The image capturing system according to claim 3, wherein the weighting factor calculating unit further includes bit shift unit which extracts higher-order bits of a predetermined number for each of the target pixel value and the neighboring pixel value.

7. The image capturing system according to claim 4, wherein the weighting factor calculating unit further includes bit shift units which extracts higher-order bits of a predetermined number for each of the target pixel value and the neighboring pixel value.

8. The image capturing system according to claim 5, wherein the weighting factor calculating unit further includes bit shift unit which extracts higher-order bits of a predetermined number for each of the target pixel value and the neighboring pixel value.

9. The image capturing system according to claim 1, wherein the noise estimating unit includes:
a parameter recording unit which records a parameter set with respect to a reference noise model;
an acquiring unit which acquire an information with respect to a temperature of the image capturing unit and a gain for the image signal;
a providing unit which provides a standard value for a information which cannot be obtained by unit of the acquiring unit;
a parameter selecting unit which selects a necessary parameter from among a parameter set based upon the information received from the acquiring unit or the providing unit and the target pixel value subjected to the noise reduction processing by the first noise reducing unit; and
an interpolation unit which calculates the noise amount by interpolation calculation based upon the target pixel value subjected to the noise reduction processing by the first noise reducing unit and the parameter thus selected.

10. The image capturing system according to claim 9, wherein the noise estimating unit further includes:
an isolated-point detecting unit which detects a degree that the target pixel is to be handled as an isolated point; and
a correcting unit which corrects the noise amount based upon the degree that the target pixel is to be handled as an isolated point.

11. The image capturing system according to claim 1, wherein the second noise reducing unit includes:

a noise range setting unit which sets a noise range with respect to the target pixel value based upon the noise amount;

a first smoothing unit which performs smoothing processing on the target pixel value based upon the target pixel value subjected to the noise reduction processing by the first noise reducing unit in a case in which the target pixel value is within the noise range; and a second smoothing unit which corrects the target pixel value in a case in which the target pixel value is not within the noise range.

12. The image capturing system according to claim 1, wherein the image capturing unit substantially has a configuration including an image capturing device having color filters of a plurality of colors,
and wherein the image capturing system further includes:
a color signal separating unit which separates the image signal into a plurality of color signals in increments of colors of the color filters; and
a signal control unit performs a control operation so as to sequentially apply the local region extracting unit, the first noise reducing unit, the noise estimating unit, and the second noise reducing unit to each of the color signals.

13. The image capturing system according to claim 12, wherein the image capturing device is an image capturing device mounting an R (red), G (green), B (blue) Bayer-type primary color filter arranged on a front face thereof, or an image capturing device mounting a Cy (Cyan), Mg (Magenta), Ye (Yellow), G (green) color-difference line-sequential type complementary color filter arranged on a front face thereof.

14. A non-transitory computer readable recording medium for recording an image processing program for instructing a computer to perform noise reduction processing on an image signal acquired from an image capturing unit, the computer readable recording device recording the image processing program which includes:
a local region extraction step for extracting, from the image signal, a local region including a target pixel to be subjected to the noise reduction processing and at least one neighboring pixel positioned spatially in the vicinity of the target pixel;
a first noise reduction step for performing adaptive noise reduction processing on the target pixel within the local region;
a noise estimation step for estimating a noise amount with respect to the target pixel based upon the target pixel value subjected to the noise reduction processing in the first noise reduction step; and
a second noise reduction step for performing noise reduction processing on the target pixel based upon the target pixel value subjected to the noise reduction processing in the first noise reduction step and the noise amount estimated in the noise estimation step.

* * * * *